(12) United States Patent
Movva et al.

(10) Patent No.: US 12,143,895 B2
(45) Date of Patent: Nov. 12, 2024

(54) PAIRING GROUPS OF ACCESSORIES

(71) Applicant: Apple Inc., Cupertino, CA (US)

(72) Inventors: Siva Ganesh Movva, Cupertino, CA (US); Tunc Ertan, San Francisco, CA (US); Ariane Cotte, San Francisco, CA (US); Kerry Nguyen, Milpitas, CA (US); Anita Desai, San Francisco, CA (US); Steven Douglas Laver, San Diego, CA (US); Brent Ledvina, San Francisco, CA (US); Kenneth U. Victa, San Jose, CA (US); Ping-Ko Chiu, San Francisco, CA (US); Michał Adam Kałużny, Berlin (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/508,334

(22) Filed: Oct. 22, 2021

(65) Prior Publication Data
US 2022/0394428 A1  Dec. 8, 2022

Related U.S. Application Data

(60) Provisional application No. 63/197,293, filed on Jun. 4, 2021.

(51) Int. Cl.
*H04W 4/029* (2018.01)
*H04W 12/50* (2021.01)
*H04W 76/14* (2018.01)

(52) U.S. Cl.
CPC ........... *H04W 4/029* (2018.02); *H04W 12/50* (2021.01); *H04W 76/14* (2018.02)

(58) Field of Classification Search
CPC ..... H04W 4/029; H04W 12/50; H04W 76/14; H04W 4/023; H04W 8/005; H04W 4/08;
(Continued)

(56) References Cited

U.S. PATENT DOCUMENTS 4,918,425 A   4/1990  Greenberg et al.
5,910,776 A   6/1999  Black
(Continued)

FOREIGN PATENT DOCUMENTS

CN   101682508       3/2010
CN   102325324 A     1/2012
(Continued)

OTHER PUBLICATIONS

A. Korolova et al., "Cross-App Tracking via Nearby Bluetooth Low Energy Devices", A presentation proposal for PrivacyCon 2017, Published Mar. 13, 2018, 12 pgs.
(Continued)

*Primary Examiner* — Hirdepal Singh
(74) *Attorney, Agent, or Firm* — Aikin & Gallant, LLP

(57) ABSTRACT

Embodiments that relate to pairing and finding a group of accessory devices are described. In an embodiment, a pairing status is received from a first accessory device, a request is sent to the first accessory device for information on a number of accessory devices in a device group and a number of accessory devices that are proximate to the first accessory device in the device group, information on a second accessory device in the device group is received, a continue pairing message is sent to the second accessory device if the second accessory device is proximate, and a device group profile is created with information on the number of parts and received information on the second accessory device.

22 Claims, 31 Drawing Sheets

(58) Field of Classification Search
CPC ......... H04W 4/80; H04W 12/55; H04W 8/18;
H04W 12/041; H04W 12/0431; H04W
12/63; H04L 63/065
USPC ...................................................... 455/457
See application file for complete search history.

(56) References Cited

U.S. PATENT DOCUMENTS

| | | |
|---|---|---|
| 6,292,660 B1 | 9/2001 | Hartless et al. |
| 6,345,098 B1 | 2/2002 | Matyas, Jr et al. |
| 6,369,706 B1 | 4/2002 | Anderson et al. |
| 6,754,349 B1 | 6/2004 | Arthan |
| 6,993,350 B2 | 1/2006 | Katoh |
| 7,039,427 B2 | 5/2006 | Tachikawa |
| 7,059,182 B1 | 6/2006 | Ragner |
| 7,274,761 B2 | 9/2007 | Muller et al. |
| 7,342,497 B2 | 3/2008 | Chung et al. |
| 7,376,393 B2 | 5/2008 | Ono et al. |
| 7,388,491 B2 | 6/2008 | Chand et al. |
| 7,519,377 B2 | 4/2009 | Tsukamoto |
| 7,558,529 B2 | 7/2009 | Seshadri et al. |
| 7,657,248 B2 | 2/2010 | Hodoshima |
| 8,213,389 B2 | 7/2012 | Bush et al. |
| 8,457,617 B2 | 6/2013 | Sweeney et al. |
| 8,538,401 B2 | 9/2013 | Kim et al. |
| 8,583,915 B1 | 11/2013 | Huang |
| 8,873,758 B2 | 10/2014 | Bradley |
| 8,971,924 B2 | 3/2015 | Pai et al. |
| 9,077,521 B2 | 7/2015 | Machani |
| 9,104,896 B2 | 8/2015 | Pai et al. |
| 9,277,353 B2 | 3/2016 | Merriam |
| 9,277,386 B1 | 3/2016 | Masiero et al. |
| 9,316,717 B2 | 4/2016 | Gicklhorn et al. |
| 9,323,916 B1 | 4/2016 | Wu et al. |
| 9,357,348 B2 | 5/2016 | Evans et al. |
| 9,420,423 B1 | 8/2016 | Mendelson |
| 9,426,749 B2 | 8/2016 | Cordeiro et al. |
| 9,432,802 B2 | 8/2016 | Matsushita et al. |
| 9,456,298 B2 | 9/2016 | Lee et al. |
| 9,462,109 B1 | 10/2016 | Frazier Fields et al. |
| 9,516,620 B1 | 12/2016 | Upp et al. |
| 9,520,045 B2 | 12/2016 | Hawkins |
| 9,544,075 B2 | 1/2017 | Altman et al. |
| 9,557,185 B2 | 1/2017 | Kimes |
| 9,565,255 B2 | 2/2017 | Kapoor et al. |
| 9,641,622 B2 | 5/2017 | Kapoor et al. |
| 9,706,032 B2 | 7/2017 | Pai et al. |
| 9,762,316 B2 | 9/2017 | Kukuiski et al. |
| 9,769,601 B2 | 9/2017 | Zelinka |
| 9,779,596 B2 | 10/2017 | Ingrassia et al. |
| 9,781,106 B1 | 10/2017 | Vitus et al. |
| 9,801,059 B2 | 10/2017 | Ziv et al. |
| 9,820,093 B2 | 11/2017 | Mayor et al. |
| 9,848,075 B1 | 12/2017 | Ahmad et al. |
| 9,860,932 B2 | 1/2018 | Kapoor et al. |
| 9,922,531 B1 | 3/2018 | Doxey et al. |
| 10,015,836 B2 | 7/2018 | Kapoor et al. |
| 10,022,066 B2 | 7/2018 | Tomiha |
| 10,022,086 B1 | 7/2018 | Kahn et al. |
| 10,042,595 B2* | 8/2018 | Behzadi ............... G06F 3/14 |
| 10,110,642 B2 | 10/2018 | Numakami |
| 10,366,692 B1 | 7/2019 | Adams et al. |
| 10,368,378 B2 | 7/2019 | Foster et al. |
| 10,410,485 B2 | 9/2019 | Ingrassia et al. |
| 10,448,211 B1 | 10/2019 | Shen et al. |
| 10,506,517 B2 | 12/2019 | Dai Javad et al. |
| 10,600,310 B2 | 3/2020 | Hawkins |
| 10,667,313 B2 | 5/2020 | Maguire et al. |
| 10,701,203 B2* | 6/2020 | Fiorini ............... H04M 3/42 |
| 10,771,898 B2 | 9/2020 | Dusan et al. |
| 10,841,736 B1 | 11/2020 | De La Broise |
| 10,855,483 B1 | 12/2020 | Ramesh et al. |
| 10,862,684 B2 | 12/2020 | Hong et al. |
| 10,956,975 B1 | 3/2021 | Abdul Gaffar et al. |
| 10,970,989 B1 | 4/2021 | Quibelan et al. |
| 10,992,755 B1 | 4/2021 | Tran |
| 11,051,105 B2 | 6/2021 | Dusan et al. |
| 11,265,716 B2 | 3/2022 | Klinkner et al. |
| 11,282,351 B2 | 3/2022 | Ingrassia, Jr. et al. |
| 11,310,652 B2 | 4/2022 | Norp et al. |
| 11,595,784 B2 | 2/2023 | Mohalik |
| 11,606,669 B2 | 3/2023 | Lopatin et al. |
| 11,641,563 B2 | 5/2023 | Lopatin et al. |
| 11,863,671 B1 | 1/2024 | Sierra et al. |
| 11,889,302 B2 | 1/2024 | Victa et al. |
| 2002/0144215 A1 | 10/2002 | Hoskote et al. |
| 2003/0065918 A1 | 4/2003 | Willey |
| 2003/0092437 A1 | 5/2003 | Nowlin et al. |
| 2003/0182584 A1 | 9/2003 | Banes et al. |
| 2004/0249817 A1 | 12/2004 | Liu et al. |
| 2005/0021767 A1 | 1/2005 | Cai |
| 2005/0154896 A1 | 7/2005 | Widman et al. |
| 2005/0190098 A1 | 9/2005 | Bridgelall et al. |
| 2005/0285739 A1 | 12/2005 | Velhal et al. |
| 2006/0039337 A1 | 2/2006 | Hodoshima |
| 2006/0111835 A1 | 5/2006 | Baker et al. |
| 2007/0139199 A1 | 6/2007 | Hanlon |
| 2007/0249374 A1 | 10/2007 | Hu et al. |
| 2007/0283151 A1 | 12/2007 | Nakano et al. |
| 2007/0283395 A1 | 12/2007 | Wezowski |
| 2008/0004798 A1 | 3/2008 | Troxler et al. |
| 2008/0119953 A1 | 5/2008 | Reed et al. |
| 2008/0120196 A1 | 5/2008 | Reed et al. |
| 2009/0058670 A1 | 3/2009 | Sweeney et al. |
| 2009/0315767 A1 | 12/2009 | Scalisi et al. |
| 2009/0323972 A1 | 12/2009 | Kohno et al. |
| 2009/0325599 A1 | 12/2009 | Vuori |
| 2010/0079249 A1 | 4/2010 | Pan |
| 2010/0159833 A1 | 6/2010 | Lewis et al. |
| 2010/0184378 A1 | 7/2010 | Wakefield |
| 2010/0245054 A1 | 9/2010 | Kim |
| 2010/0289620 A1 | 11/2010 | Aminger et al. |
| 2011/0124326 A1 | 5/2011 | Kudo |
| 2012/0054493 A1 | 3/2012 | Bradley |
| 2012/0083209 A1 | 4/2012 | Giles et al. |
| 2012/0275361 A1 | 11/2012 | Berenberg et al. |
| 2012/0310391 A1 | 12/2012 | Sanders |
| 2012/0328061 A1 | 12/2012 | Chow |
| 2013/0023238 A1 | 1/2013 | Kaplan et al. |
| 2013/0111555 A1 | 5/2013 | Leneel |
| 2013/0171986 A1 | 7/2013 | Shimizu |
| 2013/0271902 A1 | 10/2013 | Lai et al. |
| 2013/0275873 A1 | 10/2013 | Shaw et al. |
| 2013/0290191 A1 | 10/2013 | Dischamp et al. |
| 2013/0290522 A1 | 10/2013 | Behm, Jr. |
| 2013/0343542 A1 | 12/2013 | Rosati et al. |
| 2014/0111307 A1 | 4/2014 | Ingrassia et al. |
| 2014/0222685 A1 | 8/2014 | Middleton et al. |
| 2014/0379584 A1 | 12/2014 | Ward |
| 2015/0019124 A1 | 1/2015 | Bandyopadhyay et al. |
| 2015/0072618 A1 | 3/2015 | Granbery |
| 2015/0189596 A1 | 7/2015 | Stephens |
| 2015/0277852 A1 | 10/2015 | Burgis |
| 2015/0289207 A1 | 10/2015 | Kubo et al. |
| 2015/0334569 A1 | 11/2015 | Rangarajan et al. |
| 2015/0350140 A1 | 12/2015 | Garcia et al. |
| 2015/0350820 A1 | 12/2015 | Son et al. |
| 2015/0356030 A1 | 12/2015 | Zahand et al. |
| 2015/0382140 A1 | 12/2015 | Cho et al. |
| 2016/0006577 A1 | 1/2016 | Logan |
| 2016/0037439 A1 | 2/2016 | Shamis et al. |
| 2016/0057625 A1 | 2/2016 | Andrada et al. |
| 2016/0069991 A1 | 3/2016 | Das et al. |
| 2016/0080591 A1 | 3/2016 | Asakura |
| 2016/0087959 A1 | 3/2016 | Park |
| 2016/0088143 A1 | 3/2016 | Cohn et al. |
| 2016/0094947 A1 | 3/2016 | Shen et al. |
| 2016/0140335 A1 | 5/2016 | Proulx et al. |
| 2016/0017402 A1 | 6/2016 | Cavallaro et al. |
| 2016/0164973 A1 | 6/2016 | Kapoor et al. |
| 2016/0174023 A1 | 6/2016 | Cavallaro et al. |
| 2016/0180392 A1 | 6/2016 | Liu et al. |
| 2016/0189507 A1 | 6/2016 | Rayner |
| 2016/0205556 A1 | 7/2016 | Borghei |

(56) References Cited

U.S. PATENT DOCUMENTS

| | | |
|---|---|---|
| 2016/0212538 A1 | 7/2016 | Fullam et al. |
| 2016/0234213 A1 | 8/2016 | Kim et al. |
| 2016/0242192 A1 | 8/2016 | Llosa et al. |
| 2016/0248564 A1 | 8/2016 | Qi et al. |
| 2016/0302137 A1 | 10/2016 | Escott et al. |
| 2016/0330095 A1 | 11/2016 | Numakami |
| 2016/0344712 A1 | 11/2016 | Ding et al. |
| 2016/0352518 A1 | 12/2016 | Ford et al. |
| 2016/0357385 A1 | 12/2016 | Dan et al. |
| 2016/0360350 A1 | 12/2016 | Watson et al. |
| 2016/0371507 A1 | 12/2016 | Jakobsson |
| 2017/0126818 A1 | 5/2017 | Kang |
| 2017/0127340 A1 | 5/2017 | Dooey et al. |
| 2017/0171181 A1 | 6/2017 | Britt |
| 2017/0228935 A1 | 8/2017 | Foster et al. |
| 2017/0272415 A1 | 9/2017 | Zhao et al. |
| 2017/0134898 A1 | 11/2017 | Vega et al. |
| 2017/0325065 A1 | 11/2017 | Azam et al. |
| 2017/0330031 A1 | 11/2017 | Wilson et al. |
| 2018/0013815 A1 | 1/2018 | Gold |
| 2018/0025595 A1 | 1/2018 | Ingrassia et al. |
| 2018/0035374 A1 | 2/2018 | Borden et al. |
| 2018/0176748 A1 | 6/2018 | Kim et al. |
| 2018/0183591 A1 | 6/2018 | De Laat et al. |
| 2018/0183596 A1 | 6/2018 | Deshpande et al. |
| 2018/0184286 A1 | 6/2018 | Patterson |
| 2018/0199138 A1 | 7/2018 | Dusan et al. |
| 2018/0219872 A1 | 8/2018 | Sugashima et al. |
| 2018/0227284 A1 | 8/2018 | Sugano et al. |
| 2018/0262907 A1 | 9/2018 | Alanis et al. |
| 2018/0288208 A1* | 10/2018 | Lee ................. H04M 1/724092 |
| 2018/0317266 A1 | 11/2018 | Britt et al. |
| 2018/0343561 A1 | 11/2018 | Patterson |
| 2018/0348718 A1 | 12/2018 | Richardson et al. |
| 2019/0028445 A1 | 1/2019 | McLaughlin et al. |
| 2019/0034920 A1 | 1/2019 | Nolan et al. |
| 2019/0037469 A1 | 1/2019 | Krishnan et al. |
| 2019/0058966 A1 | 2/2019 | Puppala et al. |
| 2019/0116173 A1 | 4/2019 | Robison et al. |
| 2019/0191301 A1* | 6/2019 | Fang ........................ H04L 9/30 |
| 2019/0213528 A1 | 7/2019 | Gupta et al. |
| 2019/0246253 A1 | 8/2019 | Ryu et al. |
| 2019/0289059 A1 | 9/2019 | Vanahalli et al. |
| 2020/0034835 A1 | 1/2020 | Kim |
| 2020/0074822 A1 | 3/2020 | Ingrassia, Jr. et al. |
| 2020/0107164 A1* | 4/2020 | Lopatin ................. G01S 5/0295 |
| 2020/0145244 A1 | 5/2020 | Hollinger et al. |
| 2020/0177595 A1 | 6/2020 | Rakshit et al. |
| 2020/0187001 A1 | 6/2020 | Ard et al. |
| 2020/0226908 A1 | 7/2020 | Doxey et al. |
| 2020/0242662 A1 | 7/2020 | Middleton et al. |
| 2020/0344549 A1 | 10/2020 | Wegener |
| 2021/0044957 A1 | 2/2021 | Norp et al. |
| 2021/0136846 A1 | 5/2021 | Ponnusamy et al. |
| 2021/0203747 A1 | 7/2021 | Gorsica, IV et al. |
| 2021/0204115 A1 | 7/2021 | Gorsica, IV et al. |
| 2021/0250355 A1 | 8/2021 | Galdo et al. |
| 2021/0256833 A1 | 8/2021 | Daoura et al. |
| 2021/0334851 A1 | 10/2021 | Proctor, Jr. et al. |
| 2021/0400045 A1 | 12/2021 | Kondeti |
| 2022/0052847 A1 | 2/2022 | Gonzalez Cervantes et al. |
| 2022/0070667 A1 | 3/2022 | Victa et al. |
| 2022/0078029 A1 | 3/2022 | Galdo et al. |
| 2022/0200789 A1 | 6/2022 | Lalande et al. |
| 2022/0224300 A1 | 7/2022 | Knode |
| 2022/0256633 A1* | 8/2022 | Gu ........................ H04W 76/14 |
| 2022/0327196 A1 | 10/2022 | Trapani |
| 2022/0369022 A1* | 11/2022 | Jorgovanovic ....... H04R 1/1091 |
| 2022/0386076 A1 | 12/2022 | Lopatin et al. |
| 2022/0394431 A1 | 12/2022 | Lopatin et al. |

FOREIGN PATENT DOCUMENTS

| | | |
|---|---|---|
| CN | 104833945 | 8/2015 |
| CN | 106412816 | 2/2017 |
| CN | 106792501 A | 5/2017 |
| CN | 107328424 | 11/2017 |
| CN | 108223229 A | 6/2018 |
| CN | 108520552 | 9/2018 |
| CN | 109596118 | 4/2019 |
| CN | 111436040 | 7/2020 |
| CN | 112068512 | 12/2020 |
| CN | 114071357 | 2/2022 |
| EP | 1296155 | 3/2003 |
| EP | 2020784 | 2/2009 |
| GB | 2472192 A | 2/2011 |
| JP | 2018191522 | 12/2018 |
| JP | 2021025798 | 2/2021 |
| KR | 20140044916 | 4/2014 |
| KR | 20170013833 | 2/2017 |
| KR | 20180086118 | 7/2018 |
| KR | 2019-0141998 A | 12/2019 |
| WO | 2010126846 | 11/2010 |
| WO | 2012030733 | 3/2012 |
| WO | 2013036488 | 3/2013 |
| WO | 2013163334 | 10/2013 |
| WO | 2014005004 | 3/2014 |
| WO | 2014042507 A1 | 3/2014 |
| WO | 2016032610 | 3/2016 |
| WO | 2016036453 A1 | 3/2016 |
| WO | 2017107077 | 6/2017 |
| WO | 2018001518 A1 | 1/2018 |
| WO | 2018118026 A1 | 6/2018 |
| WO | 2018135919 | 7/2018 |
| WO | 2018156555 | 8/2018 |
| WO | 2018160863 A1 | 9/2018 |
| WO | 2019232420 A2 | 12/2019 |
| WO | 2020214701 A1 | 10/2020 |
| WO | 2020214708 A1 | 10/2020 |
| WO | 2020214709 A1 | 10/2020 |
| WO | 2020214711 A1 | 10/2020 |
| WO | 2022046527 | 3/2022 |
| WO | 2022256438 | 12/2022 |

OTHER PUBLICATIONS

PCT/US2020/028318, "PCT Notification of Transmittal of the International Search Report and the Written Opinion of the International Searching Authority, or the Declaration", Mailed Jul. 8, 2020, 16 pages.

PCT/US2020/028326, "PCT Notification of Transmittal of the International Search Report and the Written Opinion of the International Searching Authority, or the Declaration", Mailed Jul. 3, 2020, 12 pages.

PCT/US2020/028327, "PCT Notification of Transmittal of the International Search Report and the Written Opinion of the International Searching Authority, or the Declaration", Mailed Sep. 14, 2020, 17 pages.

PCT/US2020/028329, "PCT Notification of Transmittal of the International Search Report and the Written Opinion of the International Searching Authority, or the Declaration", Mailed Jul. 15, 2020, 13 pages.

Mannan, Mohammad, et al. "Mercury: Recovering forgotten passwords using personal devices." International Conference on Financial Cryptography and Data Security. Springer, Berlin, Heidelberg, 2011 (Year: 2011).

PCT/US2019/048899, "Notification of Transmittal of the International Search Report and the Written Opinion of the International Searching Authority, or The Declaration" mailed Dec. 2, 2019, 5 pgs.

EP22172663.1, "Extended European Search Report" mailed Jan. 25, 2023, 18 pages.

FOFA, "Find One, Find All Key Finder & Remote Control Locators", received from The Wayback Machine—https://web.archive.org/web/20200715080402/http://www.findonefindall.com:80/index.htm, 3 pages.

Kim et al., "In/Out Status Monitoring in Mobile Asset Tracking with Wireless Sensor Networks", received from www.mdpi.com/journal/sensors, published Mar. 26, 2010, 22 pages.

(56) References Cited

OTHER PUBLICATIONS

Fuemmeler et al., "Energy Efficient Multi-Object Tracking in Sensor Networks", received from https://ieeexplore.ieee.org/document/5439914, published Mar. 29, 2010, 9 pages.
Cocchi et al., "Subband Neural Networks Prediction for On-Line Audio Signal Recovery", received from https://ieeexplore.ieee.org/document/1021887, Published Jul. 2002, 10 pages.
PCT/US2022/027681, "PCT Notification of transmittal of the International Search Report and the Written Opinion of the International Searching Authority, or the Declaration", mailed Jul. 28, 2022, 9 pages.
Lopez, Mareo, "The Importance of a Speaker's Resonant Frequency", proaudioland.com, 3 pages, Aug. 2015 (Year: 2015).
Thetileapp.com [online], "Learn How Tile's Tracking Device Helps You Find Your Lost Things," Dec. 9, 2016, retrieved from URL <https://www.thetileapp.com/how-it-works>, 9 pages.
PCT/US2023/017975, "PCT Notification of Transmittal of the International Search Report and the Written Opinion of the International Searching Authority, or the Declaration", mailed Jun. 29, 2023, 12 pages.

\* cited by examiner

PAIRING GROUPS OF ACCESSORIES

CROSS-REFERENCE

This application claims the benefit of U.S. Provisional Application Ser. No. 63/197,293, filed on Jun. 4, 2021, which is hereby incorporated herein by reference.

FIELD

Embodiments described herein relate to pairing and finding a group of accessory devices.

BACKGROUND INFORMATION

Previous device locator services provide services for individual devices and do not provide meaningful location services for a set of related devices. As such, there is a need to provide location services for a set of related devices.

SUMMARY

In an embodiment, a method to provide pairing with a device group, the method provides receiving, from, a first accessory device in a device group, a pairing status, selectively pairing with the first accessory device based on the pairing status, sending, to the first accessory device, a request for information on accessory devices in the device group, the information including information on at least one accessory device that is proximate to the first accessory device in the device group, receiving information on a second accessory device in the device group, selectively sending, to the second accessory device, a continue pairing message, if the second accessory device is proximate, and creating a device group profile with information on the accessory devices in the device group and received information on the second accessory device. In some embodiments, a method may provide sending a request, to the first accessory device, for status information, the status information including the pairing status and an indication that the first accessory is part of the device group. In some embodiments, a method may provide sending a request, to the first accessory device, for status information, the status information including verifiable information for the first accessory device, sending a verification request with the received information on the first accessory device, and selectively performing a pairing with the second accessory device, if the device is unpaired, wherein a pairing comprises having access to at least one key associated with the second accessory device for a user account. In some embodiments, the first accessory device is a wireless beacon peripheral device. In an embodiment, a method may provide sending a verification request with the received information on the second accessory device, and selectively sending, to the second accessory device, a continue pairing message based on verification results received in response to the verification request. In some embodiments, the method provides sending, to the first accessory device, a request for information on a number of accessory devices in the device group and a number of accessory devices that are proximate to the first accessory device in the device group.

In an embodiment, a method for facilitating pairing of a device group, the method provides determining, by a first accessory device, a status on proximity of a second accessory device in the device group, sending, to a host device, the status on proximity of the second accessory device in the device group, sending a handshake message to the second accessory device, receiving verifiable information from the second accessory device, and sending, to the host device, the verifiable information.

In an embodiment, a non-transitory machine-readable medium storing instructions to cause one or more processors of an electronic device to perform operations, the operations provide receiving, from a first accessory device in a device group, a pairing status, selectively pairing with the first accessory device based on the pairing status, sending, to the first accessory device, a request for information on accessory devices in the device group, the information including information on at least one accessory device that is proximate to the first accessory device in the device group, receiving information on a second accessory device in the device group, selectively sending, to the second accessory device, a continue pairing message, if the second accessory device is proximate, and creating a device group profile with information on the accessory devices in the device group and received information on the second accessory device.

In a data processing system having a memory to store instructions for execution, one or more processors to execute the instructions stored in memory, wherein the instructions, when executed cause the one or more processors to receive, from a first accessory device in a device group, a pairing status, selectively pair with the first accessory device based on the pairing status, send, to the first accessory device, a request for information on accessory devices in the device group, the information including information on at least one accessory device that is proximate to the first accessory device in the device group, receive information on a second accessory device in the device group, selectively send, to the second accessory device, a continue pairing message, if the second accessory device is proximate, and create a device group profile with information on the accessory devices in the device group and received information on the second accessory device. In an embodiment, a method for finding a device group, the method provides receiving an indication that a first accessory device is part of a device group, wherein the first accessory device has a physical connection to a second accessory device in the device group, receiving a beacon signal from the first accessory device in the device group, wherein the beacon signal includes status information on the second accessory device, and storing location data from the beacon signal on the device group. In some embodiments, a plurality of accessory devices in the device group are physically connected to a case. In some embodiments, RSSI information is determined from the beacon signal, wherein the beacon signal comprises an advertisement including RSSI information. In some embodiments, the method provides presenting location data on the device group in a user interface. In some embodiments, the method provides requesting storage of location data on the device group with device locator services. In some embodiments, the method provides generating at least one key for at least one accessory device in the device group, requesting a device locator service to send location data corresponding to the at least one key, and receiving and presenting location data on the device group.

In an embodiment, a method for finding a device group, the method provides receiving an indication that a first accessory device is part of a device group, wherein the first accessory device is wirelessly connected to a second accessory device in the device group, receiving a beacon signal from the first accessory device in the device group, wherein the beacon signal includes status information on a second accessory device, and storing location data from the beacon signal on the device group. In some embodiments, the method provides presenting location data on the device group in a user interface. In some embodiments, the method provides requesting storage of location data on the device group with device locator services.

In an embodiment, a method for presenting a user interface for finding a group of devices, the method provides receiving a request to launch an application, initiating a connection to at least one accessory device from a device group, presenting a user interface with a status on the at least one device from the device group, upon receipt of an indication that the at least one device from the device group is connected to another device from the device group, presenting a selectable element with a query on whether to continue to find devices from the group of devices, and presenting a status of other devices based on the response to the query.

DETAILED DESCRIPTION

Embodiments described herein provide techniques to enable pairing of a set of accessory devices to establish a device group and locator services for finding lost or misplaced accessory devices in the device group. The device group is a set of accessory devices (e.g., a pair of earbuds, such as Apple AirPods®) that can each be separately, independently verified, and paired to another device. The association of the accessory devices in the device group may allow the accessory devices to have access to information to facilitate pairing of other accessory devices within the device group and to find accessories within the device group. In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

Figure 1:
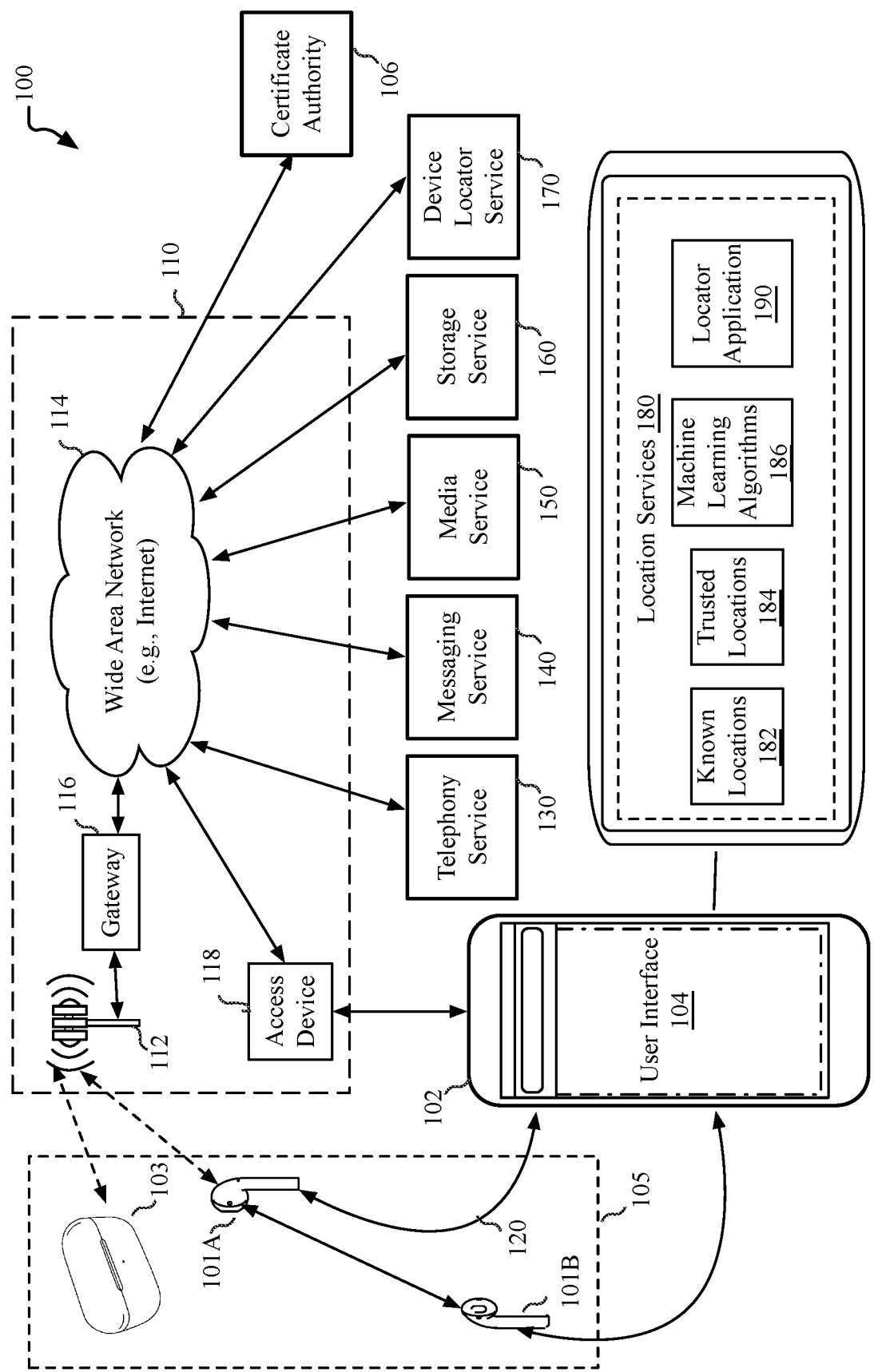
FIG. 1 is a block diagram of a network operating environment for mobile devices, according to an embodiment.

FIG. 1 is a block diagram of a network operating environment 100 for mobile devices, according to an embodiment. The network operating environment 100 includes multiple mobile devices, such as accessory devices with 101A and 101B (collectively 101) as well as mobile device 102. In an embodiment, mobile devices 101A and 101B may be accessory devices that may be paired as a device group 105. Optionally, the device group with accessory devices 101 may be stored in a mobile device with a wired connection, such as a case 103 to hold the accessory devices 101.

The case 103 may also be an accessory device that may be paired with mobile device 102 in some embodiments. By way of example, accessory devices 101 may be devices such as Apple AirPods®, EarPods®, and/or PowerBeats®. In some embodiments, accessory devices 101 may not be able to communicate over a wide area network. In other embodiments, the mobile devices 101 and 102 can each be any electronic device capable of communicating with a wireless network and a wireless accessory device. Some example mobile devices 101 include but are not limited to the following: a smartphone, a tablet computer, a notebook computer, a wearable computer (e.g., smartwatch or other wearable computing accessory), a mobile media player, a personal digital assistant, EarPods, AirPods®, EarPods®, PowerBeats®, locator tags, headphones, head mounted display, health equipment, speakers, and other similar devices. Each of mobile devices 101 and mobile device 102 optionally can include a user interface, such as user interface 104 of mobile device 102. In other embodiments, mobile device 101, as an accessory device, may not have a user interface. Mobile devices 101 and 102 may be a third-party device that utilizes an application programming interface to access device locator services. The third-party device may be provided by a different device manufacturer or be part of a different ecosystem (e.g., operating system) from mobile device 101 and 102. Mobile devices 101 and 102 can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102 can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102 can place and receive phone calls, send and receive e-mail messages, and retrieve electronic documents over the access device 118 and the wide area network 114. In some implementations, mobile device 101 and/or mobile device 102 can be physically connected to the access device 118 using one or more cables, for example, where the access device 118 is a personal computer. In this configuration, mobile device 101 or mobile device 102 can be referred to as a "tethered" device. In one embodiment, mobile device 101 can communicate with mobile device 102 via a wireless peer-to-peer connection 120. The wireless peer-to-peer connection 120 can be used to synchronize data between the devices.

Mobile device 101 or mobile device 102 can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile devices or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 101 and mobile device 102 to store documents and media files. The device locator service 170 can enable a user to locate a lost or misplaced device that was, at least at some point, connected to the one or more wired and/or wireless networks 110. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 101 and 102.

In some embodiments, accessory devices 101A, accessory device 101B, mobile device 102, case 103, and/or device group 105 may be registered with a certificate authority 106. In some embodiments, the certificate authority 106 is an entity that issues digital certificates, and the service may be implemented using a set of servers managed by a device manufacturer, service provider, or a registration service. The certificate provided by the certificate authority 106 may attest to the validity of received verifiable information about the device, such as a particular manufacturer for the device, a serial number, an identifier for a device group or other identifier, an indicator that device is part of a device group 105, and/or any other verifiable information. In some embodiments, a device manufacturer may establish the device group 105 by grouping serial numbers of accessory devices in the device group 105. In further embodiments, the certificate can be encrypted by the device 101, 102, or 103 prior to being sent to a third party and may be decrypted at an attestation service (e.g., certificate authority or another attestation service) when the third-party requests verification of information provided by accessory device 101, mobile device 102, case 103 and/or devices within device group 105. In some embodiments, a secure token may be provided in requests to pair by an accessory device 101. Additional examples of paired devices using location services may be found in U.S. patent application Ser. No. 17/219,595 filed Mar. 21, 2021 entitled "Secure Pairing and Pairing Lock for Accessory Devices," which is incorporated by reference herein in its entirety.

Mobile device 101 and 102 may have applications, services, and functionality locally accessible on the devices including location services 180. Mobile devices 102 may have a device locator application (e.g., a "Find my" application) 190 to utilize device locator services 170 and location services 180 to locate accessory devices 101. Locally accessible data may be stored on known locations 182 and safe or trusted locations 184. In some instances, machine learning algorithms 186 may be used to identify known locations 182, and/or trusted locations 184. Although cluster analysis is provided as an example of machine learning algorithms that may be used, those with skill in the art will recognize that other algorithms may be used to identify potential known or trusted locations. By way of example, cluster data analysis may be used to identify and classify and provide semantic labels for locations, such as locations frequented by a user. Safe or trusted locations 184 may be designated explicitly or confirmed as such by a user of the device 102A-B after data analysis. In other instances, the known locations 182 or the trusted locations 184 may be classified offline and provided by device locator service 170 or a third-party (e.g., a database with map information).

On-device heuristics and/or machine learning models may be used to infer relationships between a user and locations based on analysis of the locally stored data on frequented locations including frequently visited locations by the user, known locations, and/or any other locations. For example, a frequently visited location such as a home, a vehicle, a workplace, any location frequented by a user with mobile device (e.g., accessory devices, 101 and mobile device 102) and/or any other location designated as a trusted location 184 by the user. Known locations 182 may be business locations, public spaces, parks, museums, and/or any other location that may be frequented by a user. Boundary information for the respective stored locations may be stored along with classification type for the location and any semantic label assigned to the location. Stored information may include a defined set of boundaries or a radius distance around a point location to allow for creation of a geofence for the location. The geofence is a virtual perimeter for a real-world geographic area. Global positioning system (GPS) may be used to create a virtual fence around a location and track the physical location of the mobile devices 101 and 102 within the geofence boundary as well as entry and exit of the bounded area.

Machine learning algorithms 186 may include on-device heuristics, machine learning algorithms, or a combination thereof to analyze and assign a label regarding movement or travel of a device to be designated as being "in transit" state or "settled" state in a particular location for a time period. Analysis may be performed using a variety of signals from data sources available to the mobile device 102, including, but not limited to, the following: sensor data, positioning data, calendar data, transit card usage data, application data, historical data on patterns/routines of travel, and/or any other data accessible to the mobile device 102. In some embodiments, a mobile device 102 may be classified with a "settled" semantic label after remaining within the geographic boundaries that define a location (e.g., the trusted location 184) for a defined time period. In the simplest case, positioning data for the mobile device 102 may remain within the boundaries of a geofence for a particular location for a duration of time (e.g., 5 minutes). Sensor data, such as accelerometer data, may indicate that the mobile device 102 is at rest to support an inference of being settled. Application data may support the inference that the mobile device 102 is settled, such as the mobile device being located at a calendar appointment location. Application data indicating a type of application in use may also provide an inference of the device being settled, such as using a media application. Historical data for the user on routines or patterns in travel may be used to determine whether the mobile device 102 is settled, such as a bedtime routine at a home or hotel location. Mobile device 102 may be classified as with an "in transit" label based on prior behavior, patterns, or routines for the user and analyzed on mobile device 102. For example, the user may have routine of going to work around the same time every day and an "in transit" state may be assigned if the data on the device supports that the pattern is being repeated. In the simplest case, a speed at which the mobile device is moving or entering and exiting known geographic areas (e.g., using geofences) may allow for the inferring that the mobile device 102 is in transit. If the mobile device 102 is detected as accelerating in known areas of transit (e.g., on roads, highways, train routes, etc.), then the mobile device 102 may be given the status of "in transit." Similarly, if transit applications/cards are used/in use, then the mobile device 102 may be designated as "in transit".

Figure 2:
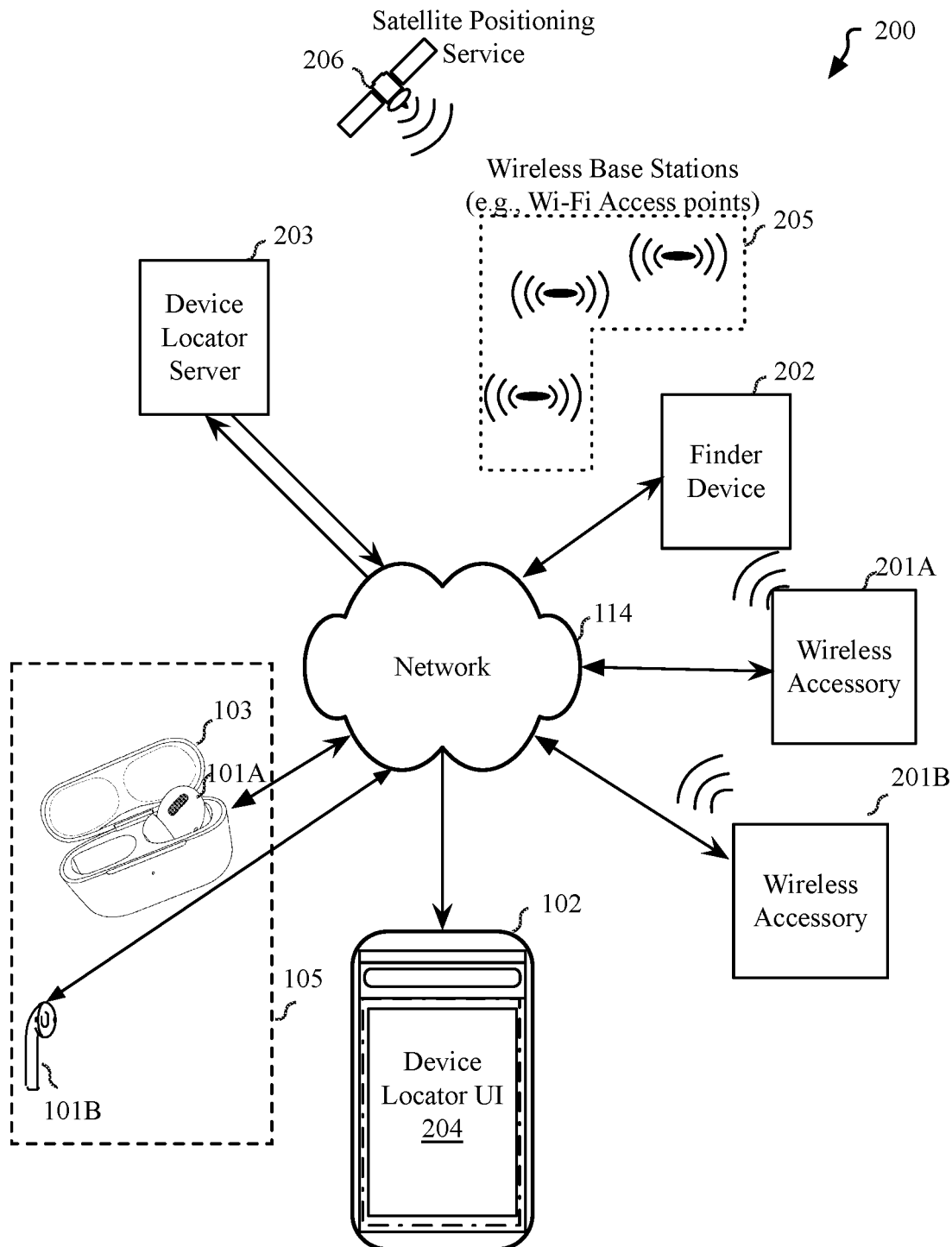
FIG. 2 illustrates a system to locate wireless accessories, according to an embodiment.

FIG. 2 illustrates a system 200 to locate wireless accessories 201A and/or 201B, according to an embodiment. In one embodiment, the wireless accessories 201A and 201B (collectively 201) are another embodiment of accessory devices 101A and 101B (and optionally case 103) that may be paired as part of a device group 105 and may be used interchangeably throughout the description. Each accessory device includes one or more wireless transceivers and can communicate, either directly or indirectly (e.g., through another device or computer) with a companion device (e.g., mobile device 102) over a wireless network or peer-to-peer communication link. Accessory devices 101A is shown in case 103 and may provide the beacon signal for the case 103 and any accessories in the case 103. Accessory device 101B is separated from the case 103 and independently and separately able to be found by providing the beacon signal. Some examples of additional wireless accessory devices 101 include but are not limited to wireless earbuds, EarPods, AirPods, input devices, a charging device, a case for accessories, headphones, headsets, fitness equipment, health equipment, display devices, external hard drives, other wearable devices (e.g., smartwatches, fitness bands, optical head-mounted displays), adapters, speakers, and/or other devices. Paired groups of accessories may be the same type of device (e.g., speakers, AirPods, fitness weights, etc.) or different types of devices (e.g., smartphone and credit card reader, etc.). The wireless accessories 201 can also include other wireless devices such as input devices including, but not limited to credit card reading devices, stylus devices, mouse, keyboard, game controllers or remote controls. The wireless accessories 201, in one embodiment, also includes smartphones, tablet computers, laptop computers, smart speaker devices, televisions, or television set top boxes that at least temporarily are unable to access a wide area network, such as the Internet (e.g., wide area network 114 as in FIG. 1). The wireless accessories 201 can also be any other wireless device, including beacons or locator tags that can be attached to other devices to enable the tracking or locating of those devices. In one embodiment, the wireless accessories 201 can be from a device group of accessory devices that are paired with the mobile device 102 using a wireless technology standard, such as but not limited to Bluetooth. The wireless accessories 201 can also communicate with the mobile device 102 over wireless technologies including the implementation of any wireless standards and protocols, such as Wi-Fi direct, Zigbee, or AirPlay. While the companion device to which the wireless accessories 201 are paired is generally referred to as a mobile device 102, companion devices are not limited to mobile devices. Companion devices, in some embodiments, can also include laptop or desktop devices and can additionally include some wearable accessories, such as but not limited to a smart watch device or a wearable display.

In one embodiment, the wireless accessories 201 can periodically transmit a wireless beacon signal. The wireless accessories 201 can transmit the beacon signal using one of a variety of wireless technologies described herein (e.g., Bluetooth, Wi-Fi, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the individual wireless accessory 201A or 201B and/or a device group 105. In one embodiment, the beacon identifier is a public encryption key associated with the device.

The beacon signal can also convey information about the wireless accessory 201, such device status information and/or verifiable information. Device status information in the beacon signal may include, but is not limited to the following: a beacon type, a device classification, a battery level, any pre-defined device status, a device state, a lost status, an alarm status, a separated from owner status, a near-owner status, a proximate to one or more accessory devices 101 in a device group status, a wired or wireless connection status, a physically connected to one or more accessory devices 101 in a device group status, a pairing status indicating whether accessory device is paired or not paired, a pending pairing status, a battery life state, a charging status, and/or any other status information. The lost or "separated from owner" status can indicate that the wireless accessory 201 has determined itself to be lost or has been placed into a lost state by the owner of the device. The alarm status can indicate that the wireless accessory 201 was placed in a state that the device should trigger an alarm if moved from a current location. The near-owner status can indicate that the wireless accessory 201 has detected the nearby presence of the mobile device 102 associated with the owner of the accessory.

In some embodiments, verifiable information may include any information that may be needed to establish trust or authority that a pairing process and/or finding process may proceed with the device presenting the verifiable information. By way of example, verifiable information may include information established by a device manufacturer, such as a serial number or set of serial numbers in a device group 105. In some embodiments, the verifiable information may include status or state information for the device. The verifiable information may include, but is not limited to, the following: a device type, a member of device group, a serial number, a device group, serial numbers of other devices within a device group, state or status information, a software version, and/or any other verifiable information. Verifiable information may be sent to the certificate authority 106 or other attestations service to verify received information presented by the device to another device. Verifiable information may be encrypted and/or sent with a token to allow for further verification of the device.

In some embodiments, the beacon signal can be detected by a finder device 202, which is locally proximate to the wireless accessory 201A or 201B in order to use crowdsourcing to locate a lost wireless accessory 201. The finder device 202 can be a similar device as the mobile device 102 and can receive and transmitting data over a wide area network 114 and receiving and transmitting using similar wireless technologies as the wireless accessory 201 (e.g., Bluetooth, etc.). Particularly, the finder device 202 can receive data using the wireless protocol over which the beacon signal is transmitted. The finder device 202 can determine a location using one or more location and/or positioning services including, but not limited to a satellite positioning service 206 or a terrestrial positioning system using RF signals received from wireless base stations 205 such as Wi-Fi access points or cell tower transmitters of a cellular telephone network. In an embodiment, the finder device 202 periodically stores its location as determined based on the one or more location and/or positioning services. The stored location can be associated with a timestamp for which the location was determined. When the finder device 202 receives a beacon signal from the wireless accessory 201, the finder device 202 can transmit a location for the finder device 202 over the wide area network 114 to a device locator server 203. The timestamp for a determined location for the finder device 202 can be correlated with a timestamp for which a beacon signal was received to associate a geographic location with a received beacon signal.

Where the wireless accessory 201 provides a public key within the beacon signal, the finder device 202 can encrypt the determined location data and transmit the encrypted location data to the device locator server 203 over the wide area network 114. In one embodiment, additional data can either be encrypted and transmitted along with the location data or transmitted unencrypted to the device locator server 203. For example, a received signal strength indicator (RSSI) for the beacon signal can be transmitted along with the location data. The RSSI data can then be used to determine the distance of the wireless accessory 201 from the finder device 202 and assist in triangulation on the owner device. Where the RSSI data is transmitted in an unencrypted state, in one embodiment the server can use RSSI information to reduce noise by discarding very weak signals if other, stronger signals are present. In one embodiment, UWB ranging data can also be provided, where such data is available.

In one embodiment, the finder device 202 can behave differently upon receiving a beacon signal from a wireless accessory 201 depending upon a device status conveyed by the wireless accessory 201. For standard beacon signals, the finder device 202 can place encrypted location data into a queue and transmit the location data to the device locator server 203 during a periodic transmission window. However, if the wireless accessory 201 is indicating an alarm state, the finder device 202 can transmit the location data to the device locator server 203 immediately. Additionally, the finder device 202 may not transmit the location data to the device locator server 203 if the beacon signal of the wireless accessory 201 indicates that the accessory is near the owner of the accessory. Alternatively, the finder device 202 may delay transmission of encrypted location data.

If the owner of the wireless accessory 201 wishes to locate the wireless accessory, the owner can access a device locator user interface 204 on the mobile device 102. The device locator user interface 204 can be associated with a device locator application that is used to locate electronic devices and accessories that are registered with an online account of the user, such as a cloud services account or another type of online account. The device owner, using the device locator UI 204, can query the device locator server 203 for location data that may have been transmitted to the device locator server by a finder device 202 of the wireless accessory 201. In one embodiment, the mobile device 102 can transmit the public encryption key associated with the wireless accessory 201 to the device locator server 203. The device locator server 203 can then return any stored location data that corresponds with the public encryption key. The location data returned to the mobile device 102 can be encrypted data that is encrypted by the finder device 202 using the public encryption key. The mobile device 102 can use an associated private key to decrypt the encrypted location data. The decrypted location data can then be processed by the mobile device 102 to determine a most probable location for the wireless accessory 201. In various embodiments, the most probable location for the wireless accessory 201 can be determined by triangulation from multiple received locations and using other data, such as a beacon signal RSSI associated with each location and timestamp or UWB ranging data included within the location data.

Figure 3:
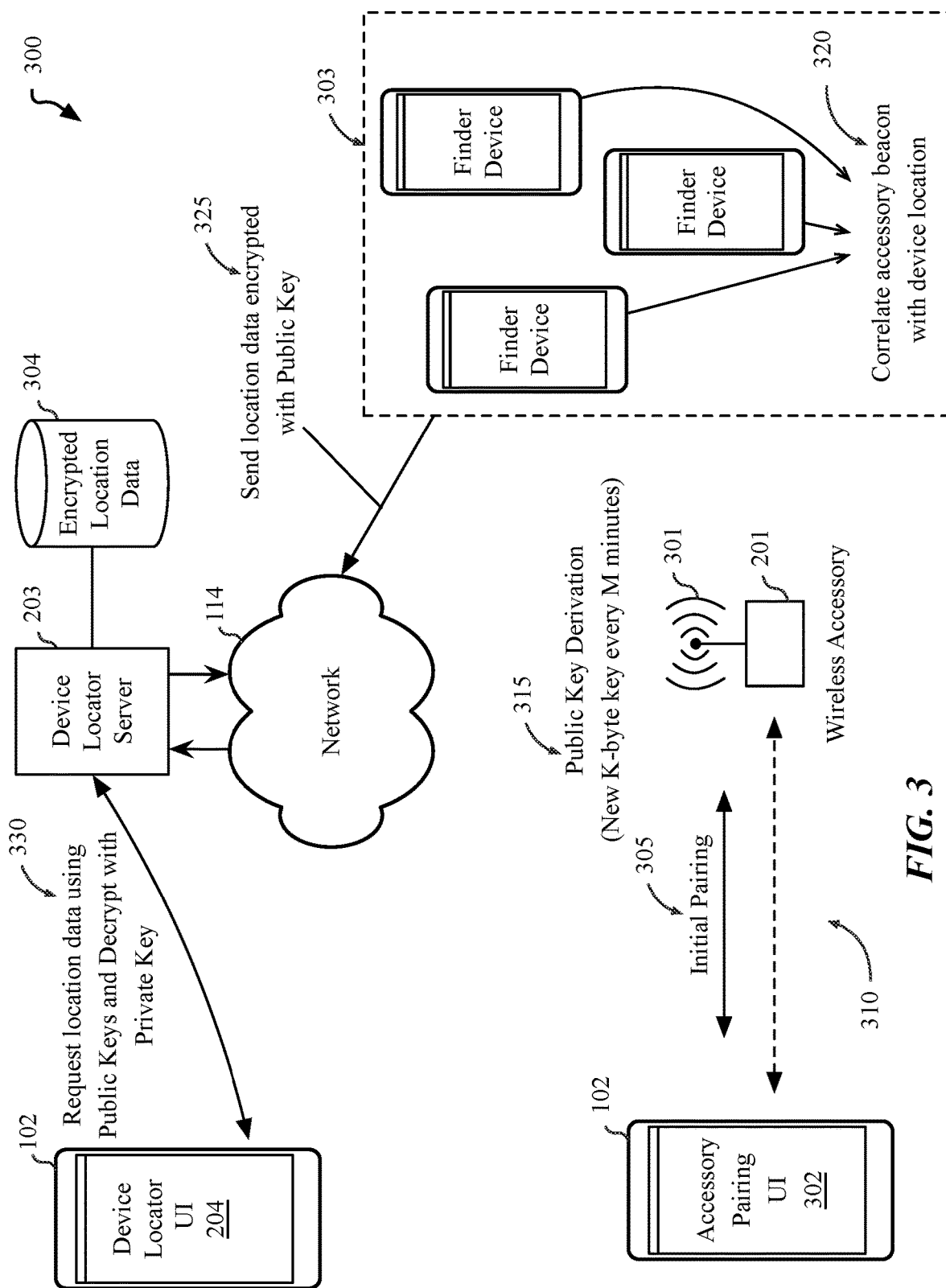
FIG. 3 illustrates a system for pairing and locating a wireless accessory, according to embodiments described herein.

FIG. 3 illustrates a system 300 for pairing and locating a wireless accessory, according to embodiments described herein. In one embodiment a mobile device 102 of a user of the wireless accessory 201 (e.g., example of device 101A, 101B, or 103) can present an accessory pairing UI 302 by which the user can pair the mobile device 102 with the wireless accessory 201. During an initial pairing (305) between the mobile device 102 and the wireless accessory 201, a public key exchange (310) can be performed between the mobile device and the wireless accessory 201. In one embodiment, during the public key exchange (310) the mobile device 102 and the wireless accessory 201 exchange public keys of public key pairs generated by the device and the accessory 201. In one embodiment the public key exchange (310) is a one-way transfer, in which the mobile device 102 transmits a public key of a public/private key pair to the wireless accessory 201. Alternatively, or additionally, the public key exchange (310) may be a Diffie-Hellman key exchange in which the device and the accessory establish a shared secret between two parties. In one embodiment, the public key exchange (310) additionally uses elliptic curve cryptography to establish the shared secret. For example, Elliptic-curve Diffie-Hellman (ECDH) can be used to enable the establishment of a public key pair and one or more shared secrets. In one embodiment, the one or more shared secrets include an anti-tracking secret, which can the wireless accessory 201 to periodically derive additional public keys.

After the wireless accessory 201 has been paired with the mobile device 102, the wireless accessory 201 can periodically broadcast a beacon signal 301 that includes device status information and a beacon identifier. In one embodiment the beacon identifier is a public key derived from a shared secret that is established during the public key exchange (310). Additionally, the wireless accessory 201 can periodically perform a public key derivation (315) to generate a new public key and begin broadcasting the new public key as the beacon identifier. The public key is a K-byte key, with a new K-byte key generated every M minutes. The value K and M can vary between embodiments. In one embodiment, a K value of 28 bytes is used. In one embodiment, a K value of 27 bytes is used. The value K can be determined at least in part based on the beacon length associated with the wireless protocol used to transmit the beacon signal 301. In one embodiment, the beacon signal can transmit a variant of beacon advertisement packet associated with a low-energy radio protocol, such as Bluetooth Low Energy.

The value M, in one embodiment, is 15 minutes, such that a new K-byte key is generated every 15 minutes. The public key can be derived deterministically based on a timestamp and an anti-tracking secret generated during the public key exchange 310. The public key derivation (315) process enables the wireless accessory 201 to use different keys over time, preventing the long-term association with a specific key with a specific device. The key can be derived based on an anti-tracking secret known only to the mobile device 102 and the wireless accessory 201, allowing the mobile device 102, and only the mobile device, to determine which public key will be broadcast by the wireless accessory 201 at any given timestamp. The anti-tracking secret can be generated along with an ECDH public key and transferred to the wireless accessory 201. The anti-tracking secret can then be used to enable the wireless accessory 201 to generate a sequence of public keys $P_i$. In one embodiment, the sequence of public keys $P_i = \lambda_i \cdot P$, which defines a group operation between a scalar or exponent value $\lambda_i$ and group elements, such as, for example, Elliptic Curve points P. The scalar or exponent value $\lambda = KDF(AT, i)$, where KDF is a key derivation function, AT is the anti-tracking secret, and i is a counter or timestamp.

In one embodiment, backtracking resistance can be enabled to protect the anti-tracking secret in the event the wireless accessory 201 is compromised. When backtracking resistance is enabled, the anti-tracking secret is transferred to the wireless accessory 201 but is not retained by the wireless accessory. Instead, the accessory computes a value $\lambda_{i+1} = H(\lambda_i \| time)$, with $\lambda_0 = AT$ and H being a cryptographic hash function. The wireless accessory 201 then stores $\lambda_i$ for a given time period i. If the wireless accessory 201 is compromised, only $\lambda_i$ for current and future values of i is exposed, without exposing the anti-tracking secret AT. In one embodiment, backtracking resistance is performed by periodically writing $\lambda_i$ to non-volatile memory of the wireless accessory 201.

In one embodiment the wireless accessory 201 can transmit the beacon signal 301 every two seconds, although other beacon rates can be used, and the beacon rate can vary under certain circumstances. For example, the wireless accessory 201 can decrease a beacon rate when in a near-owner state. Beacon rate can also vary based on accelerometer triggered events. For example, the wireless accessory 201 can increase the beacon rate when in an alarm state, which can be triggered by the accelerometer on the wireless accessory 201.

The wireless accessory 201 can enter the near-owner state if, after transmitting the beacon signal 301, the wireless accessory 201 receives a reply from the mobile device 102 associated with the user of the accessory, which indicates that the mobile device 102 is within range of the wireless accessory. Additionally, while the wireless accessory is in the near-owner state, the amount of data transmitted by the beacon signal 301 may be reduced. In one embodiment, the rate at which new public keys are generated can also be reduced while the wireless accessory is in the near-owner state.

The wireless accessory 201 can enter an alarm state upon receiving a message from the mobile device 102 that indicates that the wireless accessory 201 should enter the alarm state. When in the alarm state, the wireless accessory can initially enter an armed state in which the wireless accessory 201 can reduce or cease the transmission of locator beacon signals, although other types of wireless signaling can persist. The wireless accessory 201 can remain in the armed state until the state is deactivated by the mobile device 102 or alarm is triggered. The alarm can be triggered, in one embodiment, upon detection of movement, for example, via an accelerometer within the wireless accessory 201. The alarm can also be triggered, in one embodiment, upon detection that the wireless accessory has moved out of range of the mobile device and is no longer in the near-owner state. When the alarm is triggered, the rate at which the beacon signal 301 can be increased, to increase the speed by which the wireless accessory 201 can be located.

The beacon signal 301 transmitted by the wireless accessory 201 can be detected by a set of finder devices 303 (finder devices may be finder device 202) and/or the mobile device 102, which are other electronic devices that can receive the beacon signal transmitted by the wireless accessory and are transmit location and other data associated with the beacon signal 301 to the device locator server 203 via the wide area network 114. In one embodiment the set of finder devices 303 include variants of the mobile device 102 or can be other types of electronic devices. For example, the set of finder devices 303 can perform operations (320) to correlate the beacon signal 301 received from the wireless accessory 201 with a device location associated with the finder device 303. As described with respect to FIG. 2, the device location can be determined via a satellite positioning service or a terrestrial positioning system that uses RF signals received from wireless base stations (e.g., Wi-Fi access points or cell tower transmitters). In one embodiment the set of finder devices 303 can also include stationary devices such as smart speaker devices, televisions, or television set top boxes that can receive the beacon signal 301.

The set of finder devices 303 can encrypt the location data with the beacon identifier (e.g., public key) received within the beacon signal 301 and send the location data (325) to the device locator server 203. The data sent by the set of finder devices 303 is send anonymously and no identifying information for the finder devices is stored with the data sent by the finder devices.

The device locator server 203 can store encrypted location data in a data store 304, which in one embodiment can be a distributed database having multiple nodes. Hashes of the beacon identifier/public key of an accessory can be sent along with encrypted location data. The encrypted location data can be stored to a database node based on a hash of the beacon identifier. The encrypted location data can be indexed by the device locator server 203 using the hash of the beacon identifier. Sending the hash of the beacon identifier instead of the full beacon identifier prevents the storage of the full beacon identifier to the server. Other information can also be sent and stored with the location data, either in an encrypted or unencrypted state. The other information can include timestamps for when the beacon signal 301 was received, RSSI information for the received beacon, and/or ranging information determined, for example, via UWB ranging.

When the user or owner of the wireless accessory 201 wishes to locate the accessory, the user or owner can access the device locator UI 204 on the mobile device 102. The device locator UI 204 can be associated with a locator application 190 or feature of the mobile device 102. The device locator UI 204 may also have a web-based interface that can be accessed from the mobile device 102 or another type of electronic device, such as a laptop or desktop device. The mobile device 102, upon loading the device locator UI 204, can send a request (330) for location data to the device locator server 203. The request 330 can include a set of public keys or public key hashes, which can serve as beacon identifiers for the beacon data. The mobile device 102 can generate the set of public keys based on the secret information held by the mobile device 102 and the wireless accessory 201 and the timestamps over which the mobile device 102 wishes to receive location data. In one embodiment the set of public keys is the sequence of public keys $P_i$ that are generated based on the anti-tracking secret. The sequence of public keys $P_i$ corresponds to a matching sequence of private keys $d_i$. The mobile device 102 can generate the sequence of public keys, as well as the corresponding sequence of public keys $d_i$, where i is a counter or timestamp. In one embodiment, the mobile device 102 can generate and send the previous 24 hours of public keys (or hashes of the 24 hours of public keys) within the request 330. If no data is found for 24 hours of public keys, the mobile device 102 can send generate keys for an earlier period, back to a pre-determined location data retention limit.

In one embodiment the encrypted location data is stored and indexed based on a hash of the public key instead of the public key to prevent the provider of the location service data from storing data that can be used to tie the encrypted location data to a specific device, and thus a specific user or user account. The finder device can send the hash of the public key that is broadcast within the beacon signal 301 associated with an observation location. The owner of the device can query the device locator server 203 using a hash of the public key that is determined for a query period.

In some embodiments, if a location query is to be performed via the web-based interface from an electronic device, such as a laptop or desktop device, keys to enable the decryption of the location data may be required to be sent to the electronic device. In one embodiment, decryption keys for the location data may be sent to the server that provides the web-based interface to enable the server to decrypt location data, at least while the location data is being viewed through the web-based interface. Before location data is displayed via the web-based interface, a notice may be presented to inform the user that location decryption keys are being temporarily shared with the web-based interface server to enable location data to be decrypted and presented. In one embodiment, the sharing of the location decryption keys can be performed via an automatic and temporarily delegation of location query rights with a proxy account associated with the web-based interface.

In one embodiment, the wireless accessory 201 can be placed in a light lost mode. In the light lost mode, a set of future public keys can be generated for the wireless accessory and transmitted to the device locator server 203. The device locator server 203 can then notify the mobile device 102 if any location data is received that correspond with a key in the set of future public keys. In one embodiment, a finder device that sends a location for a wireless accessory that is in the light lost mode can be directed by the device locator server 203 to relay a message to the wireless accessory 201 that notifies the wireless accessory that it is in the light lost mode. A similar mechanism can be used to relay a message to the wireless accessory 201 that places the accessory in an explicit lost mode. The explicit lost mode can be enabled by the user via the device locator UI 204. In the explicit lost mode, the wireless accessory 201 cannot be paired with another device unless unlocked by the owner. Additional examples of paired devices using location services may be found in U.S. patent application Ser. No. 16/543,227 filed Aug. 16, 2019 entitled "A System and Method for Locating Wireless Accessories," which is incorporated by reference herein in its entirety.

Figure 4:
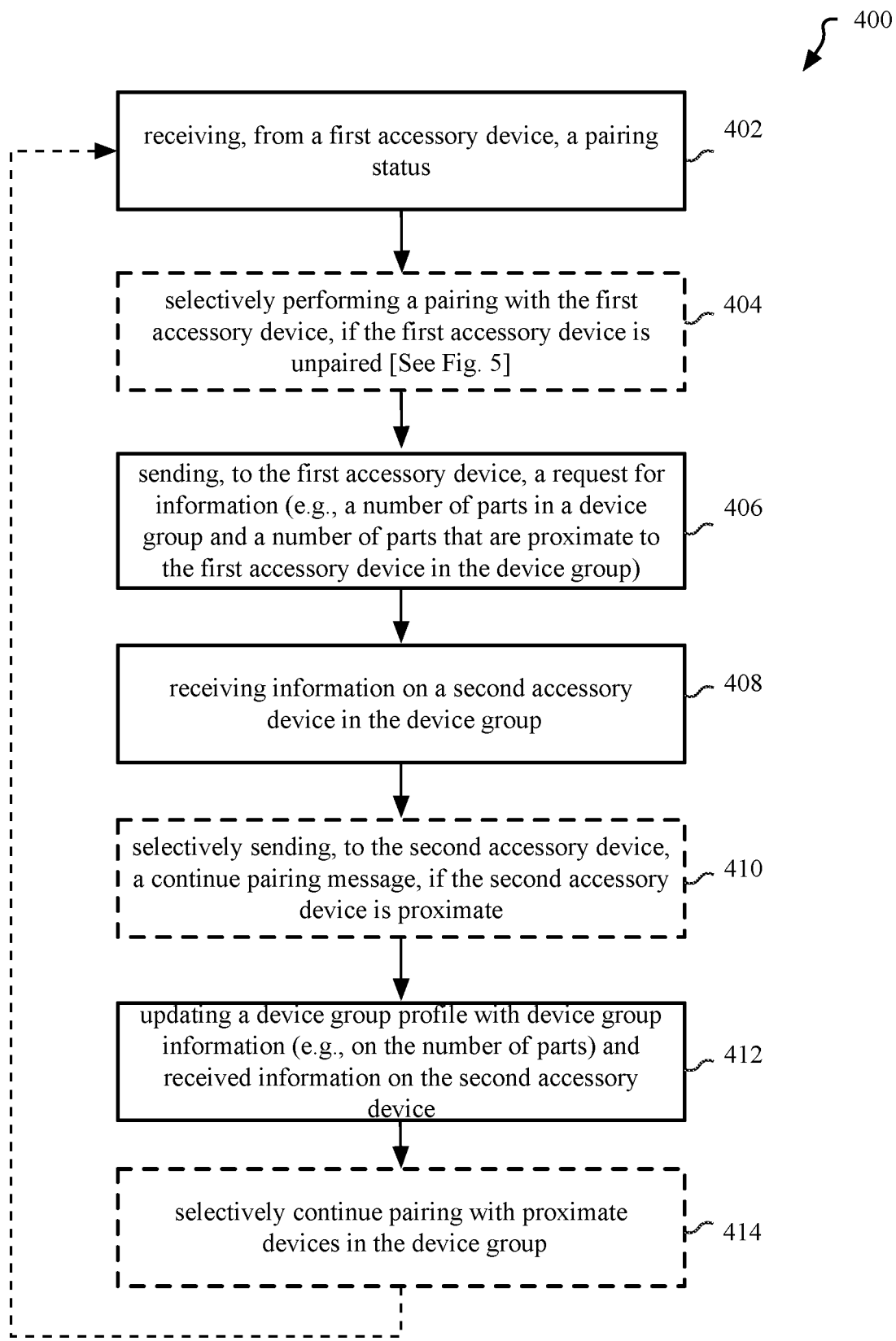
FIG. 4 is a flow diagram illustrating a method for pairing a group of accessory devices, according to embodiments herein.

FIG. 4 is a flow diagram 400 illustrating a method for pairing a group of accessory devices, according to embodiments herein. Mobile device 102 may receive, from a first accessory device 101A, a pairing status (402) indicating whether the first accessory device 101A is paired or not. A pairing between the devices exists when the mobile device 102 has access to at least one key associated with the first accessory device for a user account (e.g., a cloud-based account) for the mobile device 102. Pairing status, status information, and/or verifiable information may be provided in the beacon signal indicating whether the first accessory device 101A is currently paired, pending pairing, or unpaired.

Figure 5:
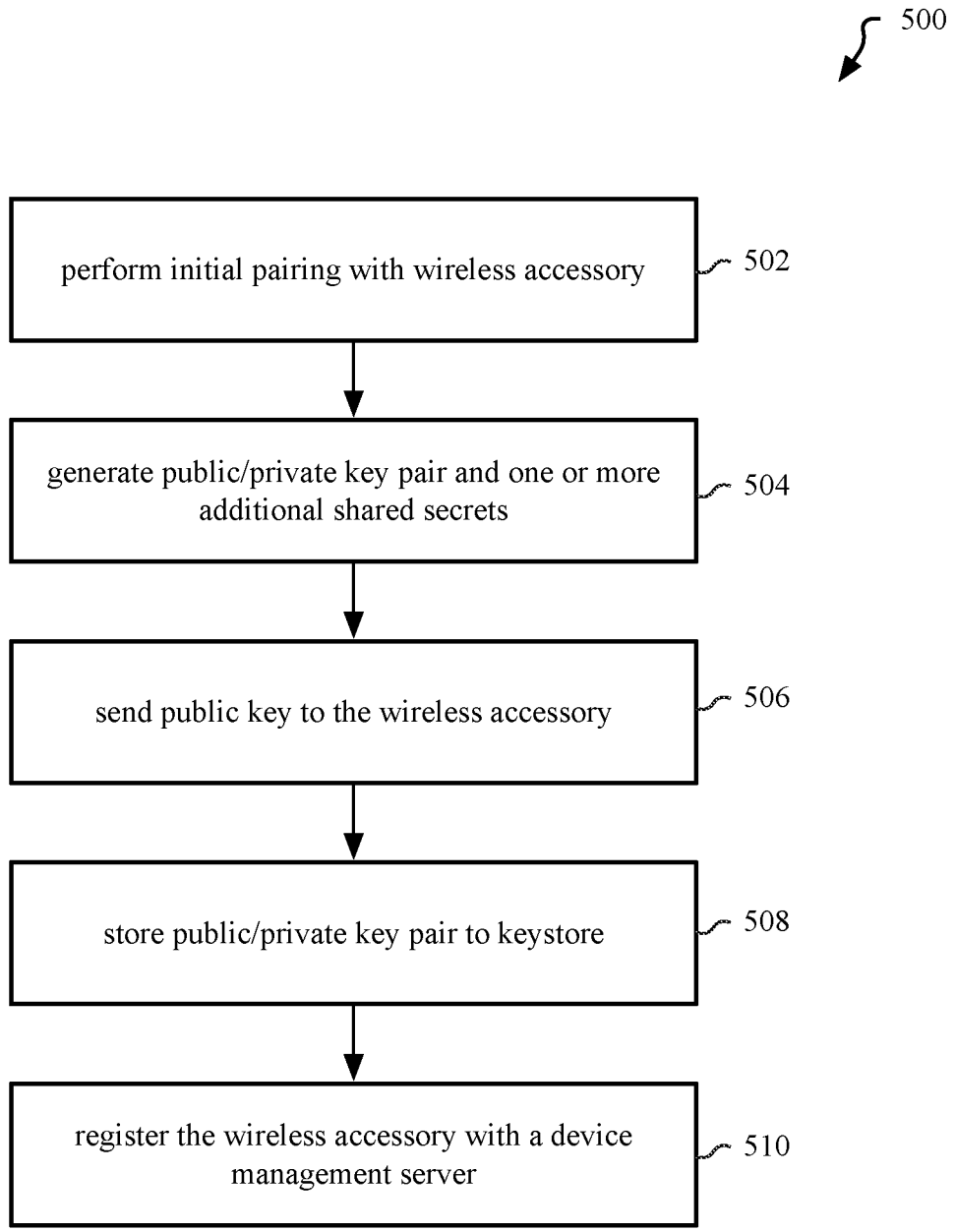
FIG. 5 is a flow diagrams illustrating methods for use with the device locator systems described herein.

If the first accessory device 101A is not currently paired the mobile device 102 according to the pairing status, then a pairing process may selectively begin (404), as shown in FIG. 5. In some embodiments, the pairing status may indicate that pairing is pending for the first accessory device 101A and a device group profile for the device group 105 may be retrieved from a device locator server 203 database. The device group profile may be part of a data model for device groups with location data that is crowd sourced with device locator service 170. Device group profiles may be stored on mobile devices 102 and synchronized between devices linked to a cloud-based account. Additionally, device group profiles may be stored in databases on mobile devices 102 and device locator server 203. A device group profile, by way of example, may record relationships between accessory devices, status information, and verifiable information received from accessory devices and/or device manufacturers. The device group profile may be updated with information received via mobile device from accessory devices 101. Device group profiles may include, but is not limited to, the following information: number of accessory devices in device group, number of paired devices, serial numbers of accessory devices in device group, pairing status of accessory devices, and any other information for providing device location services 170. As such, any status and/or verifiable information previously stored in a device group profile may be compared to status information and/or verifiable information received from devices in the device group 105 and stored in the device profile for the device group 105. The pairing process may cease, if there is a mismatch of information between information received from the first accessory device 101A and the device profile and/or if received verifiable information from the first accessory device 101A cannot be verified, in some embodiments. Each member device or accessory device 101 that is a part of the device group 105 may be a beaconing peripheral device that is separately identifiable to allow for finding and verifying all accessory devices 101 in the device group 105.

The first accessory device 101A may provide verifiable information in the beacon signal that may be verified with a certificate authority or other attestation service that the first accessory device 101A has a serial number consistent with a device from the device group 105 as expected from the device manufacturer or user defined device group. Further, the certificate authority or other attestation service may use the verifiable information to attest to the first accessory device 101A having a particular device manufacturer. Those with skill in the art will recognize that there are a variety of ways for verification of information provided by the first accessory device that may be performed prior to proceeding with the pairing process to confirm that the first accessory device may be trusted.

Alternatively, if the first accessory device 101A does not provide verifiable information, then the pairing process may not proceed. Embodiments may require that the first accessory device 101A provide verifiable information (e.g., cryptographically verifiable information, such as a certificate and/or token) for the first accessory device 101A to begin pairing, including, but not limited to, the following: a serial number, a manufacturer identifier, a software version, an indication that the accessory device is part of a device group of accessories devices, expected accessory device identifiers for other accessory devices in the device group, expected number of accessory devices in device group, and/or any other information. In an embodiment, the verifiable information may be cryptographically verifiable and certified by the certificate authority 106.

A request may be sent to the first accessory device 101A for information on accessory devices in the device group (406). For example, information requested may include an indication that the accessory device 101A is a multi-part device or part of a device group 105, a number of devices in the device group 105, and a number of devices that are proximate to the first accessory device 101A in the device group (406). Received accessory device information on the device group 105 may be stored in the device group profile and referenced for the pairing process by the mobile device 102.

Information may be received on a second accessory device 101B in the device group 105 (408). The information received from the first accessory device 101A on the second accessory device 101B may assist in further pairing of the remaining unpaired accessory devices in the device group 105. In an embodiment, if the second accessory device 101B is proximate to the first accessory device 101A, then the first accessory device 101A may send verifiable information on the second accessory device 101B. A continue pairing message may be sent to the second accessory device, if the second accessory device is proximate (410) to attempt to pair the second accessory device 101B. If the second accessory device is not proximate and/or the pairing is unsuccessful, then the verifiable information for the second accessory device may be stored in the corresponding device group profile. Second accessory device 101B information may be stored to be accessible to the mobile device 102 for later attempts to pair the second accessory device 101B in the device group profile and the pairing status for the second accessory device may be set to "pending pairing." Alternatively, if received information from the second accessory device 101B is consistent with the verifiable information from the first accessory device 101A, the pairing process may proceed in FIG. 5 to pair second accessory device 101B. For ease of description, only the pairing of two accessory devices is described, those with skill in the art will recognize that pairing may continue for any number of accessory devices when accessory devices in the device group provide verifiable information to mobile device 102.

The device group 105 information on the number of parts, received information on the second accessory device, and any other status information and/or verifiable information may be stored (412). If the device profile for the device group 105 does not exist, then the device group profile for the device group 105 may be created. The device profile may be updated to store information on the device group 105 that is received from the accessory devices 101 and/or mobile device 102. Information that may be stored in the device group profile includes, but is not limited to, the following: verifiable information received on devices in the device group 105, last received beacon signals (e.g., status, advertisements, proximity information, location data, etc.) received from any device within the device group 105 and any other information for pairing and/or using the devices in the device group 105. Optionally, the pairing may continue with other proximate devices to either first and/or second accessory device 101 (414). The next device to pair may be viewed as the first accessory device and the process may continue (402).

FIG. 5 is a flow diagrams illustrating methods for use with the device locator systems described herein. FIG. 5 illustrates a method 500 to pair a mobile device with a wireless accessory. Aspects of method 500 are also illustrated in FIG. 2 and FIG. 3, as described above. For example, the description of the operations below refers to the mobile device 102, wireless accessory 201 and device locator server 203.

As shown in FIG. 5, method 500 includes an operation (502) that performs an initial pairing with a wireless accessory. The initial pairing can be a Bluetooth pairing or another type of pairing using other wireless radio technologies. During the initial pairing, the mobile device and the wireless accessory can exchange identifiers, passkeys, or other credentials that enables a wireless data exchange to be performed between a mobile or another electronic device and the wireless accessory. On one embodiment the initial paring with the wireless accessory can include the exchange of credentials associated with the wireless protocol for which the pairing is performed, allowing all data exchanged wirelessly to have at least a first layer of encryption.

The mobile device can then generate a public/private key pair and one or more additional shared secrets (504). The device can then send the public key and one or more additional shared secrets to the wireless accessory (506). A variety of key generation techniques can be used. In one embodiment, a variant of ECDH is used to generate a public key pair for encryption. In one embodiment, the one or more additional shared secrets can include an anti-tracking secret that enables the wireless accessory to derive a new public key based on an existing public key.

After generating the public/private keypair and one or more additional shared secrets, the mobile device can store public/private key pair to keystore (508). In one embodiment the keystore is a cloud-based keystore that can be synchronized with other devices associated with the same cloud services account, or family of cloud services accounts, to which the mobile device and wireless accessory are associated. The cloud-based keystore allows the wireless accessory to be located by other synchronized devices. The mobile device can then register the wireless accessory with a device management server (510). Registering the wireless accessory with the device management server can form an association between the wireless accessory and the cloud services account to which the mobile device is associated. In some embodiments, the mobile device may register the wireless accessory and the device group 105. Information stored in a device group profile for the device group 105 may also be synchronized between devices tied to a cloud services account (e.g., a user account). The device management server can be associated with other cloud-based servers that are used to facilitate cloud-based services accessible to the mobile device, such as the device locator server 203 of FIG. 2 and FIG. 3.

Figure 6:
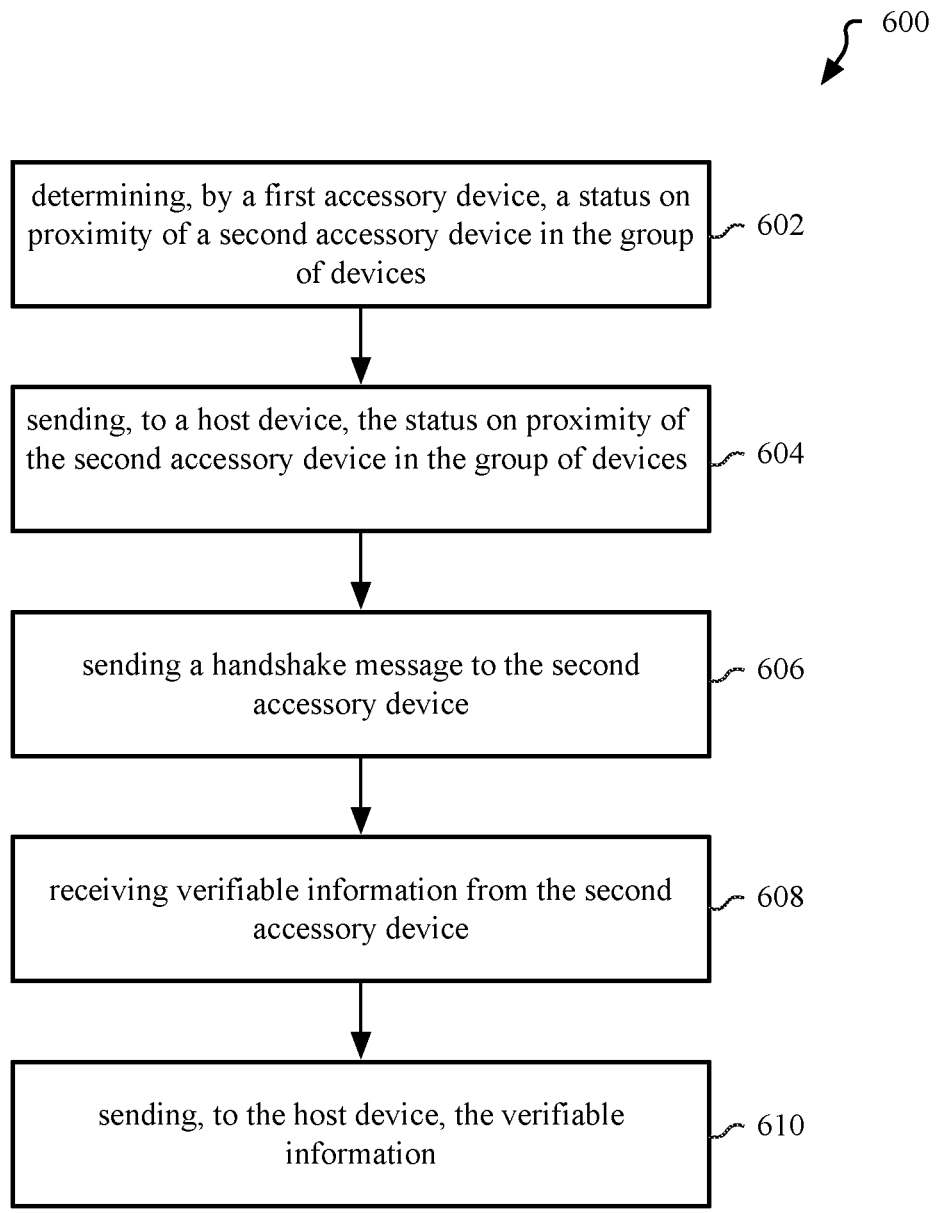
FIG. 6 is a flow diagram illustrating a method for pairing a group of accessory devices, according to embodiments herein.

FIG. 6 is a flow diagram 600 illustrating a method for pairing a device group of accessory devices, according to embodiments herein. A first accessory device 101A may send a status to the host mobile device 102 on a pairing status to the host device (e.g., mobile device 102) and verifiable information on the first accessory device 101A. If the first accessory device 101A is not paired to the host mobile device 102, then a pairing process in FIG. 5 may selectively be performed at the discretion of the mobile device 102 as described with FIG. 4. The first accessory device 101A may determine a status on proximity of a second accessory device 101A in the device group 105 (602) and the status is sent to a host mobile device 102 (604). For example, the first accessory device 101A may be proximate to the second accessory device 101, if the devices are in the same case 103, if the devices are wirelessly connected, and/or if the first accessory device 101A can discover or receive a beacon signal from second accessory device 101B.

Next, a handshake message is sent to the second accessory device 101B (606). The handshake message is a message to establish communication between the accessory devices 101. In response to the message, the first accessory device 101A may receive the verifiable information from the second accessory device 101B (608). The host mobile device 102 is sent the verifiable information (610) that may be stored in a profile and used for pairing of the second accessory device 101B.

Figure 7:
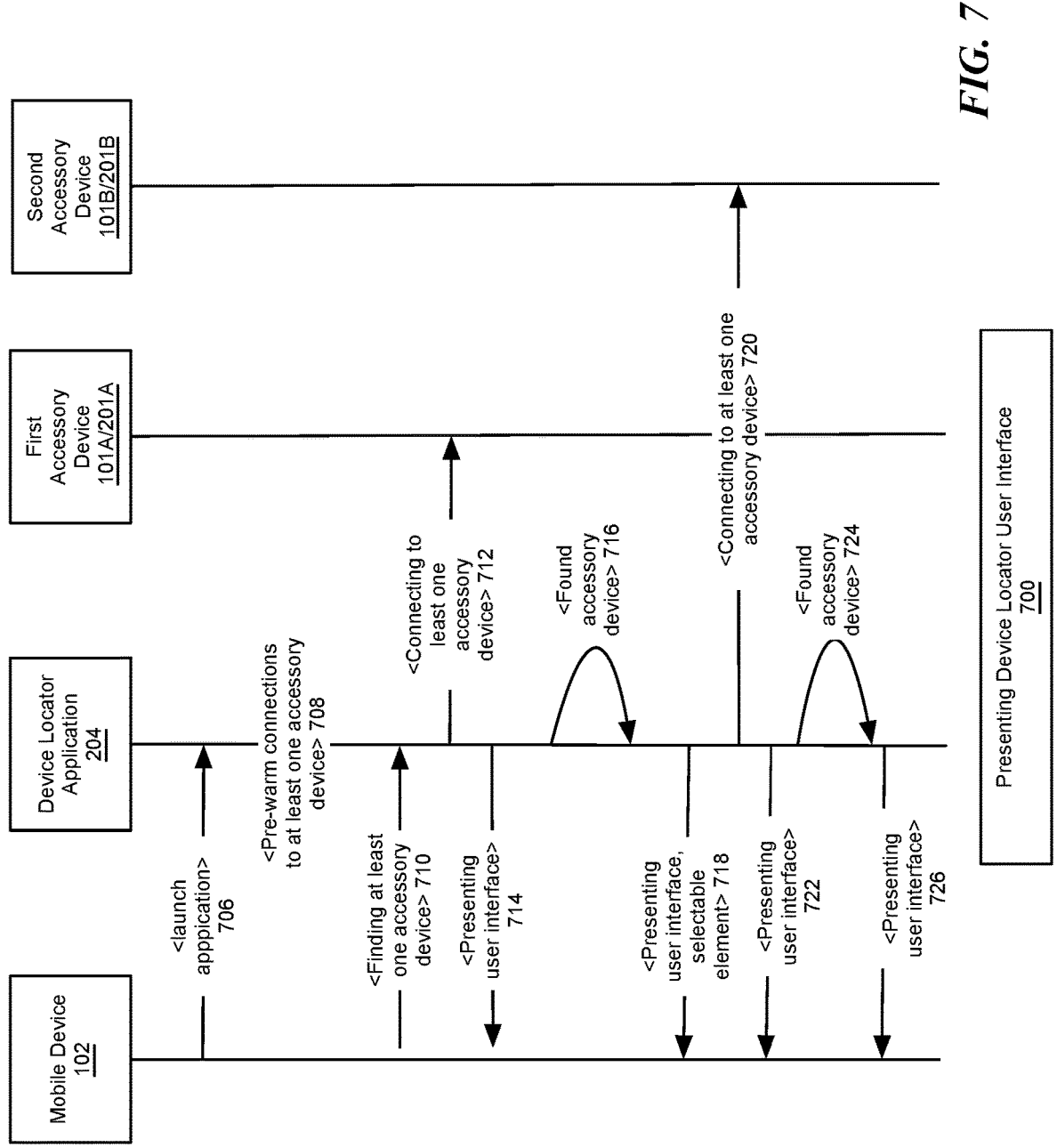
FIG. 7 is a sequence diagram illustrating methods to present a device locator user interface for use with the device locator systems described herein.

FIG. 7 is a sequence diagram 700 illustrating methods to present a device locator user interface for use with the device locator systems described herein. Accessory devices 101 of a device group 105 may be separately and independently found in the finding experience. When the accessory devices 101 of the device group are physically connected, at least one accessory device 101A from the device group that is physically connected to another accessory device 101B may provide the beacon signal to find the device group 101. For example, the beacon signal for a single AirPod 101A may be used to find all of the AirPods in the case 103.

In an embodiment, accessory devices 101 may be in range for wireless connections (e.g., Bluetooth connections), but may not be currently connected. The accessory devices 101 may be together or in different places within a location, such as a first accessory device 101A in a bedroom and a second accessory device 101B in a garage at a home. Mobile device 102 may launch a device locator application 204 (706). Device locator application 204 may request to pre-warm connections to at least one accessory device (708) in the device group 105. For example, device locator application 204 may cause mobile device 102 to pre-warm connections by initiating or attempting to establish wireless connections to accessory devices 101A and/or 101B in device group 105. In some embodiments, there is a delay period before the wireless connection is established, such as six seconds. In some embodiments, whether in parallel or sequentially attempting to establish the wireless connection, device locator application 204 may request information on a last known location for accessory devices 101 from device locator service 170.

The mobile device 102 may establish a connection with accessory device 101A or the mobile device 102 may request the last known location for accessory device 101A as determined from previously received advertisements. After the user finds the accessory device 101A (710), the connection between device 102 and accessory device 101A is established (712). In some embodiments, if the user places the accessory device 101A in the case 103, the accessory device 101A and/or case 103 may detect the physical connection with the accessory device 101A and communicate that the accessory device 101A has recently been put in the case 103. In response to the detection that the accessory device 101A being put in the case 103, the finding experience may continue in order to find the next accessory device 101B. The user interface 204 may be presented (714) with information on the location for the found accessory device 101A (716). A selectable user interface element may be presented with the user interface querying the user whether to continue finding accessory devices in the group 105 (718) and the finding experience may continue for the next accessory device 101B, if the next accessory device 101B needs to be located as determined by the user with the selectable user interface element. If the user selects to continue the search by selecting the selectable user interface element, then mobile device 102 may connect to at least one accessory device 101B that needs to be found (720). User interface 204 may be presented with location information received in the beacon signal (722) to guide the user to find the remaining accessory devices (e.g., 101B) until the accessory device 101B is found (724). The user interface 204 may present that the accessory device is found (726).

Figure 8:
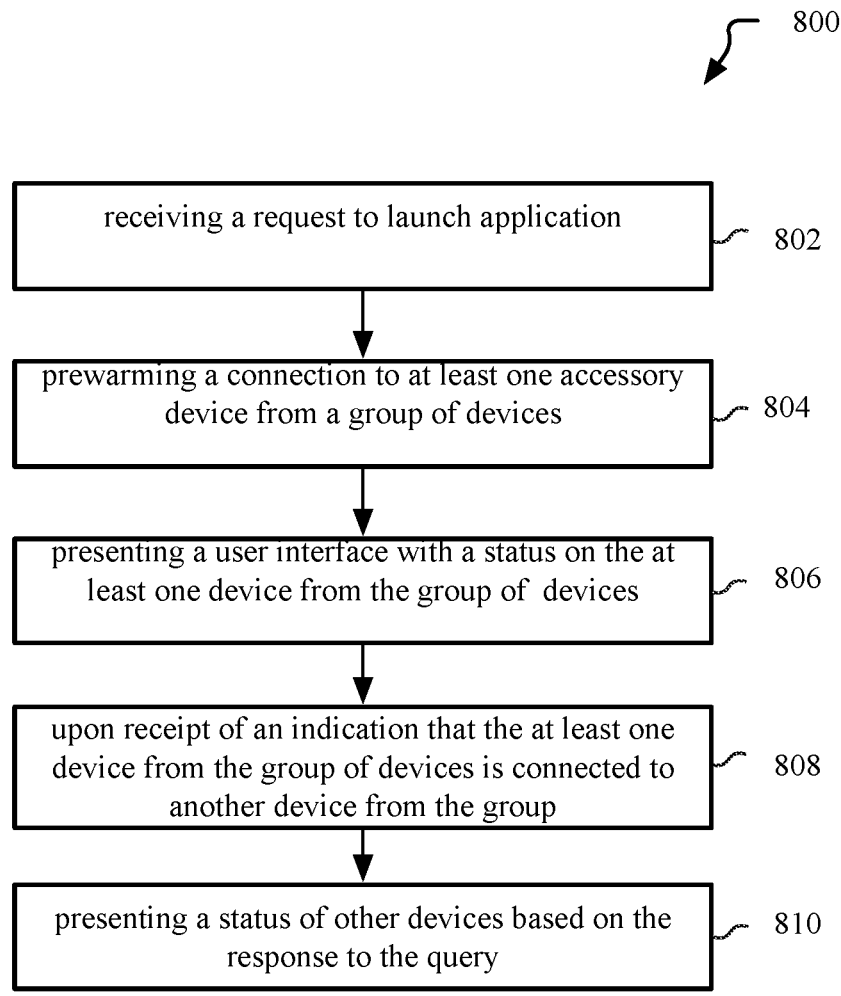
FIG. 8 is a flow diagram illustrating methods to present a device locator user interface for use with the device locator systems described herein.

FIG. 8 is a flow diagram illustrating methods to present a device locator user interface for use with the device locator systems described herein. A request may be received to launch application (802). A connection may be pre-warmed to at least one accessory device from a group of devices (804). In some embodiments, previously received beacon signals may indicate status information such as whether accessory devices in the device group are separated or together while the connection is attempted. A user interface may be presented with a status on the at least one device from the device group (806). Upon receipt of an indication that the at least one device from the device group is connected to another device from the group, a selectable element may be presented with a query on whether to continue to find devices from the group of devices (808). In some embodiments, an indication that at least one device is physically connected to the case 103 is a good indicator that the other device may also have been found. A status of other devices may be presented based on the response to the query (810). For example, the mobile device may begin a finding experience to locate the second accessory device 101B, if the selectable element is selected to continue with finding devices from the device group 105.

Figure 9A:
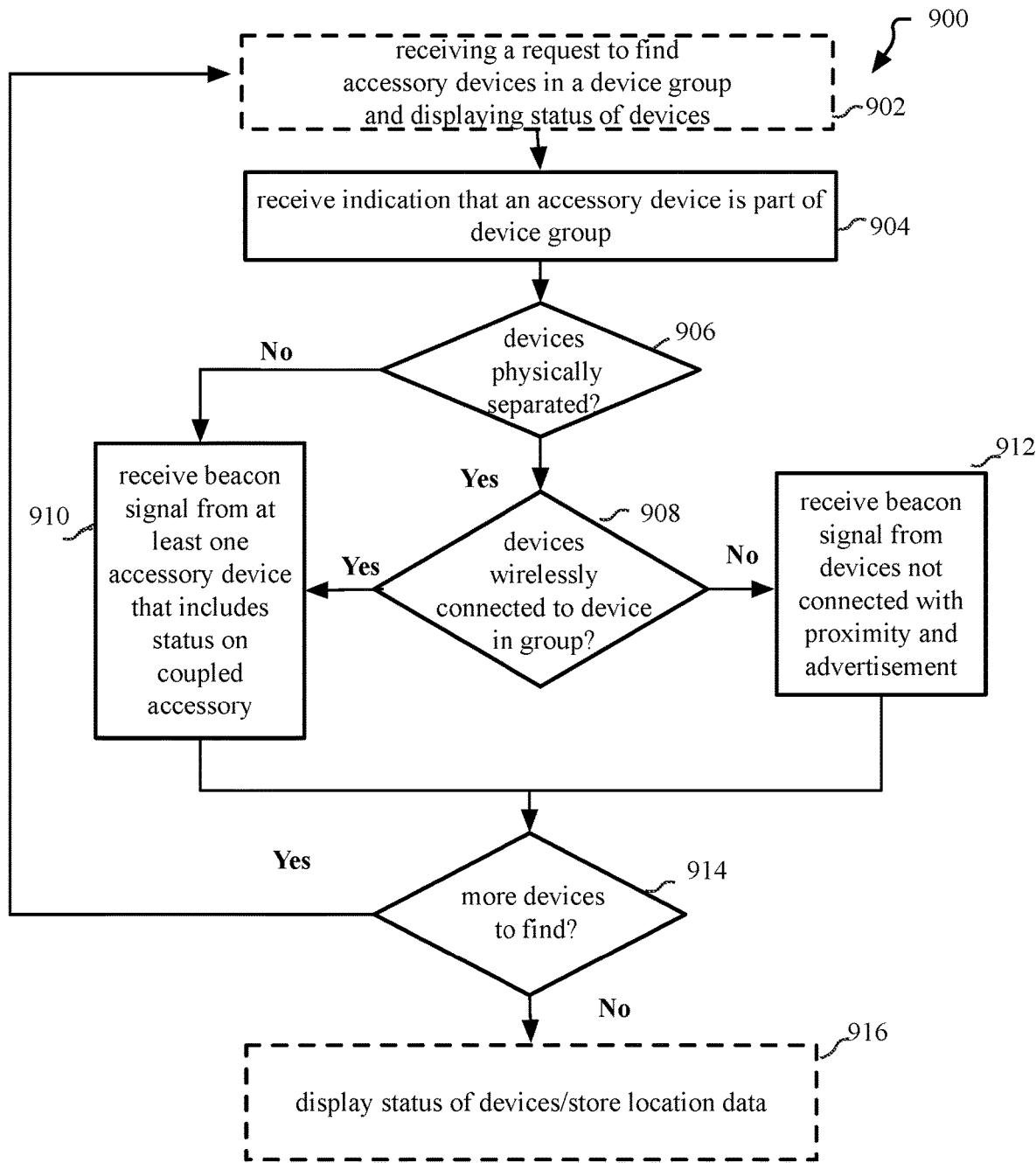
FIGS. 9A-D are flow diagrams illustrating methods for finding accessory devices in a device group.

FIG. 9A is a flow diagram 900 illustrating methods for finding accessory devices 101 in a device group 105. Finding techniques may be performed to provide a finding experience for accessory devices in a device group 105 can be performed by an owner mobile device 102 paired with at least one accessory device in the device group 105 in some embodiments. Finding techniques may also be performed by mobile devices 102 that are used as finder devices 202 to crowd source location data for device groups 105. Optionally, if a mobile device 102 receives a request to find a device group 105 of accessory devices 101 by an owner of the device group 105, the mobile device 102 may display a status of accessory devices 101 in the device group 105 (902). For example, the user interface 204 may provide location information for each of the accessory devices 101 in the device group 105. A beacon signal received by mobile device 102 from a first accessory device 101A may indicate the status of other accessory devices 101 in the device group 105 including, but not limited to, the following: whether accessory devices are proximate to mobile device and/or another accessory device in the device group 105 and wired and/or wirelessly connected to another device. The status information for the accessory devices provided in a received beacon signal may determine the approach taken to find accessory devices within the device group 105. Although the description of finding is provided for a pair of devices, those with skill in the art will recognize that similar approaches may be taken with any number of devices in a device group 105 with any number of accessory devices.

An indication may be received that an accessory device 101A is part of the device group 105 (904). Mobile device 102 may receive the indication in a beacon signal from an accessory device 101A. In some embodiments, the beacon signal may be any type of advertisement sent by the accessory device 101A, including advertisements sent to form and/or prior to forming a connection with mobile device 102. The status information provided in the beacon signal may indicate whether the devices are physically separated (906). If the accessory devices are not physically separated (906), then a beacon signal from at least one accessory device in the device group may provide location information for a second accessory device from the device group (910). By way of example, if the accessory devices 101 are in a case and have a wired connection to the case 103, then the beacon signal received from accessory device 101A may provide location data, such as RSSI data (e.g., measurements determined from beacon signal) to help locate the accessory devices 101 in the device group. The beacon signal may provide status information and/or verifiable information about the coupled accessory device 101B, such as accessory device 101B serial number, paired status, etc. RSSI data determined from the beacon signal from accessory device 101A may be attributed to accessory device 101B as the devices 101 are in case 103.

Continuing with FIG. 9A, if at least one accessory device in the device group 105 is physically separated (906), then a determination is made as to whether accessory devices 101 are wirelessly connected (908). If the first accessory device 101A and second accessory device 101B are wirelessly connected (908), then a beacon signal from the first accessory device in the device group may provide location information for the device group (910). By way of example, if the accessory devices 101 have a wireless connection, then the beacon signal received from the first accessory device 101A may provide location data, such as RSSI data determined from beacon signal to help locate the accessory devices 101 in the device group. Although example embodiments are described for a device group with two accessory devices, those with skill in the art will recognize that any number of accessory devices can be connected and/or separated from a given accessory device and a beacon signal for a given accessory device may represent any number of accessory devices of the device group that are connected to the accessory device. In an embodiment, a set of bits in a beacon signal received from a given accessory device may be designated to indicate which devices are connected to the accessory device and/or separated from the accessory device. The beacon signal may provide status information about the coupled accessory device 101B, such as first accessory device 101B serial number, paired status, and whether the second accessory device 101B is proximate to first accessory device 101A. RSSI data determined from the beacon signal (e.g., measurements determined by mobile device upon receiving Bluetooth advertisements) from accessory device 101A may be attributed to accessory device 101B as the devices 101.

Alternatively, if the accessory devices are not wirelessly connected (908), then beacon signals from the first accessory device 101A and second accessory device 101B are used to find the devices 101 (912). By way of example, the beacon signal received from the first accessory device 101A may provide location data, such as RSSI data determined from advertisements to help locate the accessory devices 101 in the device group 105. The beacon signal may provide last known status information about the coupled accessory device 101B, such as first accessory device 101B serial number, paired status, and whether the second accessory device 101B is or was proximate to first accessory device 101A. If there are any other devices to find in the device group (914), then the process continues (902).

Alternatively, optionally, the status of the devices may be presented such as the most up-to-date location information using RSSI data (916). Location data for accessory devices 101 may also be stored for each device and/or for a profile for the device group (916). Location data may be stored for use with a finding user interface 204 as shown in FIGS. 16-21 and/or stored with locator service 170.

Figure 9B:
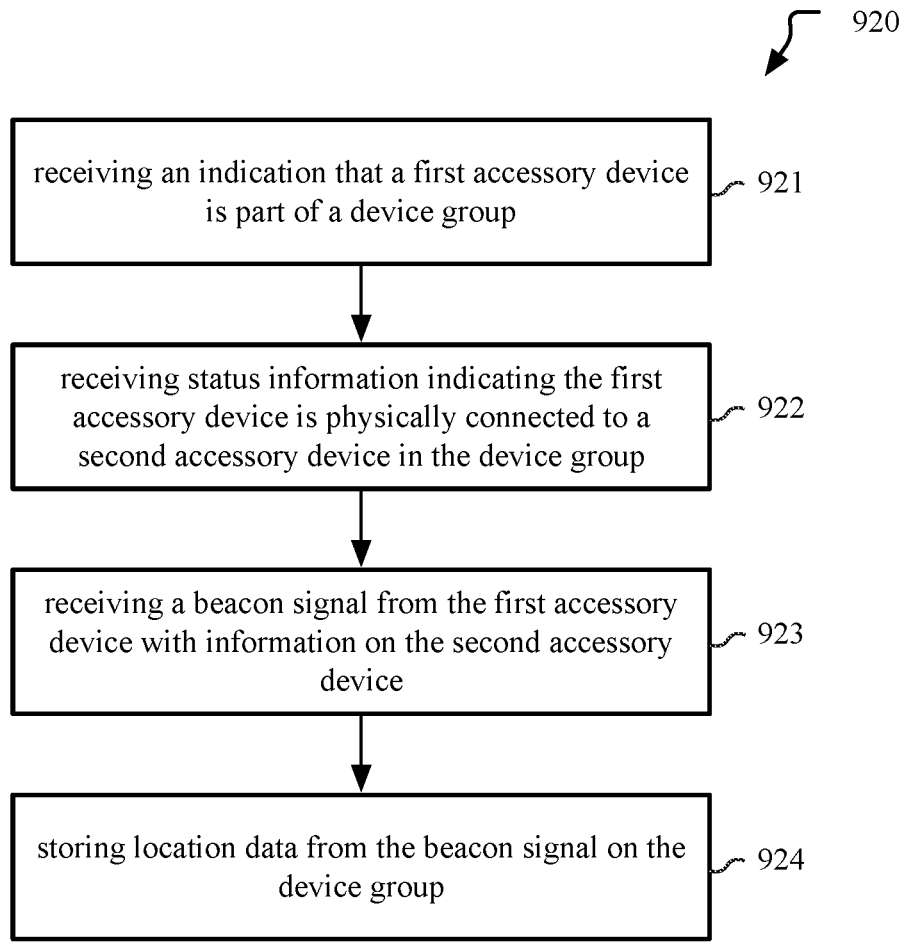

FIG. 9B is a flow diagram 920 illustrating methods for finding accessory devices 101 in a device group 105. In an embodiment, an owner uses a finder mobile device 102 to request a finding experience with user interface 204 to locate a device group 105 for AirPod accessory devices 101 with an AirPod case 103. In another embodiment, a finder mobile device 102 may perform finding methods to provide location data for AirPod accessory devices 101 with an AirPod case 103 to device locator services 170 in order to crowd source location data. An indication that a first accessory device is part of a device group 105 may be received (921) by mobile device. Status and/or verifiable information provided in the beacon signal may indicate that the first accessory device 101A is part of the device group 105. In some embodiments, an indication that the first accessory device 101A is part of a device group 105 may be verified with a certificate authority or attestation service.

Status information received in a beacon signal from the first accessory device 101A may indicate that the first accessory device 101A (e.g., a right or left AirPod) has a physical connection to a second accessory device 101B (e.g., the remaining AirPod) in the device group 105 (922). By way of example, the AirPods 101 may be stored in the case 103 and the AirPods 101 may be physically coupled. In some embodiments, the primary AirPod 101A that provides a beacon signal is the last AirPod 101A put in the case 103 and the beacon signal may include advertisements, status information (including proximity information on second accessory device 101B), and RSSI data.

A beacon signal from the first accessory device 101A in the device group 105 may be received by mobile device 102 (923). The beacon signal includes status information on the second accessory device 101B (924) and location data from the beacon signal on the device group 105 (924). Location data may be presented on the AirPods 101 using the user interface 204 and/or stored with the location server.

Figure 9C:
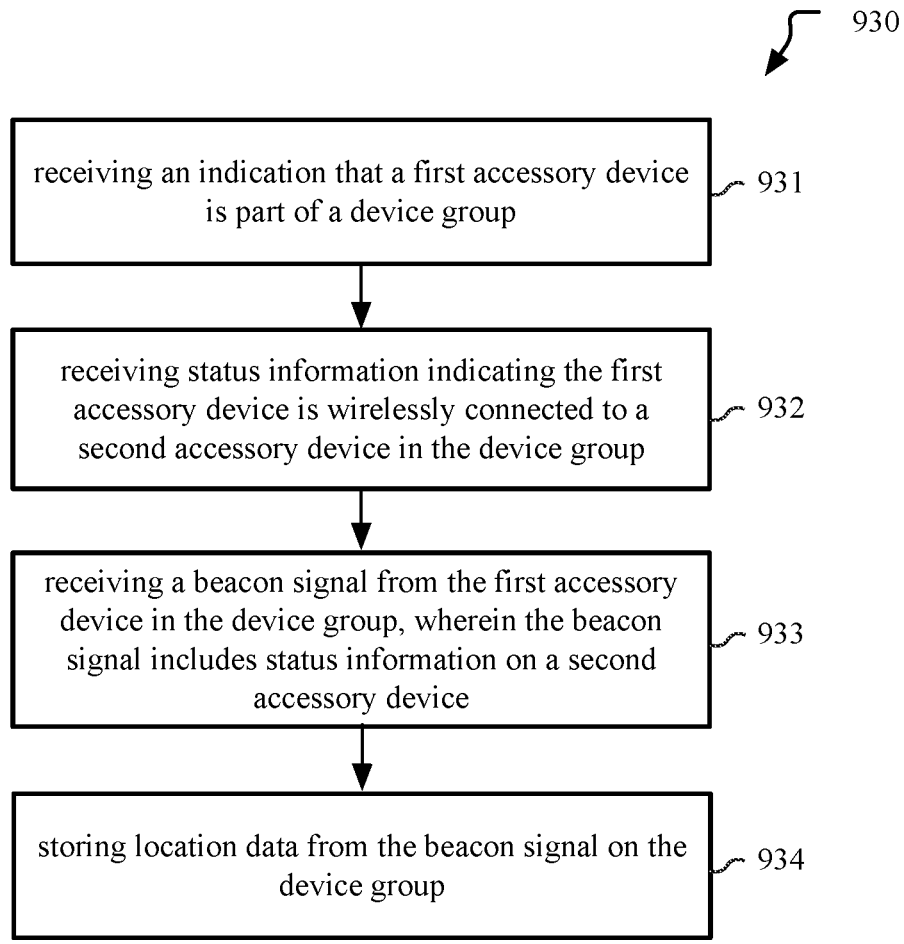

FIG. 9C is a flow diagram 930 illustrating methods for finding accessory devices in a device group. In an embodiment, an owner uses a finder mobile device 102 to request a finding experience with user interface 204 to locate a device group 105 for AirPod accessory devices 101 with an AirPod case 103. In another embodiment, a finder mobile device 102 may perform finding methods to provide location data for AirPod accessory devices 101 with an AirPod case 103 to device locator services 170 in order to crowd source location data. An indication is received that a first accessory device is part of a device group (931). Status and/or verifiable information provided in the beacon signal may indicate that the first accessory device 101A is part of the device group 105. In some embodiments, an indication that the first accessory device 101A is part of a device group 105 may be verified with a certificate authority or attestation service.

Status information received in a beacon signal from the first accessory device 101A may indicate that the first accessory device 101A (e.g., a right or left AirPod) has a wireless connection to a second accessory device 101B (e.g., the remaining AirPod) in the device group 105 (932). As such, an inference may be made that the first accessory device is proximate to and/or has access to location information for the second accessory device 101B and a beacon signal from the first accessory device 101A may be relied on for location information for the coupled accessory device.

A beacon signal from the first accessory device 101A in the device group 105 may be received by mobile device 102 (933). The beacon signal includes status information on the second accessory device 101B (933) and location data from the beacon signal on the device group 105 (933). The status information may also include information on whether the first accessory device 101A is proximate to the second accessory device 101B. Location data may be presented on the AirPods 101 using the user interface 204 and/or stored with the location server (934).

Figure 9D:
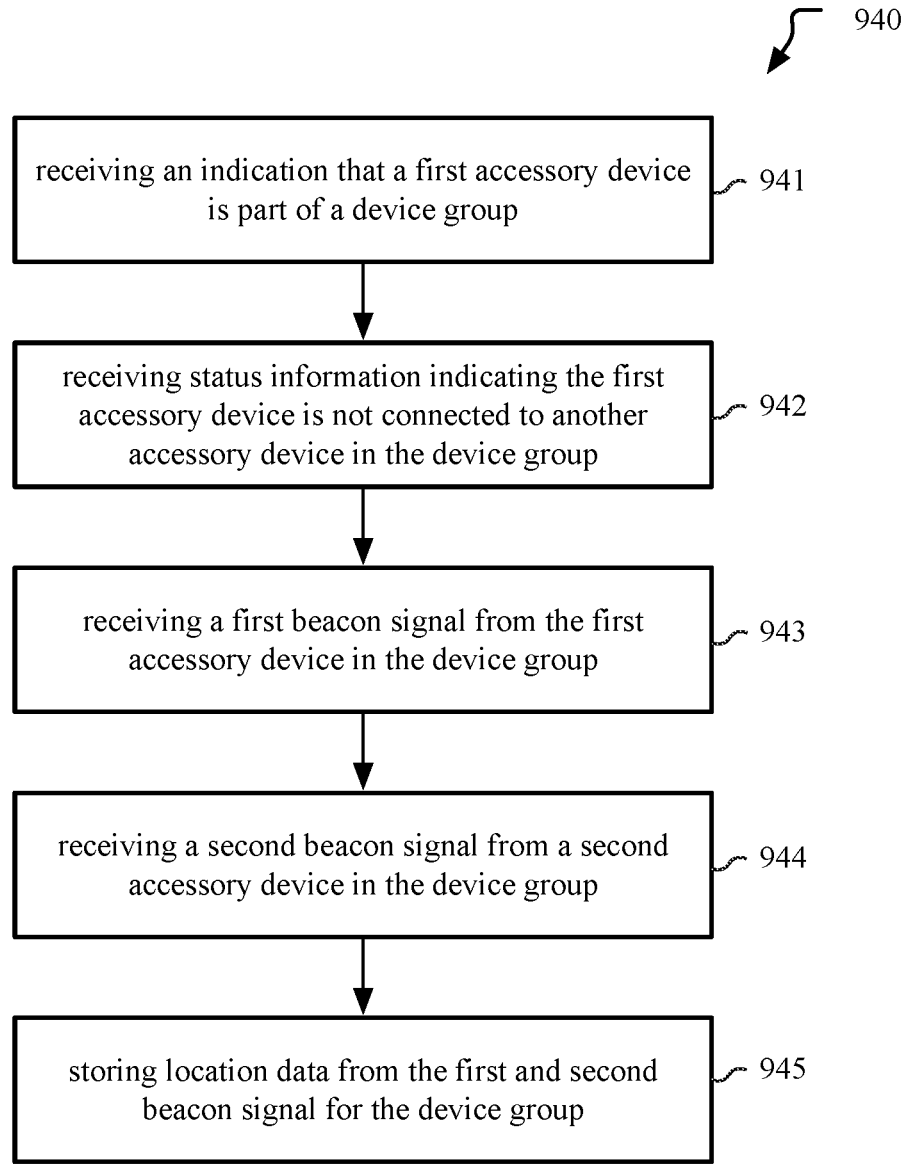

FIG. 9D is a flow diagram 940 illustrating methods for finding accessory devices in a device group. In an embodiment, an owner uses a finder mobile device 102 to request a finding experience with user interface 204 to locate a device group 105 for AirPod accessory devices 101 with an AirPod case 103. In another embodiment, a finder mobile device 102 may perform finding methods to provide location data for AirPod accessory devices 101 with an AirPod case 103 to device locator services 170 in order to crowd source location data. An indication is received that a first accessory device is part of a device group (941). Status and/or verifiable information provided in the beacon signal may indicate that the first accessory device 101A is part of the device group 105. In some embodiments, an indication that the first accessory device 101A is part of a device group 105 may be verified with a certificate authority or attestation service.

Status information received in a beacon signal from the first accessory device 101A may indicate that the first accessory device 101A (e.g., a right or left AirPod) is not connected to another accessory device (e.g., 101B remaining AirPod) in the device group 105 (942). A first beacon signal from the first accessory device 101A in the device group 105 (943) and a second beacon signal from a second accessory device 101B in the device group 105 may be received (944) either sequentially or in parallel. In some embodiments, if an AirPod (either 101A or 101B) is in the case 103, then proximity information may not be provided in the status information in the beacon signal. Location data from the first and second beacon signals may be presented on the AirPods 101 using the user interface 204 and/or stored with the location server (945).

Figure 10:
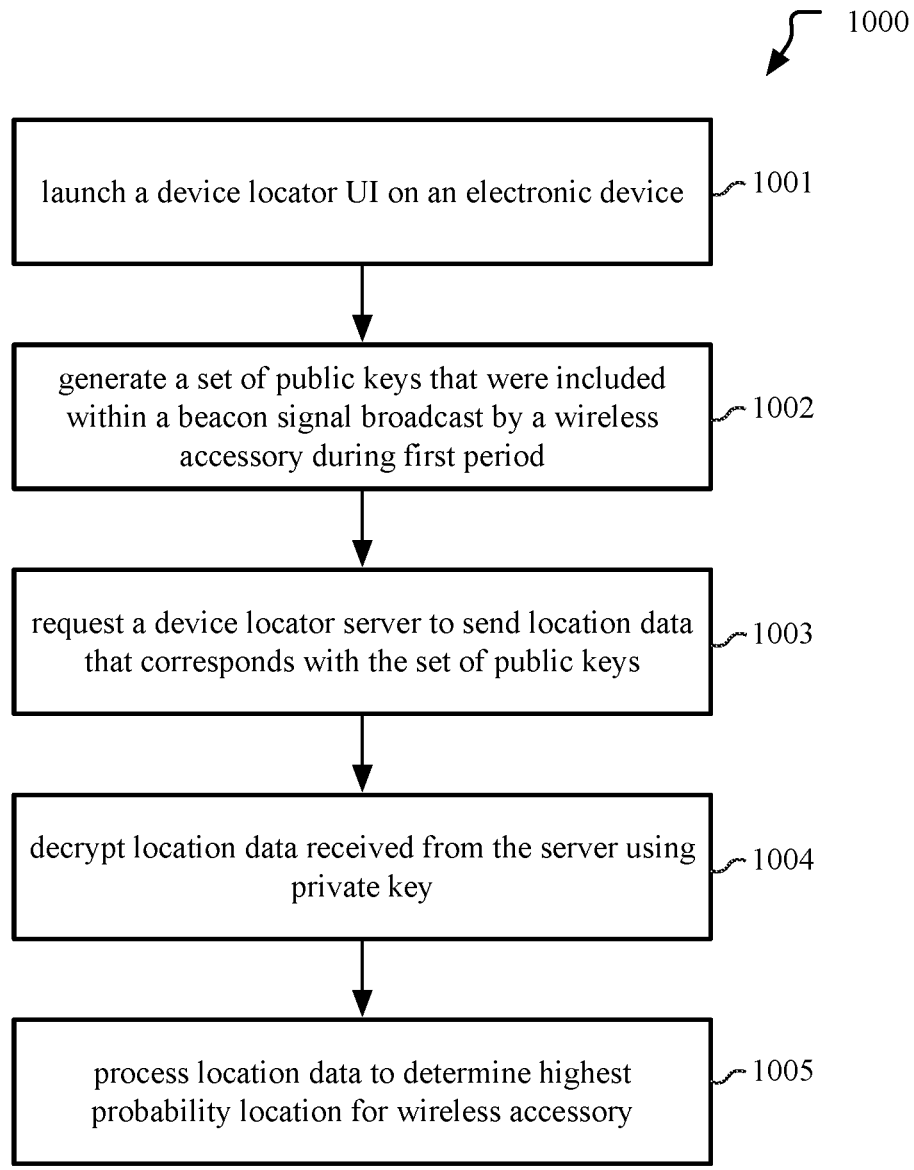
FIG. 10 illustrates a method to determine a location for a wireless accessory via a device locator server.
Figure 11:
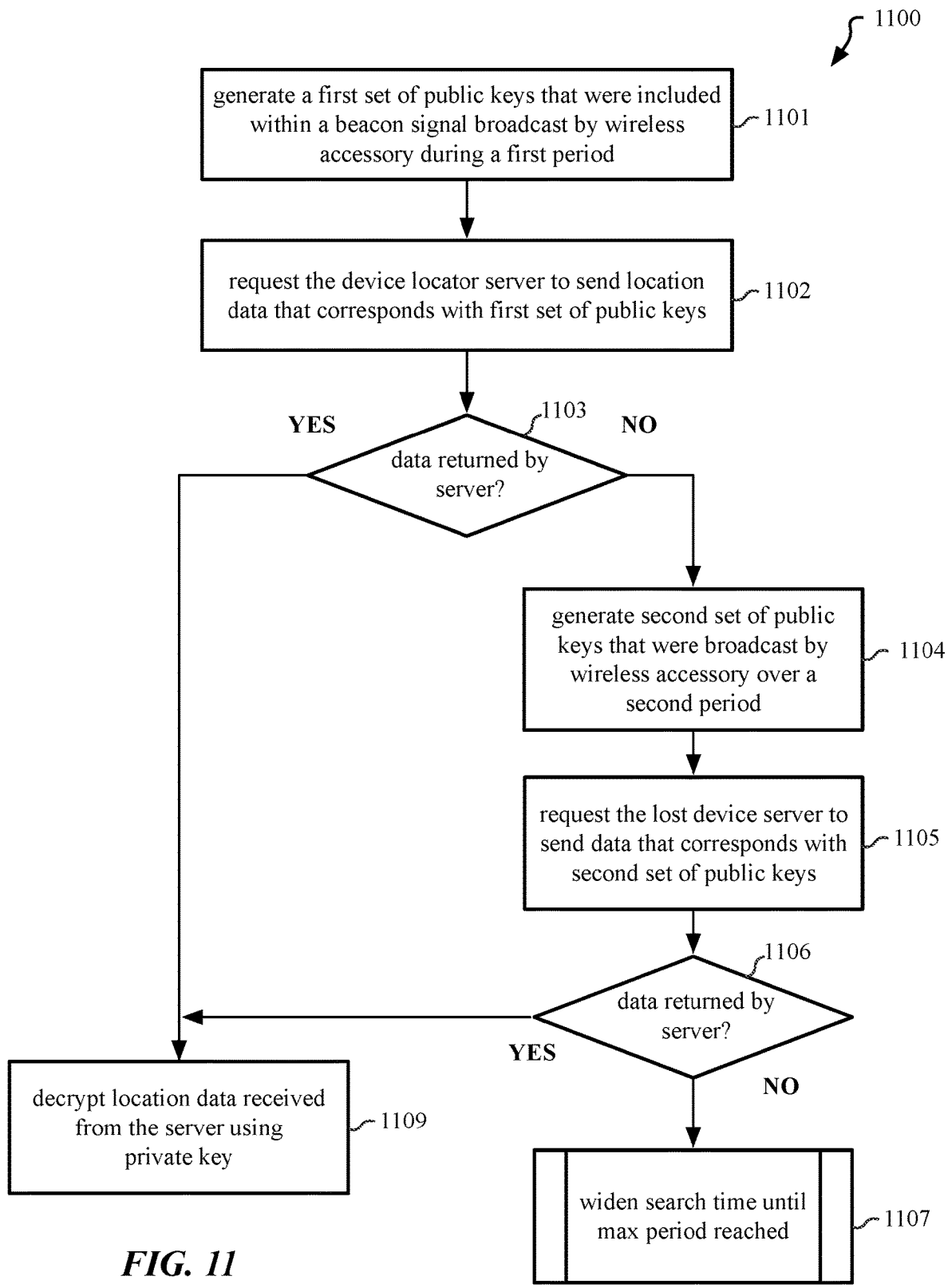
FIG. 11 illustrates an additional method to determine a location for a wireless accessory via a device locator server.

FIG. 10 illustrates a method 1000 to determine a location for a wireless accessory via a device locator server 203. FIG. 11 illustrates an additional method 1100 to determine a location for a wireless accessory via a device locator server 203. In an embodiment, the location data retrieved with methods illustrated in FIG. 10 and/or FIG. 11 may include data for accessory devices 101 in the device group 105. In another embodiment, the methods illustrated in FIG. 10 and/or FIG. 11 may be performed for each accessory in the device group 105. As shown in FIG. 10, method 1000 includes an operation in which an electronic device launches a device locator UI (1001). In response to launching the device locator UI, the electronic device, which can be a mobile device 102 as described herein, or another electronic device associated with the same cloud services account as the mobile electronic device 102, can perform an operation to generate a set of public keys that were included within a beacon signal broadcast by a wireless accessory during a first period (1002). The first period can be, for example, a previous 24 hours. The electronic device is aware of the frequency in which the wireless accessory is to generate new public keys and, using a shared secret generated with the wireless accessory, can generate a set of public keys that correspond with the keys that were generated by the wireless accessory over the first period. The electronic device can then send the set of public keys within a request for the device locator server 203 to send location data that corresponds with the set of public keys (1003). In one embodiment, location data sent by the server in response to the request will be encrypted using the public key transmitted as the beacon identifier of the wireless accessory. The electronic device can decrypt the encrypted location data received by the server using the private key generated during the initial pairing with the wireless accessory (1004). The electronic device can then process the location data to determine the highest probability location for the wireless accessory (1005).

Processing the location data can include a variety of different operations. In one embodiment the location data includes latitude and longitude information along with a timestamp for which the location was determined. The electronic device can triangulate based on the timestamps and remove noise or outlier locations. In one embodiment the location data specifies the location of the finder device that detected the beacon. The location data can additionally include UWB ranging information and/or RSSI information for the beacon detected by the finder device. The electronic device can analyze the UWB ranging information and/or RSSI information in context with the device locations to develop a more accurate location for the wireless accessory. Data that can be transmitted by a finder device and used for location processing is shown in FIG. 12 and described below.

As shown in FIG. 11, method 11 includes operations that can be performed if the device locator server does not have location data to provide to the electronic device in response to a request. In the case of a device group, the electronic device (e.g., mobile device 102) may provide the location data on devices in the device group 105. The electronic device can generate a first set of public keys that were included within a beacon signal broadcast by wireless accessory during a first period (1101). The first period can be, for example, 24 hours, although other initial search periods can be used. The electronic device can perform a subsequent operation to request the device locator server to send location data that corresponds with first set of public keys (1102). If the data is returned by the server (1103, "yes"), the electronic device can decrypt the location data received from the server using the private key that corresponds with the set of public keys (block 1109).

If data is not returned by the server (1103, "no") the electronic device can generate a second set of public keys that were included within a beacon signal broadcast by the wireless accessory during a second period (1104). The second period can be the 24, 48, or another number of hours before the first period. The electronic device can then request for the device locator server to send data that corresponds with the second set of public keys (1105). If, in response to the request, data is returned by the server (1106, "yes"), method 1100 can proceed to block 1109, in which the electronic device decrypts the received data. If data is not returned by the server (1106, "no"), or the server sends a reply that indicates data is not available, method 1100 includes for the electronic device can widen the search time by requesting successively older time periods until the max period is reached (1107).

Figure 12:
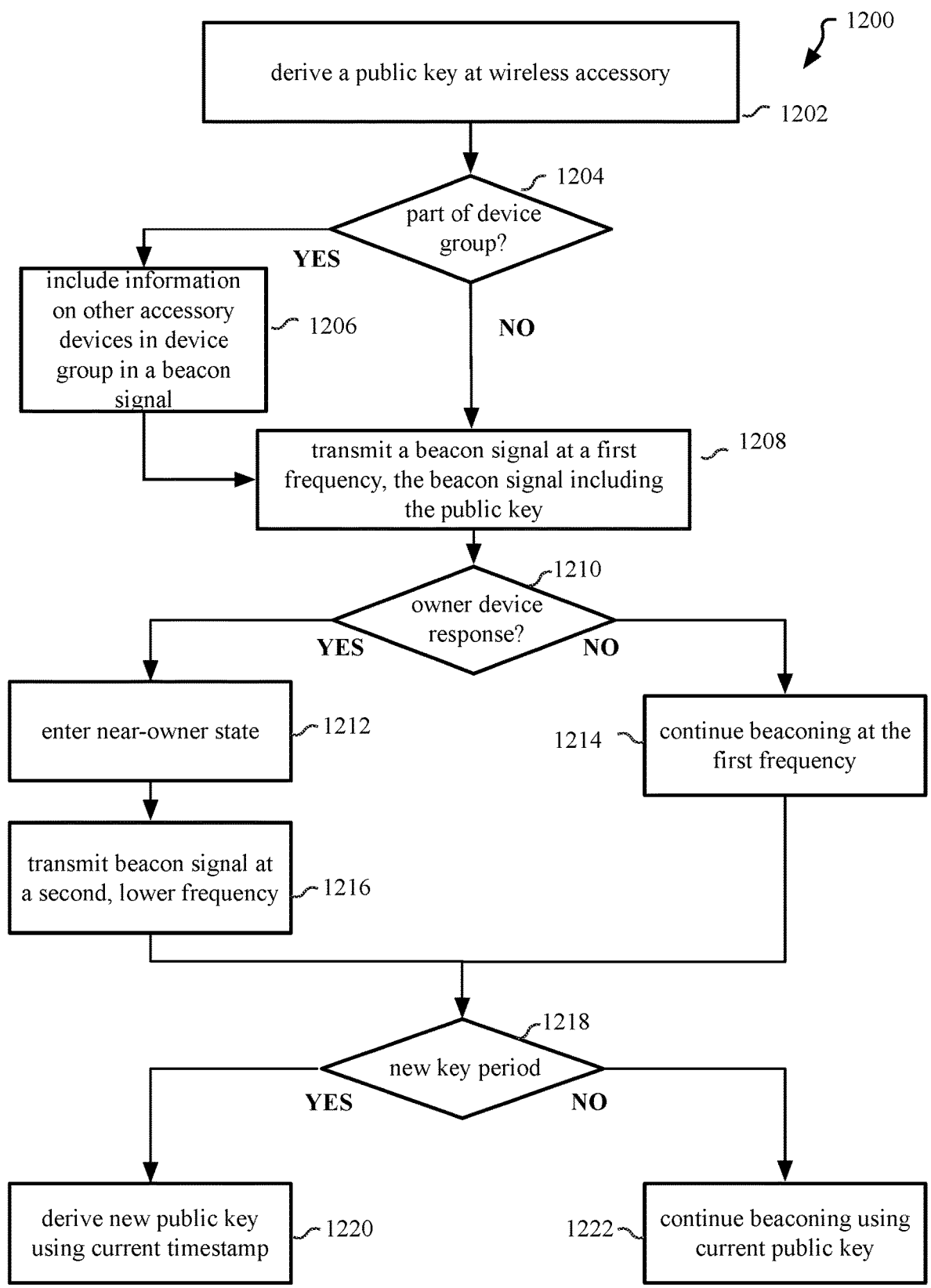
FIG. 12 is a flow diagram illustrating a method of broadcasting a signal beacon at a wireless accessory, according to an embodiment.

FIG. 12 is a flow diagram illustrating a method 1200 of broadcasting a signal beacon at a wireless accessory, according to an embodiment. Aspects of method 1200 are also illustrated in FIG. 2 and FIG. 3. Method 1200 includes for the wireless accessory to derive a public key (block 1202). The public key can be derived based on a shared secret and a timestamp determined based on a clock or time keeping device of the wireless accessory. Optionally, a determination is made as to whether the wireless accessory is part of a device group (1204). If the wireless accessory is part of a device group (1204), the status information and/or verifiable information for other accessory devices 101 in the device group 105 is provided in the beacon signal (1206). The wireless accessory may indicate status information and/or verifiable information, such as whether any other wireless accessory in the device group is proximate, connected (physically or wirelessly), and/or any other information on the other wireless accessories in the device group 105. In an embodiment, a set of bits included in the beacon signal may represent each accessory in the device group and setting a Boolean value (e.g., true (1) or false (0)) may indicate whether the respective accessory is proximate and/or connected to the accessory device sending the beacon signal. Alternatively, information is not provided on a device group, if the wireless accessory is not part of a device group (1204). The wireless accessory can then transmit a beacon signal at a first frequency, where the beacon signal includes the public key (1208). The first frequency can vary, and in one embodiment is one beacon every two seconds.

After transmitting a beacon signal, the wireless accessory can listen for a response from the owner device (1210). If the wireless signal receives a response from the owner device (1210, "yes"), the wireless accessory can enter a near-owner state (1212) and begin to transmit the beacon signal at a second, lower frequency (1216). If the wireless accessory does not receive a response from the owner device (1210, "no"), the wireless accessory can continue beaconing at the first frequency (1214).

Method 1200 additionally includes for the wireless device, while beaconing, to rotate the public key every M minutes, where the value of M can vary across embodiments and/or based on the device state. Based on a timer expiration, counter, or another mechanism, the wireless accessory can determine whether the accessory has entered a new key period (1218). While the wireless accessory has not entered a new key period (1218, "no"), the accessory can continue beaconing using the current public key (1222). When the wireless accessory detects that it has entered a new key period (1218, "yes") the accessory can derive a new public key using the current timestamp (block 1220). In one embodiment the new public key can be derived using an existing public key, a timestamp, and an anti-tracking secret.

Figure 13:
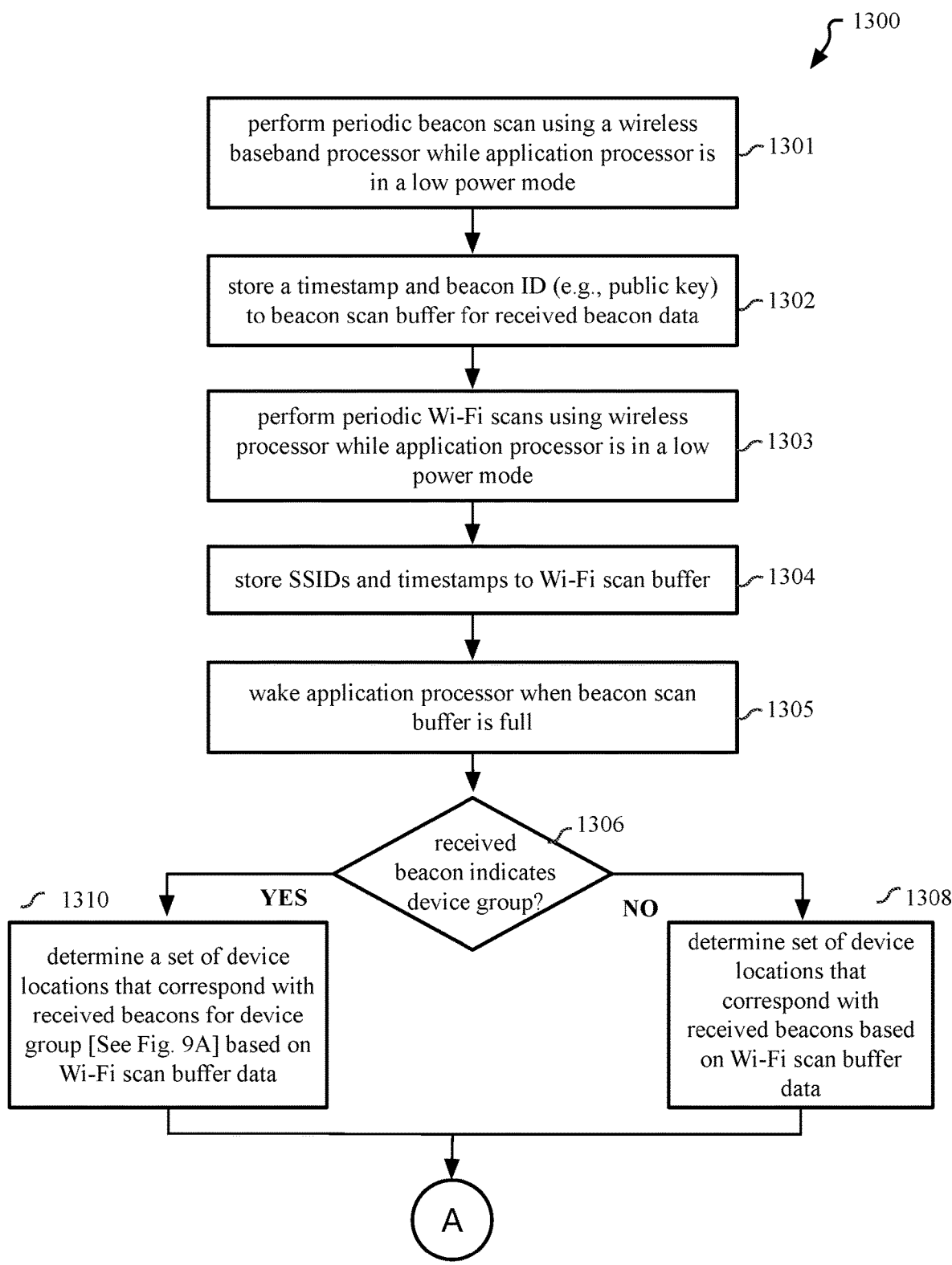
FIGS. 13-14 illustrate operations of a method that can be performed by a finder device, according to embodiments described herein.
Figure 14:
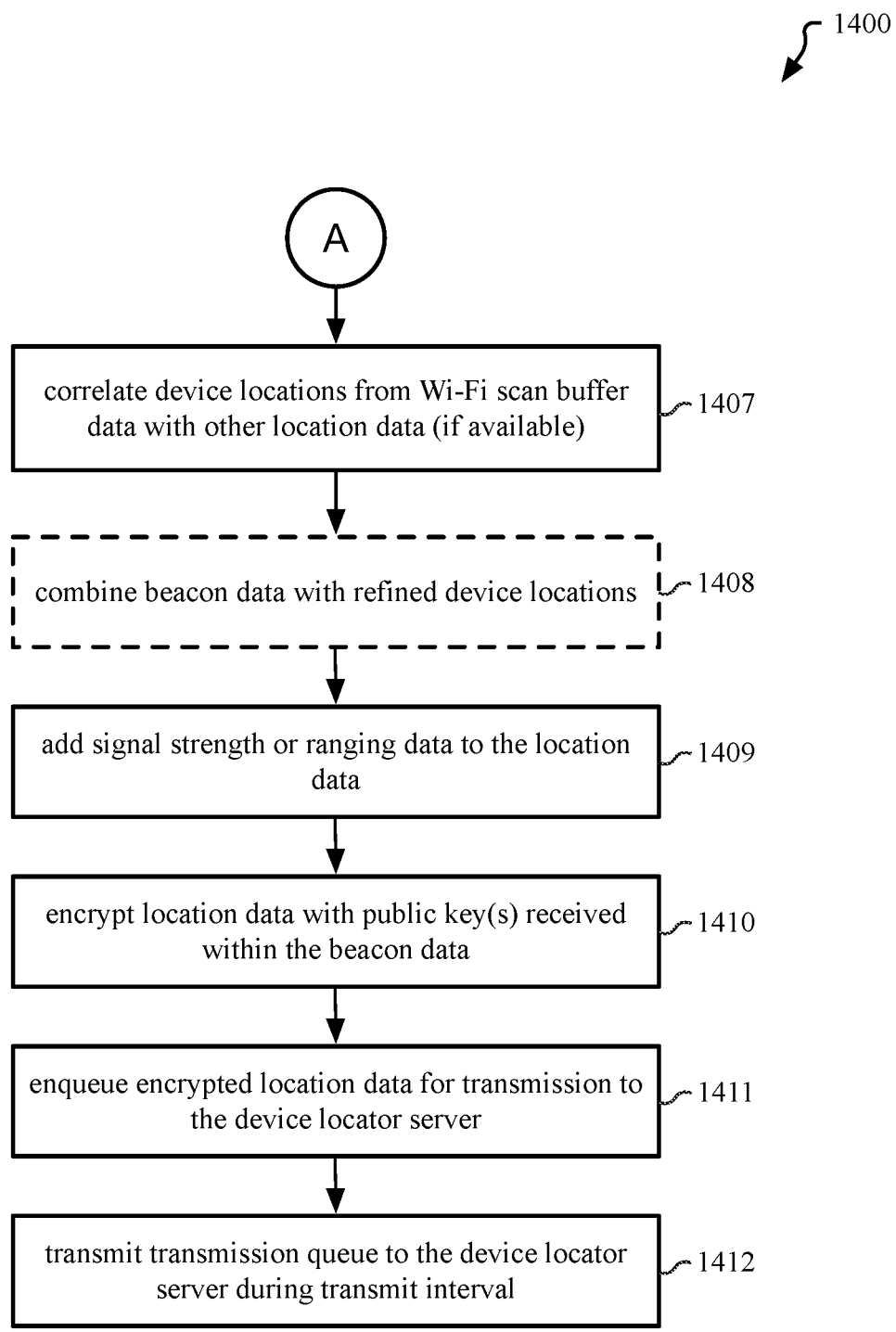

FIGS. 13-14 illustrate operations of a method 1300 that can be performed by a finder device, according to embodiments described herein. Aspects of method 1300 are also illustrated in FIG. 2 and FIG. 3.

As shown in FIG. 13, method 1300 includes for the finder device to perform a periodic beacon scan using a wireless baseband processor while an application processor of the finder device is in a low power mode (1301). While the beacon scan can also be performed when the application processor is active, beacon scans can be performed by the wireless processor and a wireless radio receiver as a low power operation while the finder device is idle, inactive, or otherwise in a low power state. The finder device can store a timestamp and a beacon identifier to a beacon scan buffer for any beacon data received by the finder device (1302). The beacon identifier, in one embodiment, is a public key that is generated by the wireless device based on a timestamp and a shared secret generated with the mobile device of the owner.

Method 1300 additionally includes for the finder device to perform periodic Wi-Fi scans using the wireless processor while application processor is in a low power mode (1303). While the Wi-Fi scans can also be performed when the application processor is active, Wi-Fi scans can be performed by the wireless processor and a wireless radio receiver as a low power operation while the finder device is idle, inactive, or otherwise in a low power state. The finder device can then store Wi-Fi service set identifiers (SSIDs) and scan timestamps to a Wi-Fi scan buffer on the finder device (1304).

In one embodiment, the Wi-Fi scan buffer is a rolling buffer that stores the most recently detected SSIDs, while overwriting older detected SSIDs. In one embodiment the beacon scan buffer can be a fixed-size buffer having space for a pre-determined number of entries. The finder device can wake the application processor when the beacon scan buffer becomes full (1305) and correlate those beacon scans with the most recently detected SSIDs in the Wi-Fi scan buffer. If the beacon indicates a beacon signal was received from a device group (1306), then a set of device locations that correspond with received beacons based on Wi-Fi scan buffer data may be performed for beacon signals from the device group 105 (1310). For example, if a beacon signal is received from a first accessory device from a device group 105 and includes information on a set of proximate devices that are either physically or wirelessly connected to the first accessory device, then the last known location for the first accessory device may be attributed/stored to the first accessory device and each of the proximate devices in the device group 105. Alternatively, that correlation can enable the finder device to determine a set of device locations that correspond with received beacons based on Wi-Fi scan buffer data (1308).

Method 1300 continues in FIG. 14 and includes for the finder device to correlate device locations from the Wi-Fi scan buffer data with other location data if other location data is available (1407), to generate refined device locations. If refined device locations are generated, the finder device can optionally combine the beacon data with refined device locations (1408). The finder device can also add signal strength (RSSI) and/or ranging data to the location data (1409). The signal strength and ranging data (e.g., UWB ranging data) can be gathered when the beacon signal is received by the finder device. The finder device can then encrypt the location data with one or more public keys received within the beacon data (1410). The signal and ranging data may be encrypted along with the location data or can be send unencrypted along with the encrypted location data. The finder device can enqueue encrypted location data for transmission to the device locator server (1411). The device locator server can be one of multiple cloud services servers to which communication is generally performed in a batched and throttled manner. A batch of encrypted data can be gathered and placed in the transmission queue until a transmit interval arrives, during which the finder device can transmit data to the cloud services servers (1412).

Figure 15:
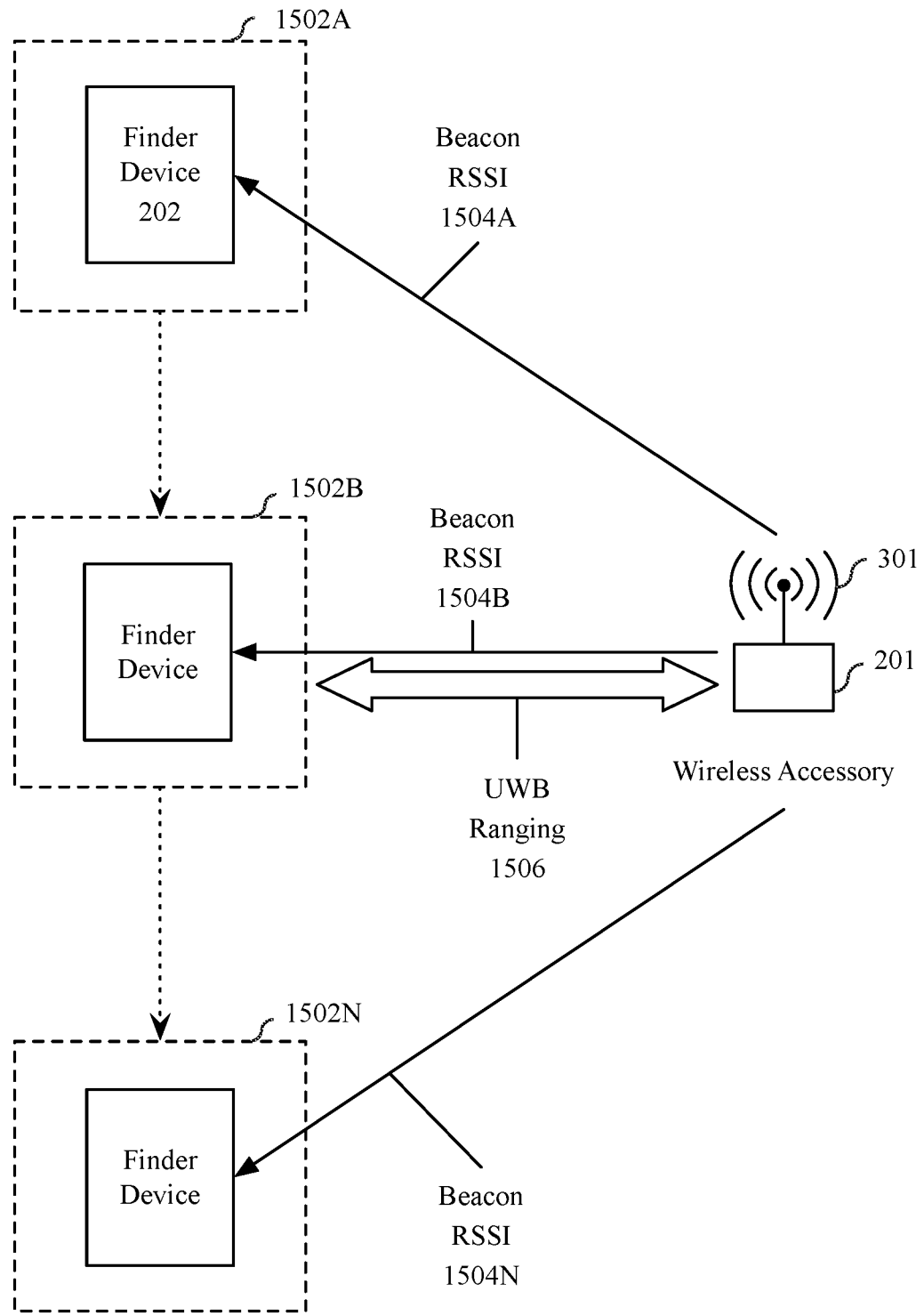
FIG. 15 illustrates the gathering of signal and ranging data by a finder device, according to an embodiment.

FIG. 15 illustrates the gathering of signal and ranging data by a finder device, according to an embodiment. In one embodiment, the finder device 202 can gather signal strength information (e.g., RSSI 1504A-1504N) for a beacon signal 301 received from the wireless accessory 201 across multiple locations 1502A-1502N. The finder device 202 can also represent multiple finder devices, such as the set of finder devices 303 in FIG. 3, where each finder device detects the beacon signal at a different location. Each finder device 202 can send different locations and signal strengths and the location and signal strength data received from the multiple finder devices will be aggregated by the device locator server. In one embodiment, where a finder device and the wireless device each include UWB radios, UWB ranging 1506 can be performed if the finder device and the wireless device are within range of UWB transmissions. UWB ranging and signal strength data can be transmitted along with location data for the finder devices to the device locator server.

The owner device can retrieve the RSSI and/or UWB information from the device locator server along with location data, which in one embodiment is provided the form of latitude and longitude information, along with timestamps for which the locations were determined. The owner device can then use the location data, timestamps, and signal information to triangulate a most probable location for the wireless accessory 201.

Figure 16:
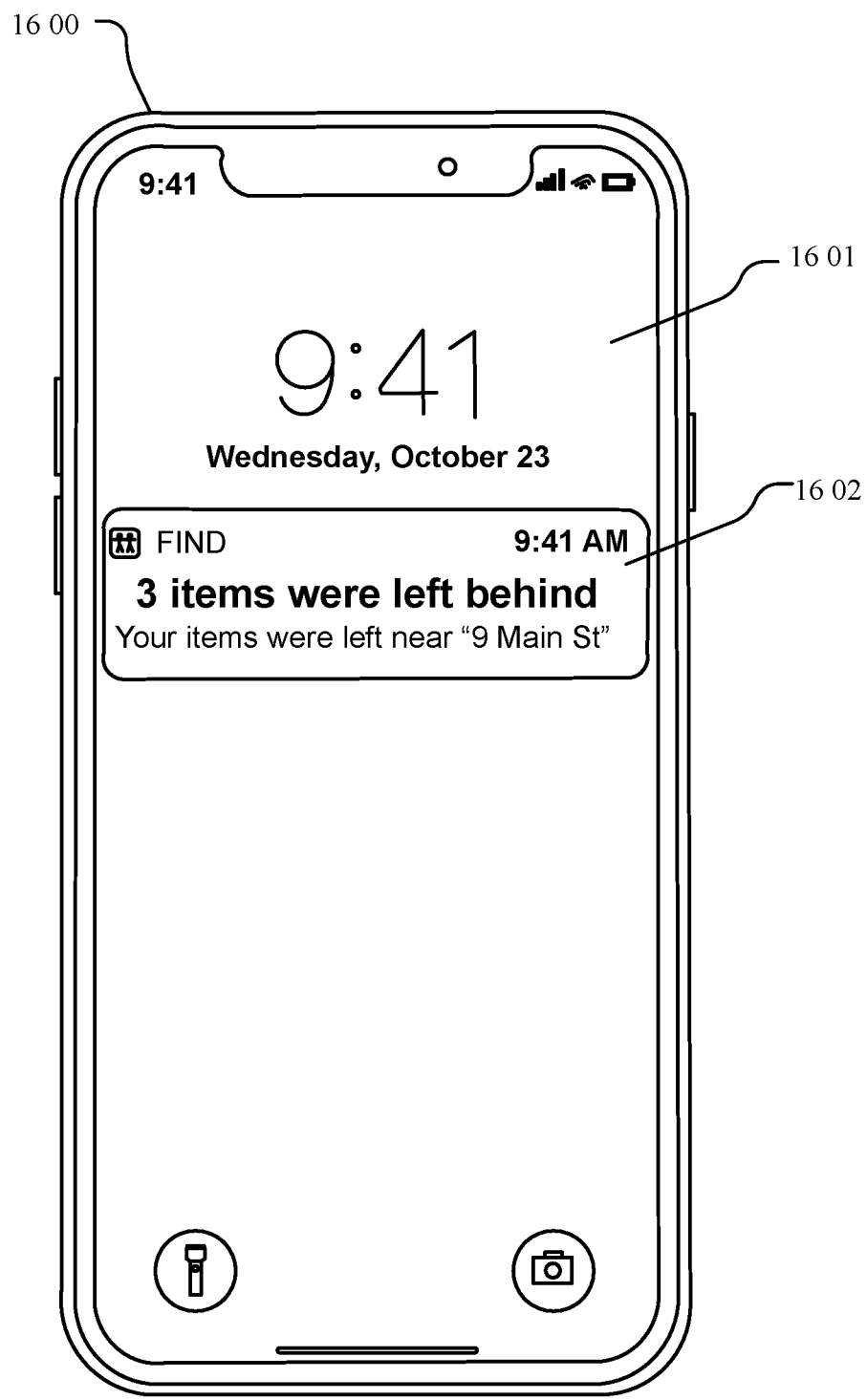
FIGS. 16-21 illustrate a device locator user interface, according to an embodiment.
Figure 17:
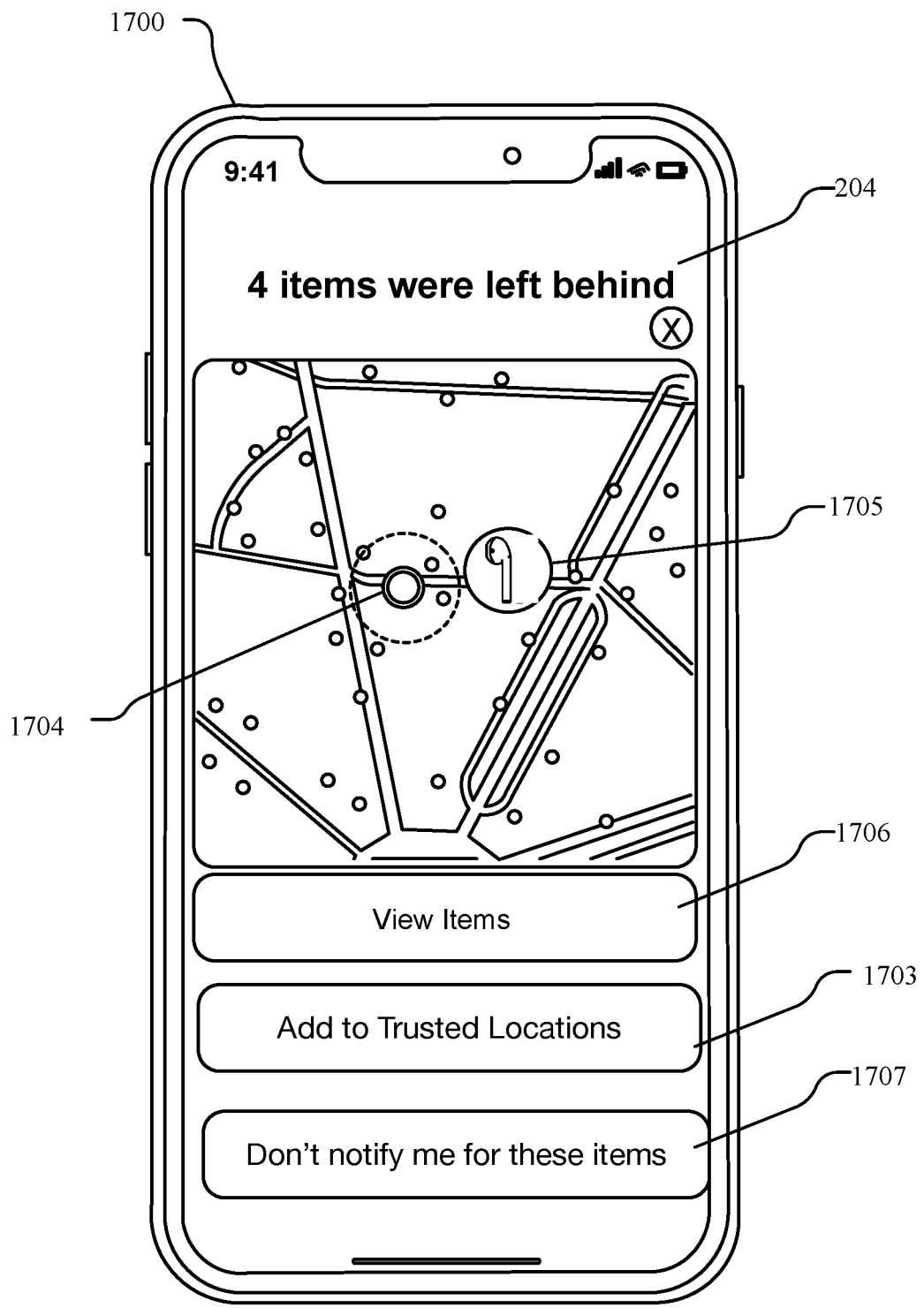
Figure 18:
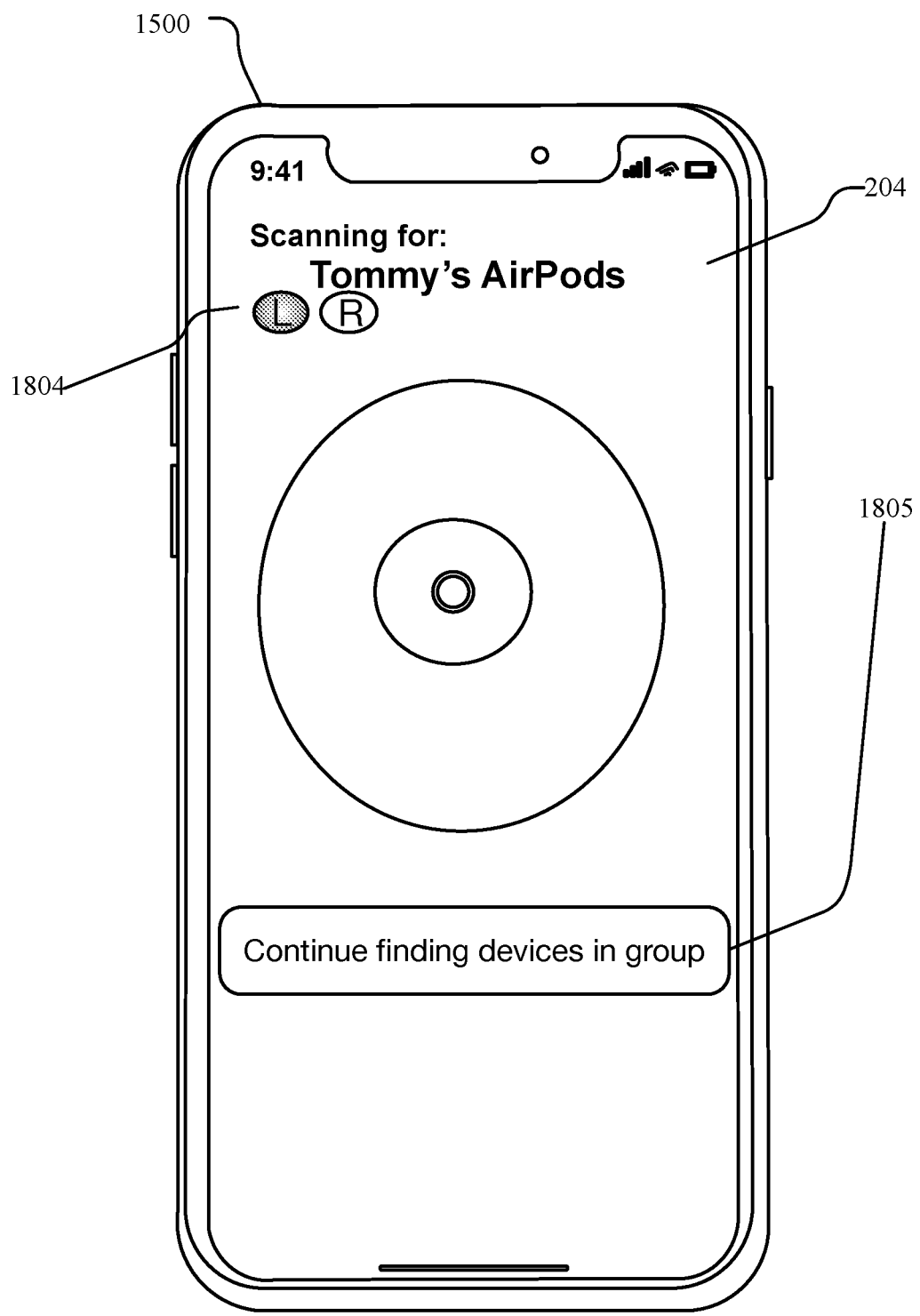

FIGS. 16-21 illustrate a device locator UI 204, according to an embodiment. FIG. 16 shows a first graphical user interface of the device locator UI 204, according to an embodiment, which shows a notification for various wireless accessories of a user. The device locator UI 204 can cause the presentation of separation notifications 1602 on the home screen 1601 of the electronic device 1600. FIG. 17 shows a second graphical user interface of the device locator UI 204, according to an embodiment, which enables an accessory device left behind to be viewed on a map, add trusted location, or request cease notifications for items. FIG. 18 shows a third graphical user interface of the device locator UI 204, according to an embodiment, which enables accessory devices 101 in a device group 105 to be located. As shown, electronic device 1500, including mobile device 102, may be used to scan for either accessory devices (as shown with "L" left and "R" right options in 1804) in a device group 105 using location data from beacon signals and using finding methods described herein. Selectable element 1805 may be selected to continue finding accessory devices in device group 105.

Figure 19:
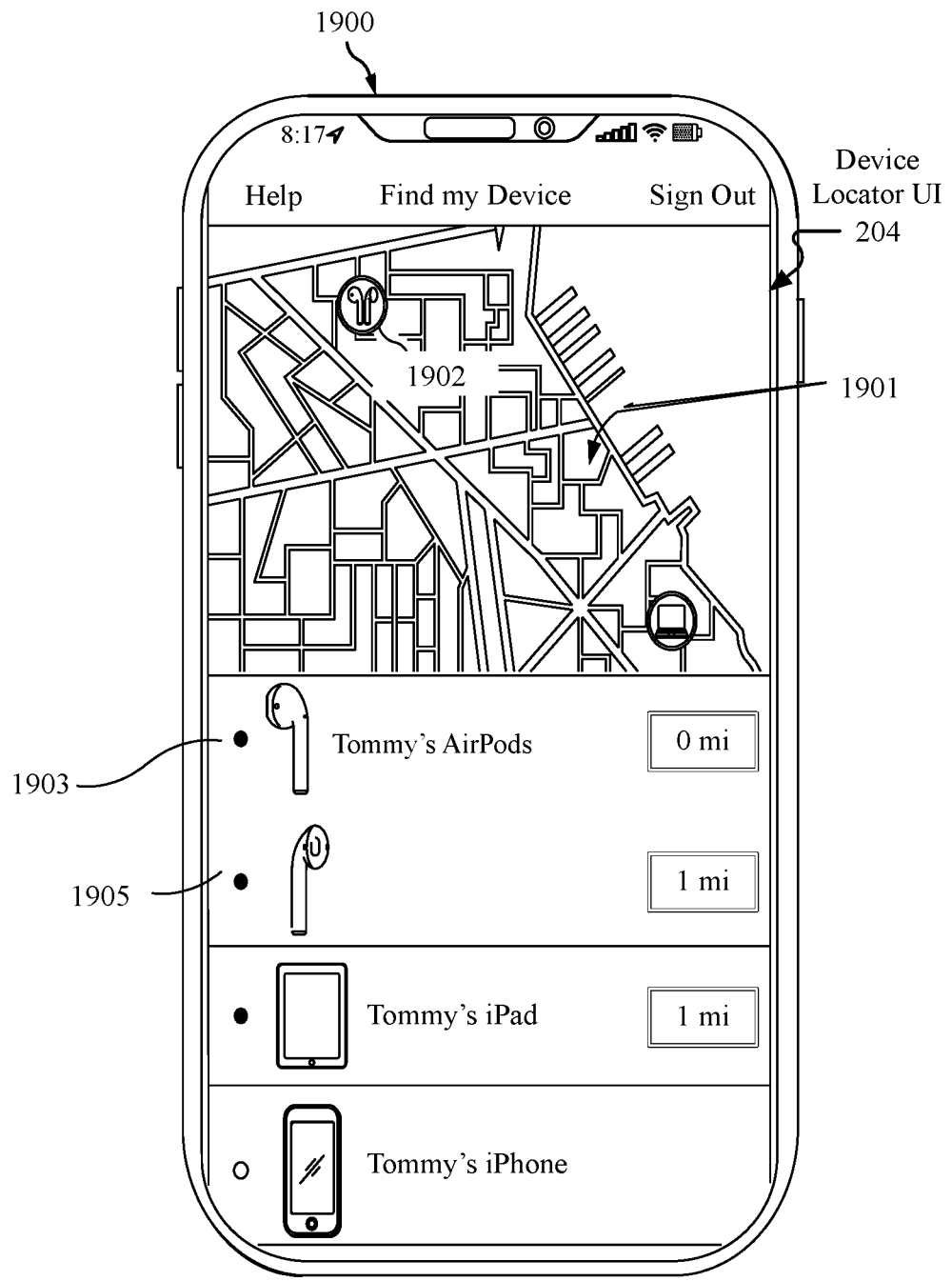
Figure 20:
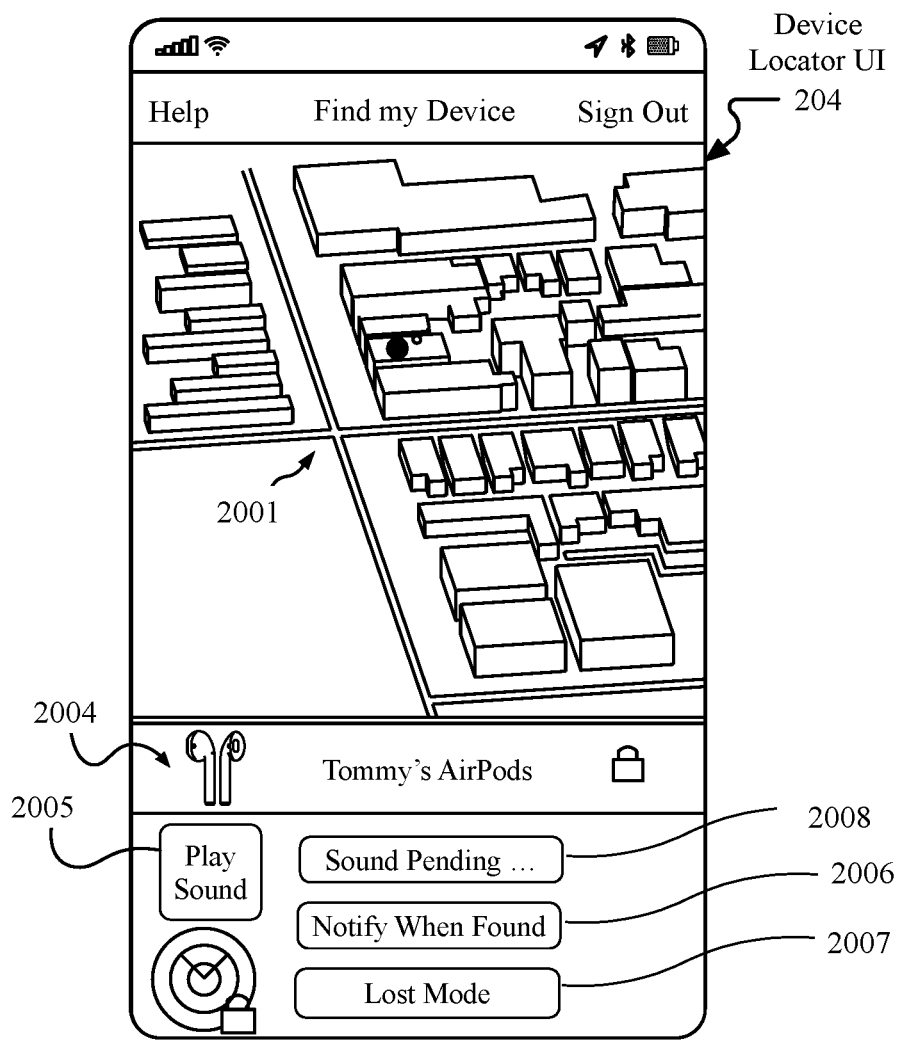
Figure 21:
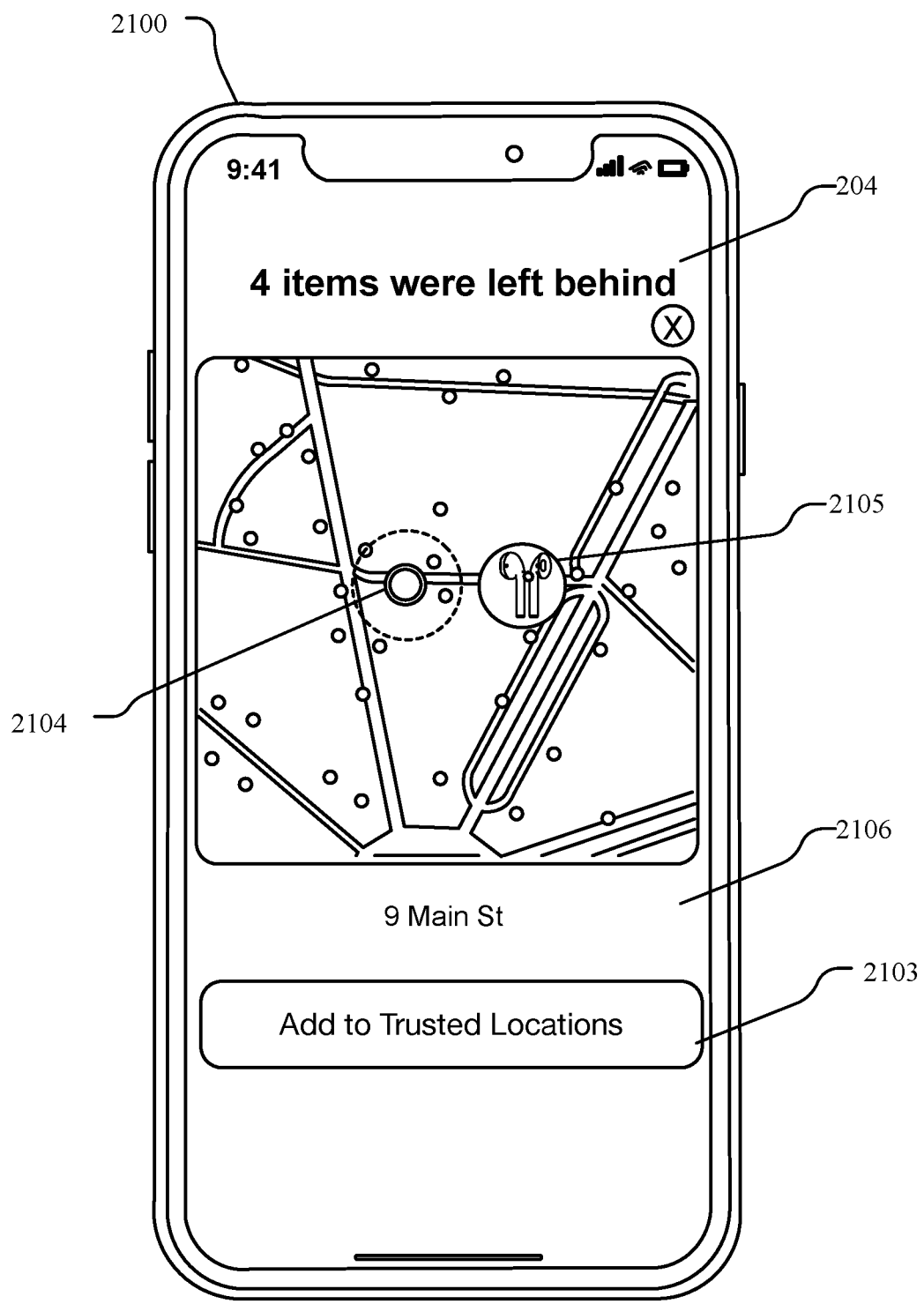

FIG. 19 shows a fourth graphical user interface of the device locator UI 204, according to an embodiment, which enables accessory devices 101 including devices in a device group 105 to be found in a map. FIG. 20 shows a fifth graphical user interface of the device locator UI 204, according to an embodiment, which enables a wireless accessory to be set to a lost mode or notify when found. The device locator UI 204 can be displayed on an electronic device, which can be a mobile device 102, or any other type of electronic device described herein. FIG. 21 shows a sixth graphical user interface of the device locator UI 204, according to an embodiment, which enables a wireless accessory to add trusted locations.

As shown in FIG. 17, the device locator UI 204 can present a unified graphical interface on electronic device 1700 through which multiple different types of devices and accessories can be located, including wireless devices with network or cellular access and wireless accessories without native network access. The device locator UI 204 can include a map 1704 with a marker 1505 that shows the current or last known location of a wireless device or accessory. The marker 1505 can be an icon, image, graphic or any other user interface element that identifies the accessory and conveys a location for the accessory. A selectable element 1706 in the device locator UI 204 can present a description or name of the wireless device or accessory and can show an estimated distance between the wireless device or accessory and the current location of the electronic device 1900 as shown in FIG. 19.

As shown in FIG. 19, the device locator UI 204 can present a fourth user interface that enables a wireless accessory view the item 1903 and distance from electronic device 1900. The second user interface can be displayed, in one embodiment, in response to the selection of the selectable element 1706 shown in FIG. 17. The second user interface can present a user interface element 1902 that represents and/or describes the wireless accessory in question, as well as the map 1901 and marker 1902 that show the current or last known location of the wireless accessory.

As shown in FIG. 20, the device locator UI 204 can present a fifth graphical user interface that enables a wireless accessory to be set to a lost mode. In one embodiment, when a wireless accessory cannot be located via the device locator UI 204, the map 2001 will not display a marker that indicates a location for the accessory. The device locator UI 204 can present the user interface element 2004 that represents and/or describes the wireless accessory in question and a set of selectable user interface elements. One selectable user interface element 2006 can present the option to notify the user when the accessory is found. When notify when found is enabled, in one embodiment the wireless accessory can be placed into a light lost mode. The electronic device associated with the device locator UI 204 can generate a set of public keys that the wireless accessory will broadcast with the beacon signal during a future time period (e.g., next 24 hours, next 48 hours, etc.). If a signal is detected by a finder device using one of the future keys, the device locator server can notify one or more electronic devices associated with the user. The device locator UI 204 can present a selectable user interface element 2005 to allow the user to give the user the option to request that the lost device play a sound. If a connection is established with a lost device from a device group 105, then a request to play sound may be sent to the lost device. If a connection cannot be established, the user may be given the option via selectable user interface element (not shown) to queue a play sound request to be sent to the lost device, if a connection can be formed within a defined period of time. If the user selects to queue the request at the mobile device 102, then the status of the queue request may be provided on the user interface, such as with a selectable user interface element 2008 indicating the request is pending with "Sound Pending."

Another selectable user interface element 2007 can place the wireless accessory into an explicit lost mode. When explicitly placed into lost mode, the wireless accessory will be unable to be paired with other devices until the accessory is unlocked by the user or owner that places the device into lost mode. When sending a request to place a wireless accessory into lost mode, the requesting user can be required to enter authenticating information to ensure that the requesting user is authorized to request that lost mode be initiated on the lost accessory. The authenticating information can include a username or password associated with an account of a user, such as a cloud services account to which the user, electronic device, and wireless accessory are associated. The authenticating information can also include biometric information, such as a fingerprint or facial recognition data.

In one embodiment, a message and contact information provided by the requesting user can be displayed on the user device to alert a person who finds the lost wireless accessory on how to contact the requesting user. In one embodiment, the message and contact information can be displayed when another user attempts to pair another electronic device with the lost accessory.

As shown in FIG. 21, the device locator UI 204 can present a sixth graphical user interface in electronic device 100 that enables a designation of a known location 2106 shown on map with 2104 to become a trusted location with selection of selectable element 2103. The device locator UI 204 can present the user interface element 2105 that represents and/or describes the wireless accessory in question.

Figure 22:
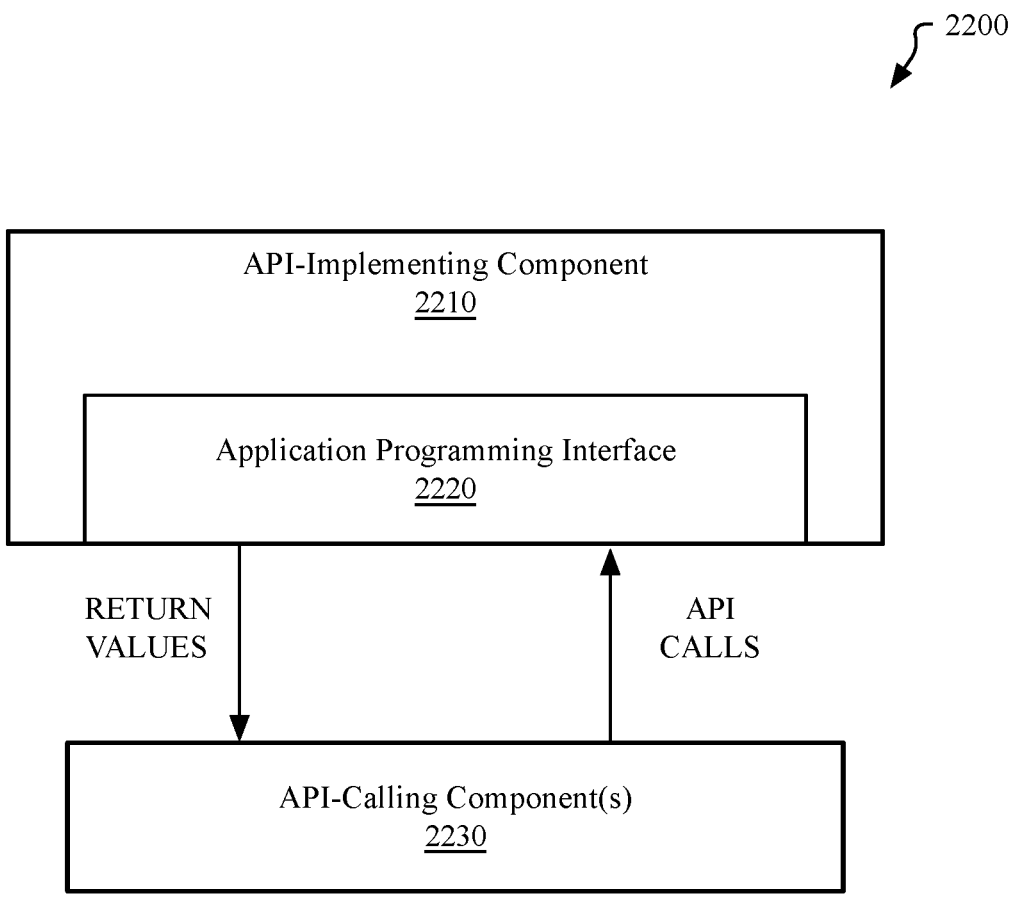
FIG. 22 is a block diagram illustrating an exemplary API architecture, which may be used in some embodiments of the invention.

FIG. 22 is a block diagram illustrating an exemplary API architecture, which may be used in some embodiments of the invention. As shown in FIG. 22, the API architecture 2200 includes the API-implementing component 2210 [110] (e.g., an operating system, a library, a device driver, an API, an application program, software or other module) that implements the API 2220. The API 2220 specifies one or more functions, methods, classes, objects, protocols, data structures, formats and/or other features of the API-implementing component that may be used by the API-calling component 2230. The API 2220 can specify at least one calling convention that specifies how a function in the API-implementing component receives parameters from the API-calling component and how the function returns a result to the API-calling component. The API-calling component 2230 (e.g., an operating system, a library, a device driver, an API, an application program, software or other module), makes API calls through the API 2220 to access and use the features of the API-implementing component 2210 that are specified by the API 2220. The API-implementing component 2210 may return a value through the API 2220 to the API-calling component 2230 in response to an API call.

It will be appreciated that the API-implementing component 2210 may include additional functions, methods, classes, data structures, and/or other features that are not specified through the API 2220 and are not available to the API-calling component 2230. It should be understood that the API-calling component 2230 may be on the same system as the API-implementing component 2210 or may be located remotely and accesses the API-implementing component 2210 using the API 2220 over a network. While FIG. 22 illustrates a single API-calling component 2230 interacting with the API 2220, it should be understood that other API-calling components, which may be written in different languages (or the same language) than the API-calling component 2230, may use the API 2220.

The API-implementing component 2210, the API 2220, and the API-calling component 2230 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 23:
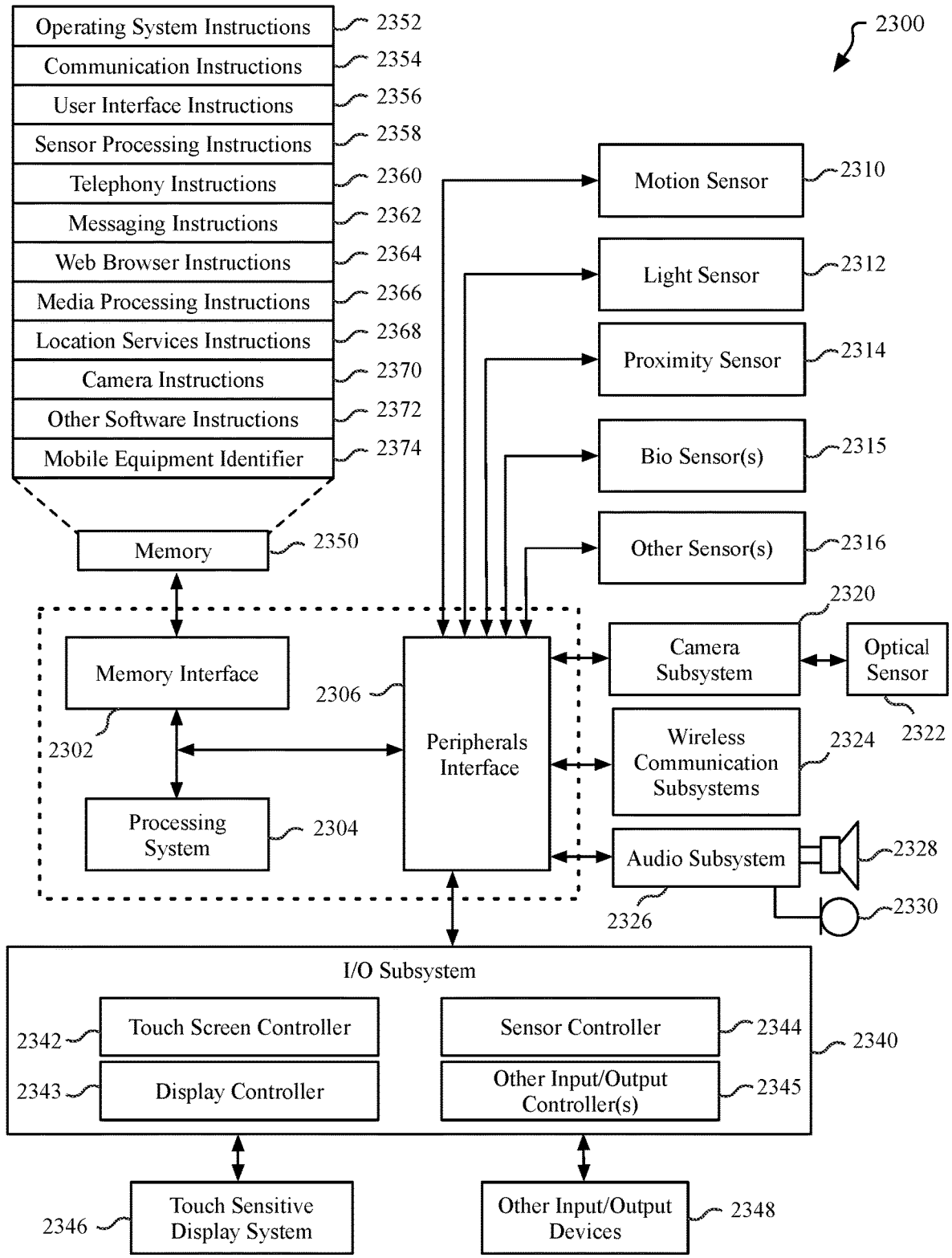
FIG. 23 is a block diagram of a device architecture for a mobile or embedded device, according to an embodiment.

FIG. 23 is a block diagram of a device architecture 2300 for a mobile or embedded device, according to an embodiment. The device architecture 2300 includes a memory interface 2302, a processing system 2304 including one or more data processors, image processors and/or graphics processing units, and a peripherals interface 2306. The various components can be coupled by one or more communication buses or signal lines. The various components can be separate logical components or devices or can be integrated in one or more integrated circuits, such as in a system on a chip integrated circuit.

The memory interface 2302 can be coupled to memory 2350, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 2306 to facilitate multiple functionalities. For example, a motion sensor 2310, a light sensor 2312, and a proximity sensor 2314 can be coupled to the peripherals interface 2306 to facilitate the mobile device functionality. One or more biometric sensor(s) 2315 may also be present, such as a fingerprint scanner for fingerprint recognition or an image sensor for facial recognition. Other sensors 2316 can also be connected to the peripherals interface 2306, such as a positioning system (e.g., GPS receiver), a temperature sensor, or other sensing device, to facilitate related functionalities. A camera subsystem 2320 and an optical sensor 2322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2324, which can include radio frequency receivers and transmitters and/or optical (e.g., infrared) receivers and transmitters. The specific design and implementation of the wireless communication subsystems 2324 can depend on the communication network(s) over which a mobile device is intended to operate. For example, a mobile device including the illustrated device architecture 2300 can include wireless communication subsystems 2324 designed to operate over a GSM network, a CDMA network, an LTE network, a Wi-Fi network, a Bluetooth network, or any other wireless network. In particular, the wireless communication subsystems 2324 can provide a communications mechanism over which a media playback application can retrieve resources from a remote media server or scheduled events from a remote calendar or event server.

An audio subsystem 2326 can be coupled to a speaker 2328 and a microphone 2330 to facilitate voice-enabled functions, such as voice recognition, voice replication, digital recording, and telephony functions. In smart media devices described herein, the audio subsystem 2326 can be a high-quality audio system including support for virtual surround sound.

The I/O subsystem 2340 can include a touch screen controller 2342 and/or other input controller(s) 2345. For computing devices including a display device, the touch screen controller 2342 can be coupled to a touch sensitive display system 2346 (e.g., touch-screen). The touch sensitive display system 2346 and touch screen controller 2342 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 2346. Display output for the touch sensitive display system 2346 can be generated by a display controller 2343. In one embodiment, the display controller 2343 can provide frame data to the touch sensitive display system 2346 at a variable frame rate.

In one embodiment, a sensor controller 2344 is included to monitor, control, and/or processes data received from one or more of the motion sensor 2310, light sensor 2312, proximity sensor 2314, or other sensors 2316. The sensor controller 2344 can include logic to interpret sensor data to determine the occurrence of one of more motion events or activities by analysis of the sensor data from the sensors.

In one embodiment, the I/O subsystem 2340 includes other input controller(s) 2345 that can be coupled to other input/control devices 2348, such as one or more buttons, rocker switches, thumb-wheel, infrared port, USB port, and/or a pointer device such as a stylus, or control devices such as an up/down button for volume control of the speaker 2328 and/or the microphone 2330.

In one embodiment, the memory 2350 coupled to the memory interface 2302 can store instructions for an operating system 2352, including portable operating system interface (POSIX) compliant and non-compliant operating system or an embedded operating system. The operating system 2352 may include instructions for handling basic system services and for performing hardware dependent tasks. In some implementations, the operating system 2352 can be a kernel.

The memory 2350 can also store communication instructions 2354 to facilitate communicating with one or more additional devices, one or more computers and/or one or more servers, for example, to retrieve web resources from remote web servers. The memory 2350 can also include user interface instructions 2356, including graphical user interface instructions to facilitate graphic user interface processing.

Additionally, the memory 2350 can store sensor processing instructions 2358 to facilitate sensor-related processing and functions; telephony instructions 2360 to facilitate telephone-related processes and functions; messaging instructions 2362 to facilitate electronic-messaging related processes and functions; web browser instructions 2364 to facilitate web browsing-related processes and functions; media processing instructions 2366 to facilitate media processing-related processes and functions; location services instructions including GPS and/or navigation instructions 2368 and Wi-Fi based location instructions to facilitate location based functionality; camera instructions 2370 to facilitate camera-related processes and functions; and/or other software instructions 2372 to facilitate other processes and functions, e.g., security processes and functions, and processes and functions related to the systems. The memory 2350 may also store other software instructions such as web video instructions to facilitate web video-related processes and functions; and/or web shopping instructions to facilitate web shopping-related processes and functions. In some implementations, the media processing instructions 2366 are divided into audio processing instructions and video processing instructions to facilitate audio processing-related processes and functions and video processing-related processes and functions, respectively. A mobile equipment identifier, such as an International Mobile Equipment Identity (IMEI) 2374 or a similar hardware identifier can also be stored in memory 2350.

Each of the above identified instructions and applications can correspond to a set of instructions for performing one or more functions described above. These instructions need not be implemented as separate software programs, procedures, or modules. The memory 2350 can include additional instructions or fewer instructions. Furthermore, various functions may be implemented in hardware and/or in software, including in one or more signal processing and/or application specific integrated circuits.

Figure 24:
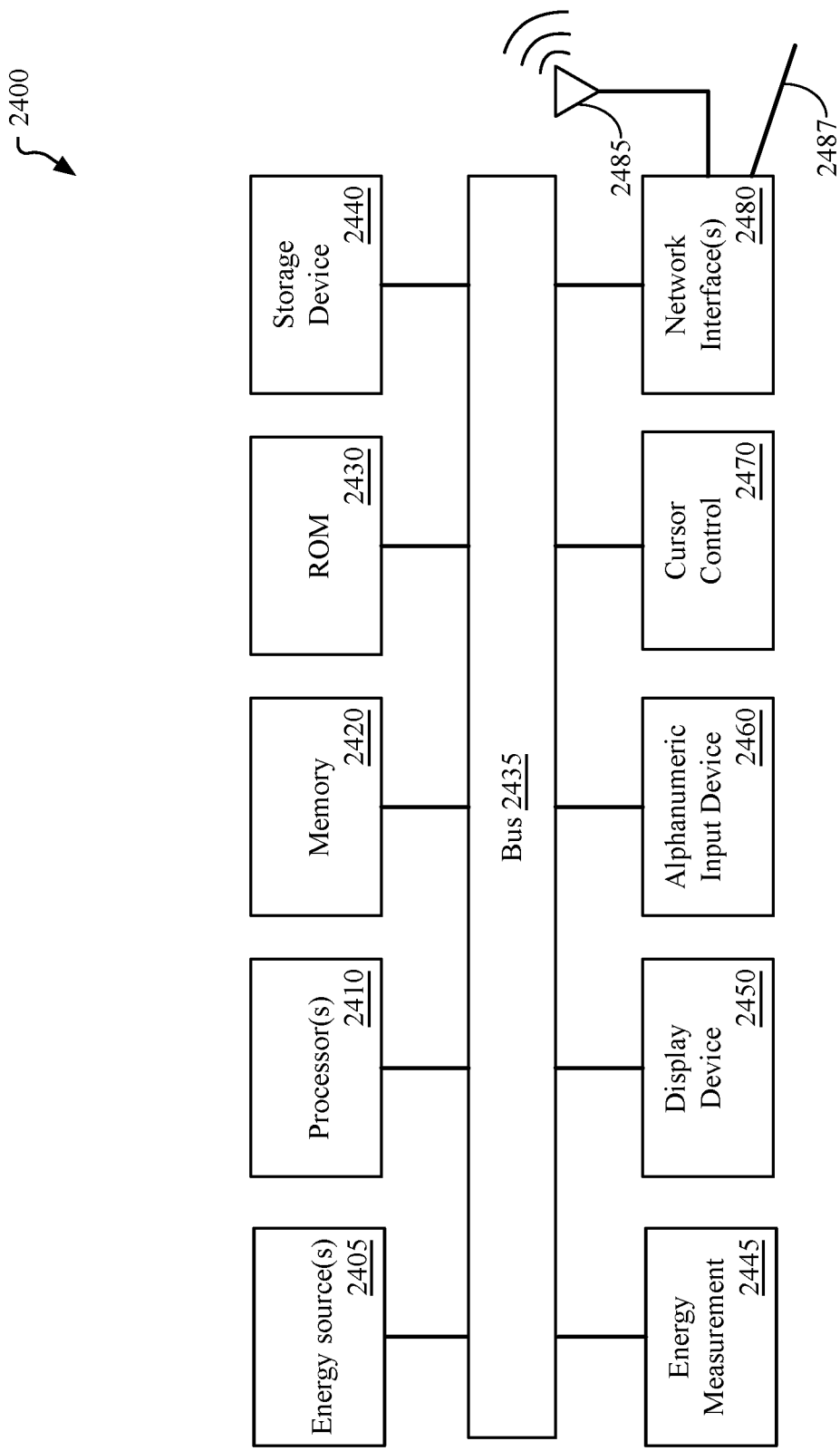
FIG. 24 is a block diagram of a computing system, according to an embodiment.

FIG. 24 is a block diagram of a computing system 2400, according to an embodiment. The illustrated computing system 2400 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 2400 can be used to provide the computing device and/or a server device to which the computing device may connect.

The computing system 2400 includes bus 2435 or other communication device to communicate information, and processor(s) 2410 coupled to bus 2435 that may process information. While the computing system 2400 is illustrated with a single processor, the computing system 2400 may include multiple processors and/or co-processors. The computing system 2400 further may include memory 2420 in the form of random access memory (RAM) or other dynamic storage device coupled to the bus 2435. The memory 2420 may store information and instructions that may be executed by processor(s) 2410. The memory 2420 may also be main memory that is used to store temporary variables or other intermediate information during execution of instructions by the processor(s) 2410.

The computing system 2400 may also include read only memory (ROM) 2430 and/or another data storage device 2440 coupled to the bus 2435 that may store information and instructions for the processor(s) 2410. The data storage device 2440 can be or include a variety of storage devices, such as a flash memory device, a magnetic disk, or an optical disc and may be coupled to computing system 2400 via the bus 2435 or via a remote peripheral interface.

The computing system 2400 may also be coupled, via the bus 2435, to a display device 2450 to display information to a user. The computing system 2400 can also include an alphanumeric input device 2460, including alphanumeric and other keys, which may be coupled to bus 2435 to communicate information and command selections to processor(s) 2410. Another type of user input device includes a cursor control 2470 device, such as a touchpad, a mouse, a trackball, or cursor direction keys to communicate direction information and command selections to processor(s) 2410 and to control cursor movement on the display device 2450. The computing system 2400 may also receive user input from a remote device that is communicatively coupled via one or more network interface(s) 2480.

The computing system 2400 further may include one or more network interface(s) 2480 to provide access to a network, such as a local area network. The network interface(s) 2480 may include, for example, a wireless network interface having antenna 2485, which may represent one or more antenna(e). The computing system 2400 can include multiple wireless network interfaces such as a combination of Wi-Fi, Bluetooth®, near field communication (NFC), and/or cellular telephony interfaces. The network interface(s) 2480 may also include, for example, a wired network interface to communicate with remote devices via network cable 2487, which may be, for example, an Ethernet cable, a coaxial cable, a fiber optic cable, a serial cable, or a parallel cable.

In one embodiment, the network interface(s) 2480 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 2480 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 2400 can further include one or more energy sources 2405 and one or more energy measurement systems 2445. Energy sources 2405 can include an AC/DC adapter coupled to an external power source, one or more batteries, one or more charge storage devices, a USB charger, or other energy source. Energy measurement systems include at least one voltage or amperage measuring device that can measure energy consumed by the computing system 2400 during a predetermined period of time. Additionally, one or more energy measurement systems can be included that measure, e.g., energy consumed by a display device, cooling subsystem, Wi-Fi subsystem, or other frequently used or high-energy consumption subsystem.

Figure 25:
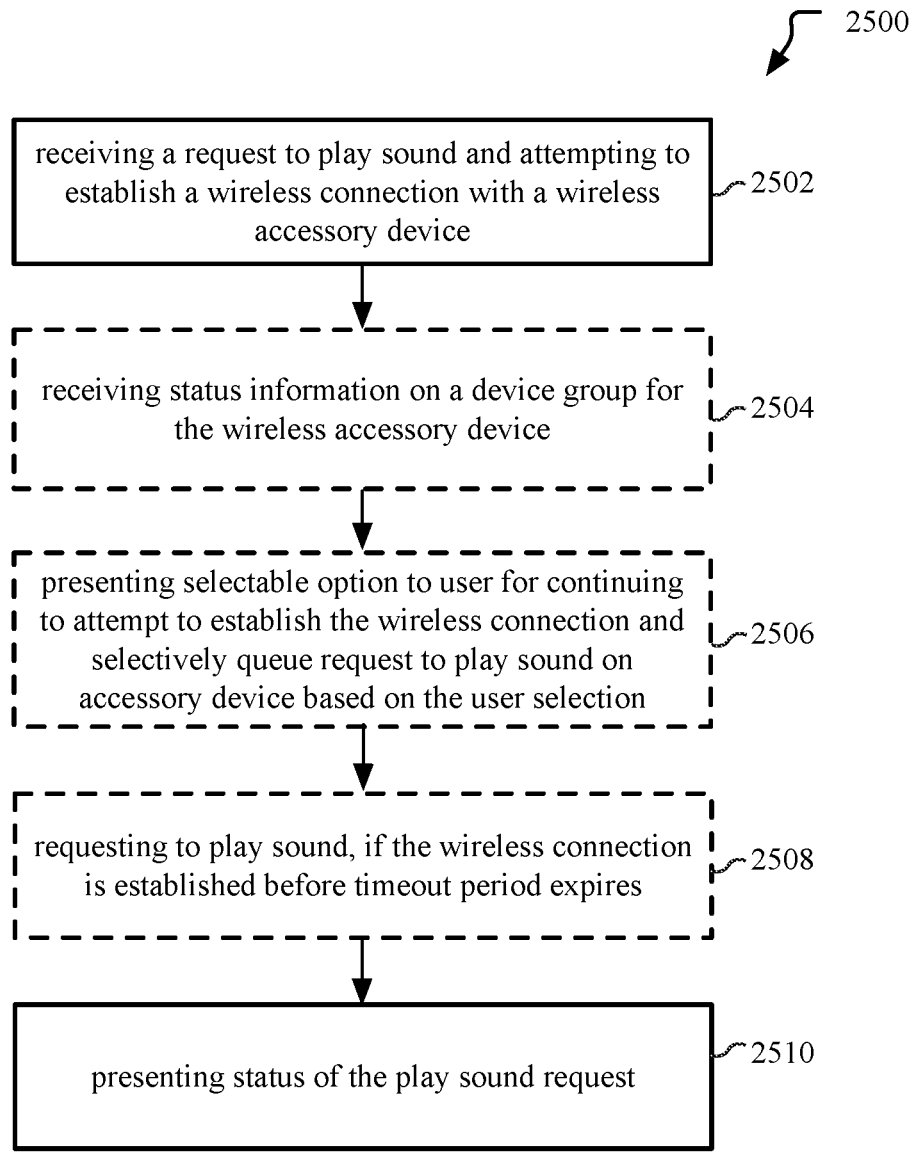
FIG. 25 is a flow diagram illustrating a method of requesting a lost accessory device or device group to play a sound, according to an embodiment.

FIG. 25 is a flow diagram 2500 illustrating a method of requesting a lost accessory device or device group play a sound, according to an embodiment. Mobile device 102 may receive a request to play a sound at an accessory device 101A (2502) via a device locator application UI 204, such as shown in FIG. 20. If an initial attempt to establish a wireless connection with the accessory device 101A (2502) is successful, then the request to play the sound may be sent to the accessory device 101A.

Optionally, if the initial attempt to establish the wireless connection is unsuccessful, then status information on the device group 105 may be received (2504). The last know status information obtained from a beacon signal from an accessory device 101 in the device group may provide information on a beaconing rate of the accessory devices 101. For example, the beaconing rate may depend on whether the accessory devices are in the case 103 or out of the case 103 in some embodiments. Optionally, a request may be sent to the accessory device 101A to increase the beaconing rate, if necessary. A timeout period for attempting to connect to the accessory device 101A may be determined based on the beaconing rate as determined by the state of the accessory devices 101 (e.g., every minute beaconing rate if in case or every two seconds if out of case, etc.).

The user may be given the option via the device locator UI 204 to continue to attempt to establish a connection with the accessory device 101A and queue the request to play sound on the accessory device 101A (2506). If the user selects to queue the request at the mobile device 102 to request to play sound at the accessory device 101A (2506), then the request will be sent to the accessory device upon establishment of the wireless connection with the accessory device 101A, if the connection is established before the timeout period expires (2508). A status of the play sound request (2510) indicating success or failure may be presented in the device locator application UI 204.

Figure 26:
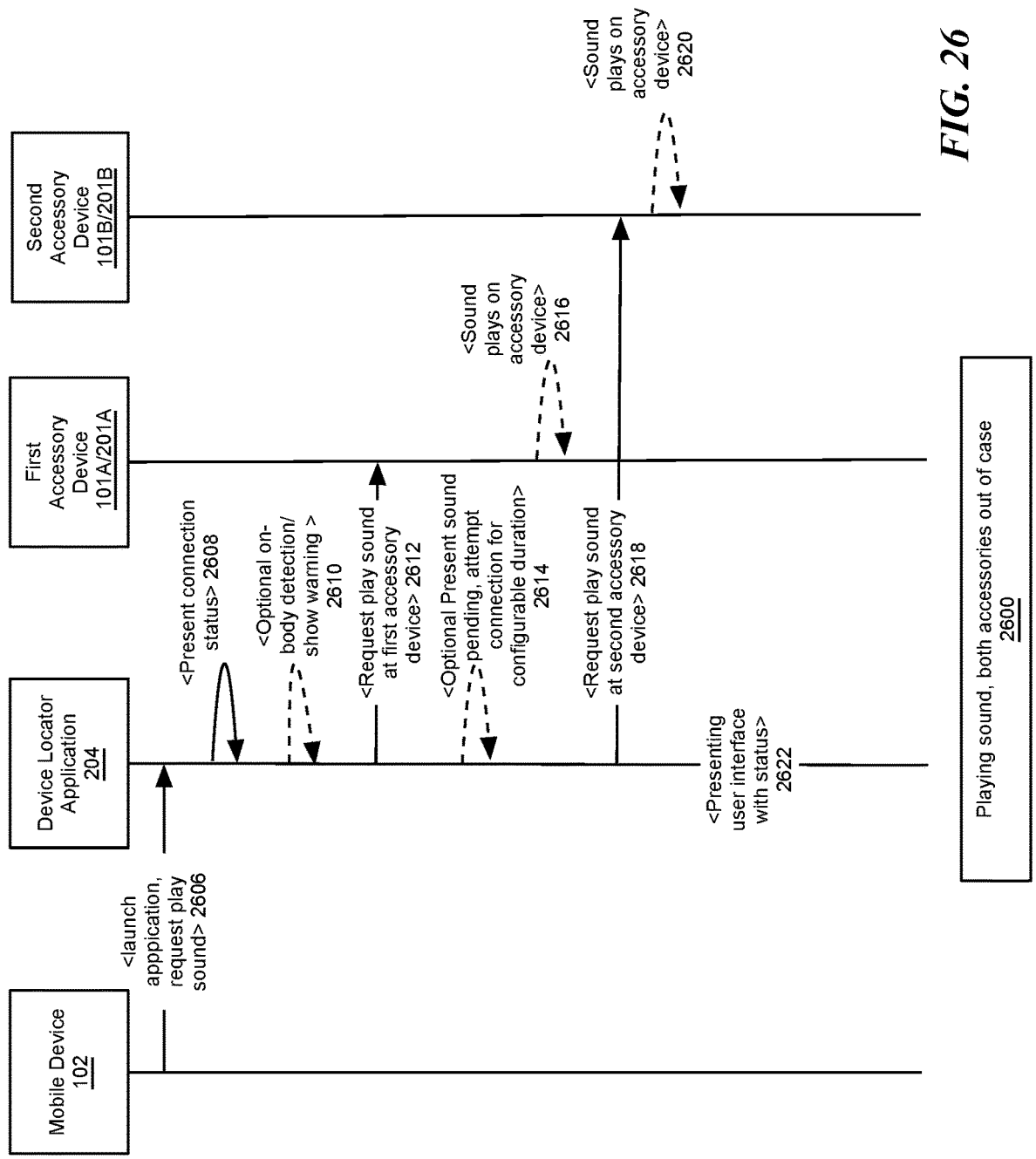
FIGS. 26-28 are sequence diagrams illustrating methods for requesting a lost accessory device or accessory devices from a device group to play a sound, according to embodiments described herein.
Figure 27:
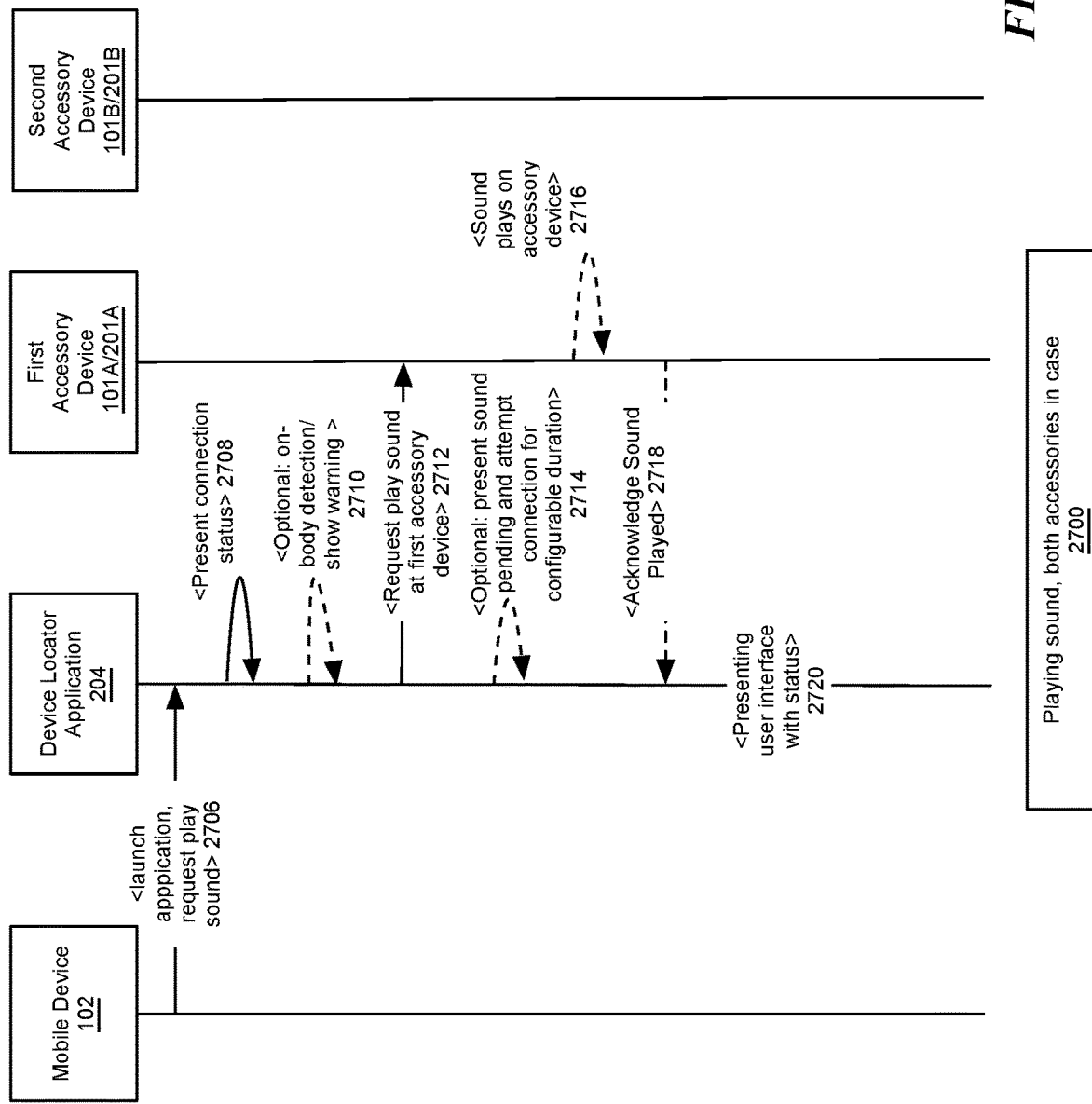
Figure 28:
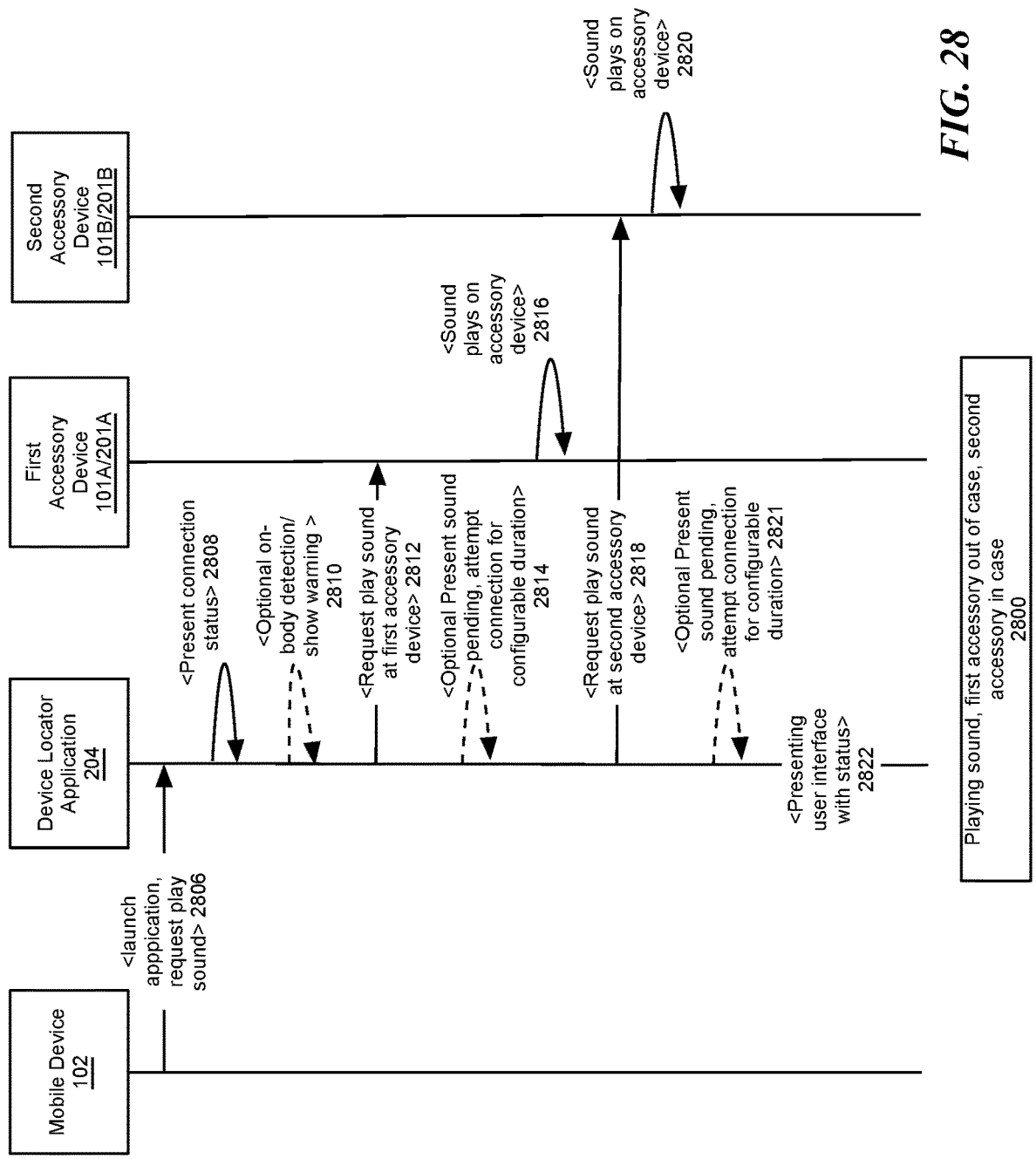

FIGS. 26-28 are sequence diagrams illustrating methods for requesting a lost accessory device or devices from a device group to play a sound, according to embodiments described herein. FIG. 26 is a sequence diagram 2600 illustrating a method for requesting a lost accessory device or devices from a device group to play a sound, according to an embodiment. Sequence diagram 2600 illustrates a method for playing a sound on accessories 101 in the device group 105 when the accessory devices are out of the case 103 to assist the user in locating the lost accessory. Mobile device 102 launches the device locator application 204 and requests to play sound on lost accessory devices 101 in the device group 105 (2606). An attempt is made to establish a wireless connection with a first accessory device 101A and the connection status is presented within the user interface (2608). Optionally, a request is sent to the first and the second accessories 101 to detect whether the accessories are on-body (e.g., in-ear, on wrist, etc.) (2610). A warning may be presented in the user interface of device locator application 204 to inform as to whether if any of the accessories are currently being worn (2610). The volume and/or type of sound may be altered if an accessory is detected on-body. A request to play sound is sent to the first accessory when a wireless connection is established with the first accessory device 101A (2612). Optionally, the user interface of device locator application 204 may display a message that a sound request is pending (2614). Attempts to establish to wireless connection with each of the accessory devices may be performed for a configurable duration of time (2614). If the wireless connection is established, then a sound is played on the first accessory device 101A (2616). A request to play sound is sent to the second accessory device 101B when a wireless connection is established with the second accessory device 101B (2618). If the wireless connection is established, then a sound is played on the second accessory device 101B (2620). The status of the requests (e.g., success or failure) to play sound for each accessory may be presented within the user interface of device locator application 204 (2622).

FIG. 27 is a sequence diagram 2700 illustrating a method for requesting a lost accessory device or devices from a device group to play a sound, according to an embodiment. Sequence diagram 2700 illustrates a method for playing a sound on both accessories 101 in the device group 105 when the accessory devices are in the case 103. Mobile device 102 launches the device locator application 204 and requests to play sound on lost accessory devices 101 in the device group 105 (2706). An attempt is made to establish a wireless connection with a first accessory device 101A and the connection status is presented within the user interface (2708). Optionally, a request is sent to the first and the second accessories 101 to detect whether the accessories are on-body (e.g., in-ear, on wrist, etc.) (2710). A warning may be presented in the user interface of device locator application 204 to inform as to whether if any of the accessories are currently being worn (2710). The volume and/or type of sound may be altered if an accessory is detected on-body. A request to play sound is sent to the first accessory when a wireless connection is established with the first accessory device 101A (2712). Optionally, the user interface of device locator application 204 may display a message that a sound request is pending (2714). Attempts to establish to wireless connection with each of the accessory device in the case 103 may be performed for a configurable duration of time (2714). If the wireless connection is established, then a sound is played on the first accessory device 101A (2716). The device locator application 204 may receive an acknowledgment message from the first accessory device 101A that the sound was played. The status of the requests (e.g., success or failure) to play sound for each accessory may be presented within the user interface of device locator application 204 (2722).

FIG. 28 is a sequence diagram 2600 illustrating a method for requesting a lost accessory device or devices from a device group to play a sound, according to an embodiment. Sequence diagram 2800 illustrates a method for playing a sound on both accessories 101 in the device group 105 when the first accessory device 101A is out of the case 103 and the second accessory device 101B is in the case 103. Mobile device 102 launches the device locator application 204 and requests to play sound on lost accessory devices 101 in the device group 105 (2806). An attempt is made to establish a wireless connection with a first accessory device 101A and the connection status is presented within the user interface (2808). Optionally, a request is sent to the first and the second accessories 101 to detect whether the accessories are on-body (e.g., in-ear, on wrist, etc.) (2810). A warning may be presented in the user interface of device locator application 204 to inform as to whether if any of the accessories are currently being worn (2810). The volume and/or type of sound may be altered if an accessory is detected on-body. A request to play sound is sent to the first accessory when a wireless connection is established with the first accessory device 101A (2812). Optionally, the user interface of device locator application 204 may display a message that a sound request is pending (2814). Attempts to establish to wireless connection with each of the accessory devices may be performed for a configurable duration of time (2814). If the wireless connection is established, then a sound is played on the first accessory device 101A (2816). A request to play sound is sent to the second accessory device 101B when a wireless connection is established with the second accessory device 101B (2818). Optionally, the user interface of device locator application 204 may display a message that a sound request is pending (2821). Attempts to establish to wireless connection with each of the accessory devices may be performed for a configurable duration of time (2821). If the wireless connection is established, then a sound is played on the second accessory device 101B (2820). The status of the requests (e.g., success or failure) to play sound for each accessory may be presented within the user interface of device locator application 204 (2822).

Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method for finding a device group, the method comprising:
   receiving an indication that a first accessory device is part of a device group, wherein the first accessory device is connected to a second accessory device in the device group;
   receiving a beacon signal from the first accessory device in the device group, wherein the beacon signal includes at least connection status information between the first accessory device and the second accessory device;
   determining, based on the at least connection status information, to attribute location data for the first accessory device to the second accessory device; and
   storing the location data corresponding to the beacon signal for the device group.

2. The method of claim 1, wherein a plurality of accessory devices in the device group are physically connected, the plurality of accessory devices includes the first accessory device and second accessory device.

3. The method of claim 1, wherein RSSI information is determined from the beacon signal, and wherein the beacon signal comprises an advertisement including RSSI information.

4. The method of claim 1, further comprising:
   presenting the location data on the device group in a user interface.

5. The method of claim 1, further comprising:
   requesting storage of the location data on the device group with device locator services.

6. The method of claim 5, further comprising:
   generating at least one key for at least one accessory device in the device group;
   requesting a device locator service to send the location data corresponding to the at least one key; and
   receiving and presenting the location data on the device group.

7. The method of claim 1,
   wherein the first accessory device is wirelessly connected to a second accessory device in the device group.

8. A method for finding a group of devices, the method comprising:
   receiving an indication that a first accessory device is part of a device group;

receiving at least connection status information indicating the first accessory device is not connected to another accessory device in the device group;

determining, based on the at least connection status information, not to attribute first location data for the first accessory device to the second accessory device;

receiving a first beacon signal from the first accessory device in the device group;

receiving a second beacon signal from a second accessory device in the device group; and storing first location data corresponding to the first beacon signal and second location data from the second beacon signal for the device group.

9. The method of claim 8, further comprising:
presenting the first location data and the second location data on the device group in a user interface.

10. The method of claim 8, further comprising:
requesting storage of the first location data and the second location data on the device group with device locator services.

11. A non-transitory machine-readable medium storing instructions to cause one or more processors of an electronic device to perform operations comprising:

receiving an indication that a first accessory device is part of a device group, wherein the first accessory device is connected to a second accessory device in the device group;

receiving a beacon signal from the first accessory device in the device group, wherein the beacon signal includes at least connection status information between the first accessory device and the second accessory device;

determining, based on the at least connection status information, to attribute location data for the first accessory device to the second accessory device; and storing the location data corresponding to the beacon signal for the device group.

12. The non-transitory machine-readable medium of claim 11, wherein a plurality of accessory devices in the device group are physically connected, the plurality of accessory devices includes the first accessory device and the second accessory device.

13. The non-transitory machine-readable medium of claim 11, wherein RSSI information is determined from the beacon signal, and wherein the beacon signal comprises an advertisement including RSSI information.

14. The non-transitory machine-readable medium of claim 11, the operations further comprising:
presenting the location data on the device group in a user interface.

15. The non-transitory machine-readable medium of claim 11, the operations further comprising:
requesting storage of the location data on the device group with device locator services.

16. The non-transitory machine-readable medium of claim 15, the operations further comprising:
generating at least one key for at least one accessory device in the device group;
requesting a device locator service to send the location data corresponding to the at least one key; and
receiving and presenting the location data on the device group.

17. The non-transitory machine-readable medium of claim 11, wherein the first accessory device is wirelessly connected to a second accessory device in the device group.

18. An electronic device, the electronic device comprising:
a memory to store instructions for execution;
one or more processors to execute the instructions stored in memory, wherein the instructions, when executed cause the one or more processors to:
receive an indication that a first accessory device is part of a device group, wherein the first accessory device is connected to a second accessory device in the device group;
receive a beacon signal from the first accessory device in the device group, wherein the beacon signal includes at least connection status information between the first accessory device and the second accessory device;
determine, based on the at least connection status information, to attribute location data for the first accessory device to the second accessory device; and
store the location data corresponding to the beacon signal for the device group.

19. The electronic device of claim 18, wherein a plurality of accessory devices in the device group are physically connected, the plurality of accessory devices includes the first accessory device and the second accessory device.

20. The electronic device of claim 18, wherein RSSI information is determined from the beacon signal, and wherein the beacon signal comprises an advertisement including RSSI information.

21. The electronic device of claim 18, the instructions further cause the one or more processors to: presenting the location data on the device group in a user interface.

22. The electronic device of claim 18, the instructions further cause the one or more processors to:
requesting storage of the location data on the device group with device locator services.

* * * * *